United States Patent
Kitaura

(10) Patent No.: US 7,679,689 B2
(45) Date of Patent: Mar. 16, 2010

(54) ELECTRONIC APPLIANCE

(75) Inventor: Masahiro Kitaura, Kanagawa-ken (JP)

(73) Assignee: Victor Company of Japan, Limited, Yokohama-shi, Kanagawa-ken (JP)

(*) Notice: Subject to any disclaimer, the term of this patent is extended or adjusted under 35 U.S.C. 154(b) by 975 days.

(21) Appl. No.: 11/433,668

(22) Filed: May 15, 2006

(65) Prior Publication Data

US 2006/0256224 A1    Nov. 16, 2006

(30) Foreign Application Priority Data

May 16, 2005   (JP)   ............................ P2005-142062
Jun. 29, 2005   (JP)   ............................ P2005-189307

(51) Int. Cl.
  *H04N 5/44*   (2006.01)
  *H04N 9/74*   (2006.01)

(52) U.S. Cl. .................. 348/734; 348/725; 348/580; 348/584

(58) Field of Classification Search .......... 348/734, 348/725, 728, 552, 563, 569, 578, 580, 583, 348/584, 598, 599; 345/156–158; 382/293, 382/296; 715/863; *H04N 5/44, 5/445, 5/50, H04N 9/74*

See application file for complete search history.

(56) References Cited

U.S. PATENT DOCUMENTS 5,675,374 A * 10/1997 Kohda ................... 348/14.1
7,253,833 B2 * 8/2007 Imoto ...................... 348/148

FOREIGN PATENT DOCUMENTS

| JP | 08-315154 | | 11/1996 |
|---|---|---|---|
| JP | 2002-196855 | A | 7/2002 |
| JP | 2003-283866 | | 10/2003 |
| JP | 2004-246578 | | 9/2004 |
| JP | 2004-258766 | | 9/2004 |
| JP | 2004-348442 | A | 12/2004 |
| WO | 03/052568 | A2 | 6/2003 |

* cited by examiner

*Primary Examiner*—Sherrie Hsia
(74) *Attorney, Agent, or Firm*—The Nath Law Group; Jerald L. Meyer; Derek Richmond

(57) ABSTRACT

A video camera picks up an image of an operator. The picked-up image is subjected to a mirror image conversion. An image for operation, including operation buttons and the operator's image that is subjected to the mirror image conversion are mixed and displayed on a screen of a television receiver. The operator selects a desired operation button by using a universal remote controller with light emitting portions, and executes the operation on the screen. A detecting portion in the television receiver detects which operation button is operated, and executes a control operation corresponding to the operated operation button.

5 Claims, 58 Drawing Sheets

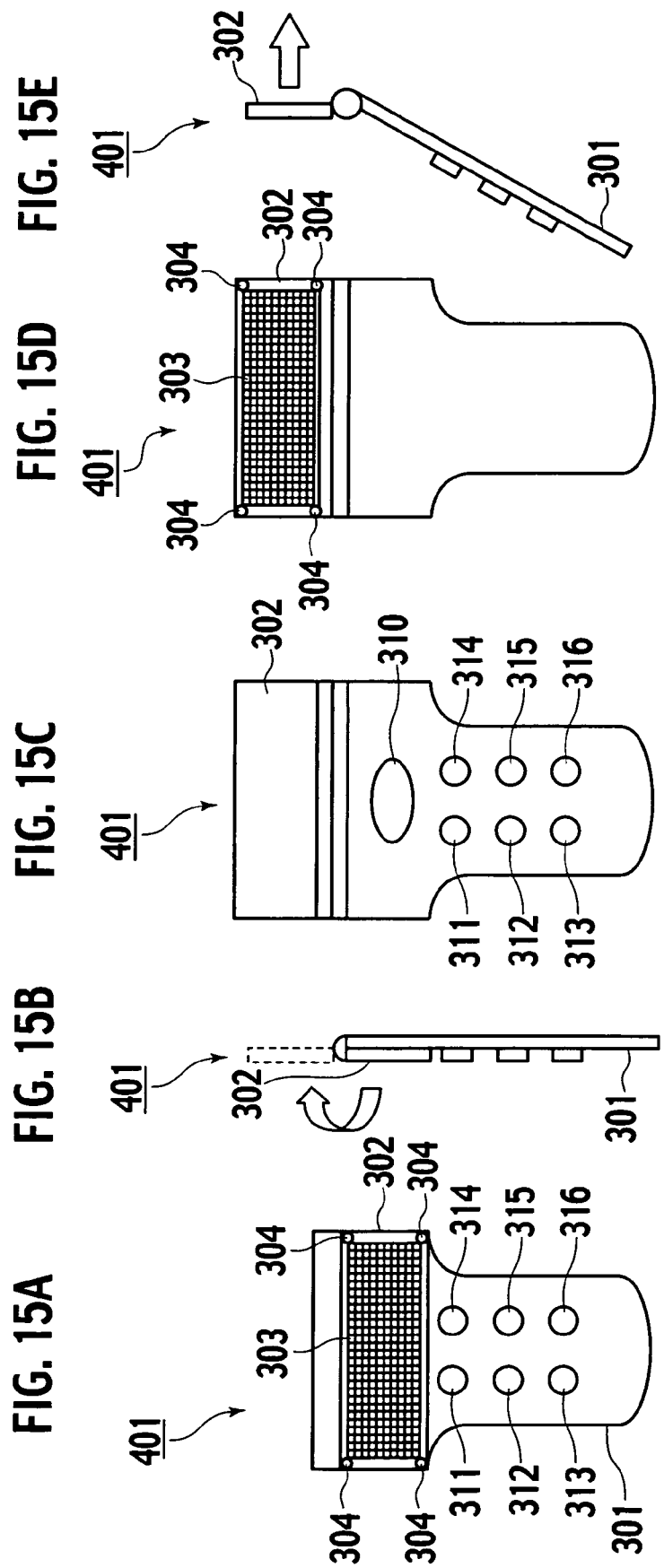

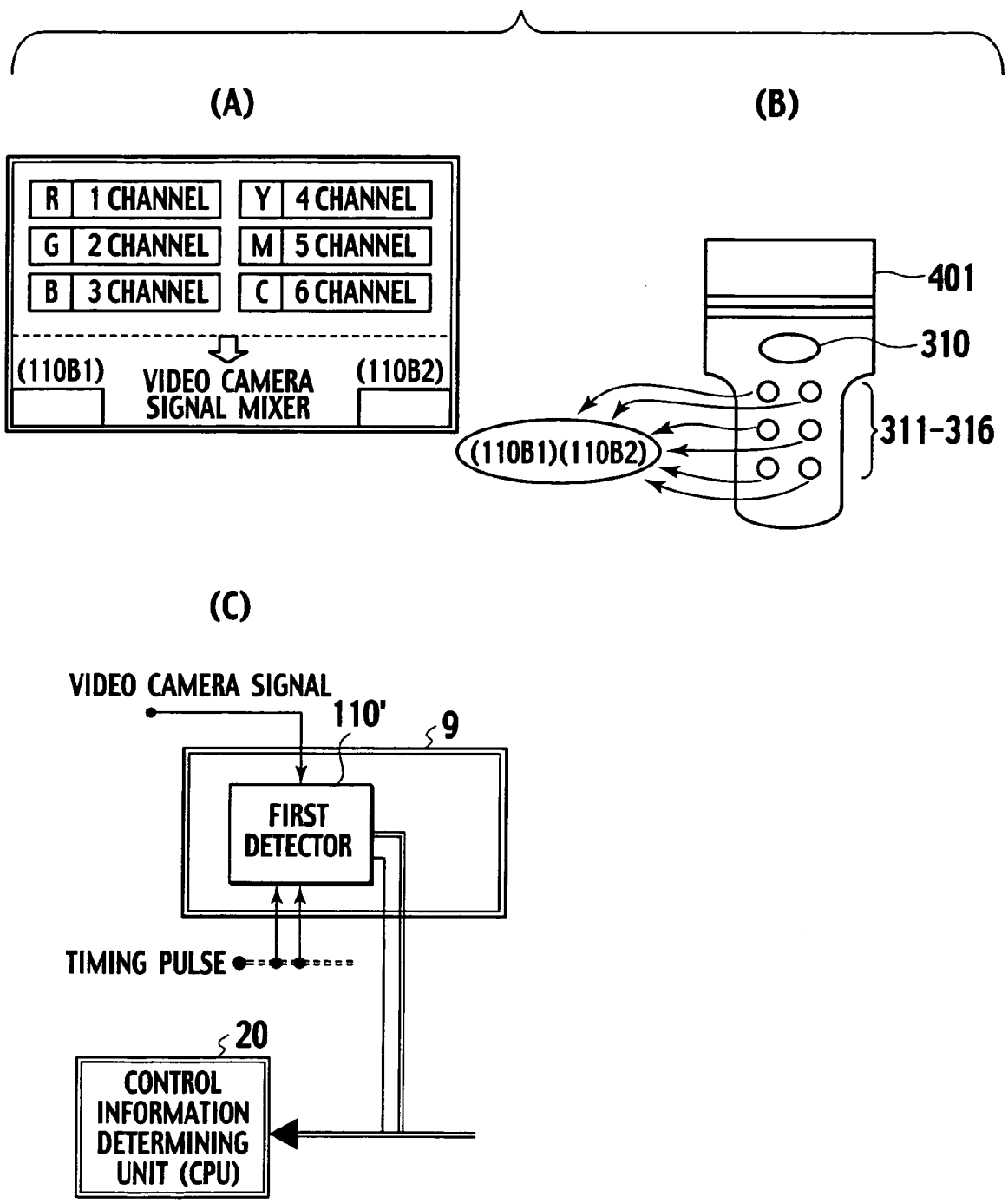

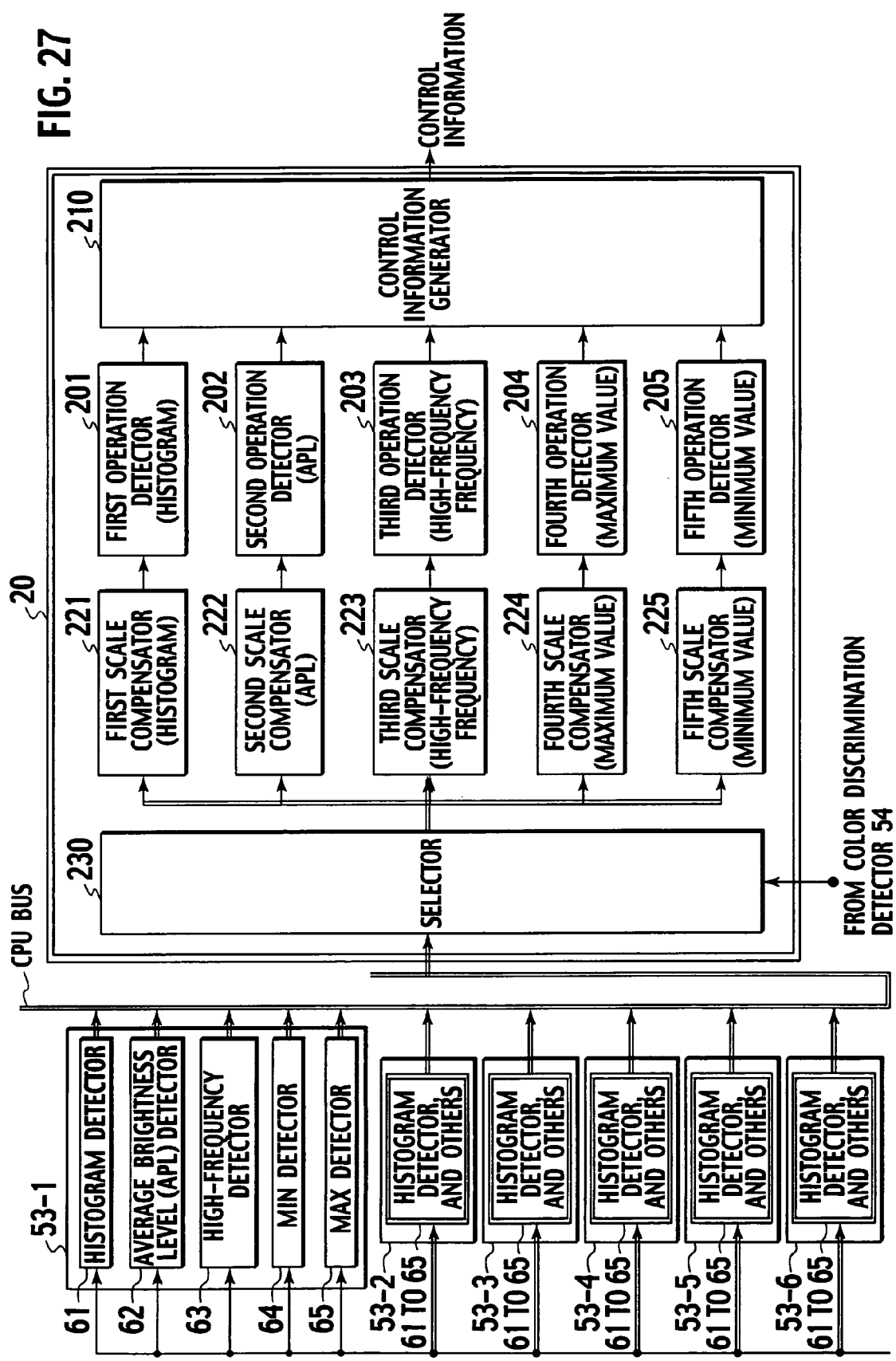

|  | BT601 | YELLOW (Y) | CYAN (C) | GREEN (G) | MAGENTA (M) | RED (M) | BLUE (B) |
|---|---|---|---|---|---|---|---|
| RED (M) | 0.30 | 0.30 | -- | -- | 0.30 | 0.30 | -- |
| GREEN (G) | 0.59 | 0.59 | 0.59 | 0.59 | -- | -- | -- |
| BLUE (B) | 0.11 | -- | 0.11 | -- | 0.11 | -- | 0.11 |
| BRIGHTNESS | 1.0 | 0.89 | 0.7 | 0.59 | 0.41 | 0.3 | 0.11 |

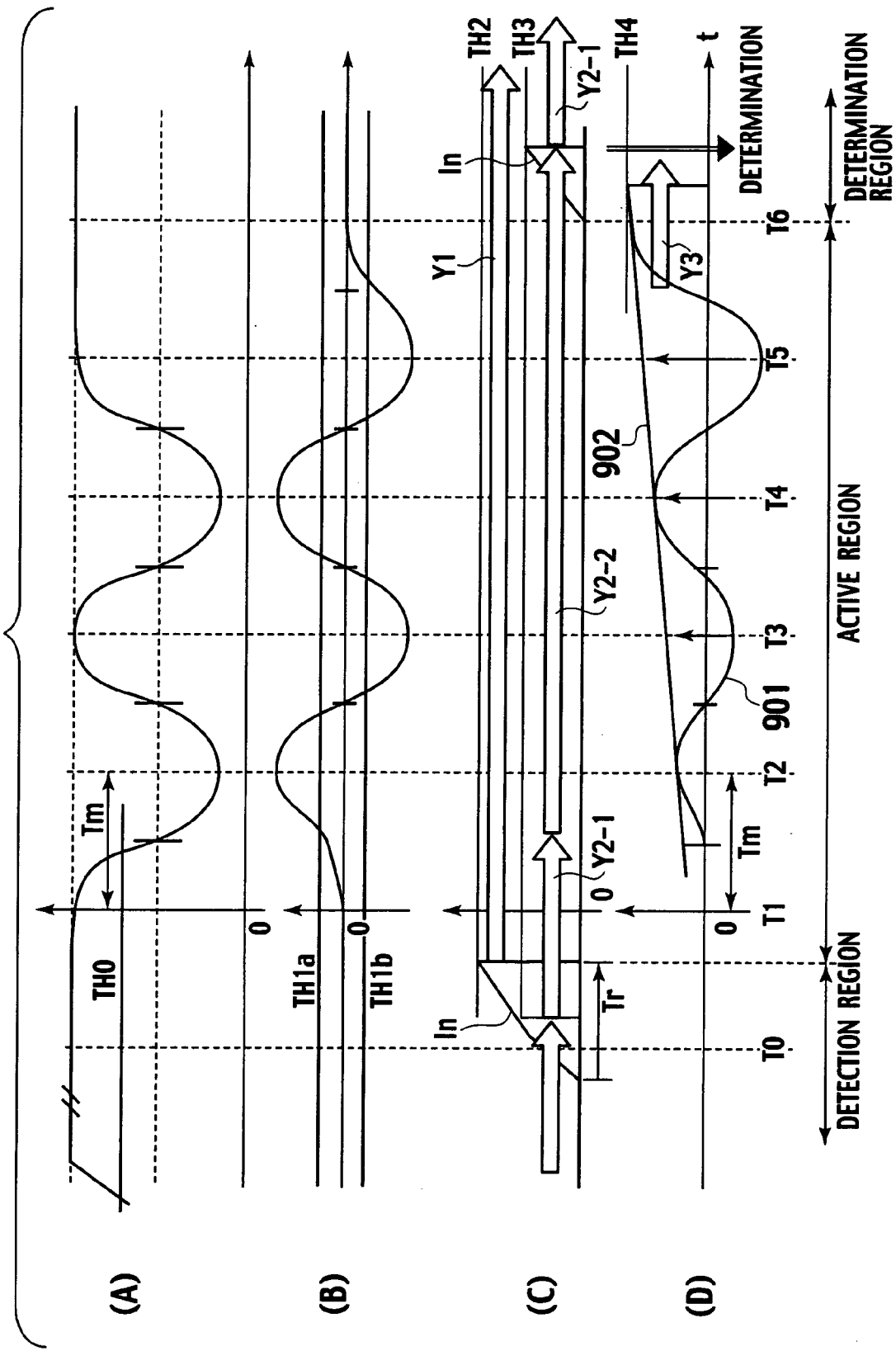

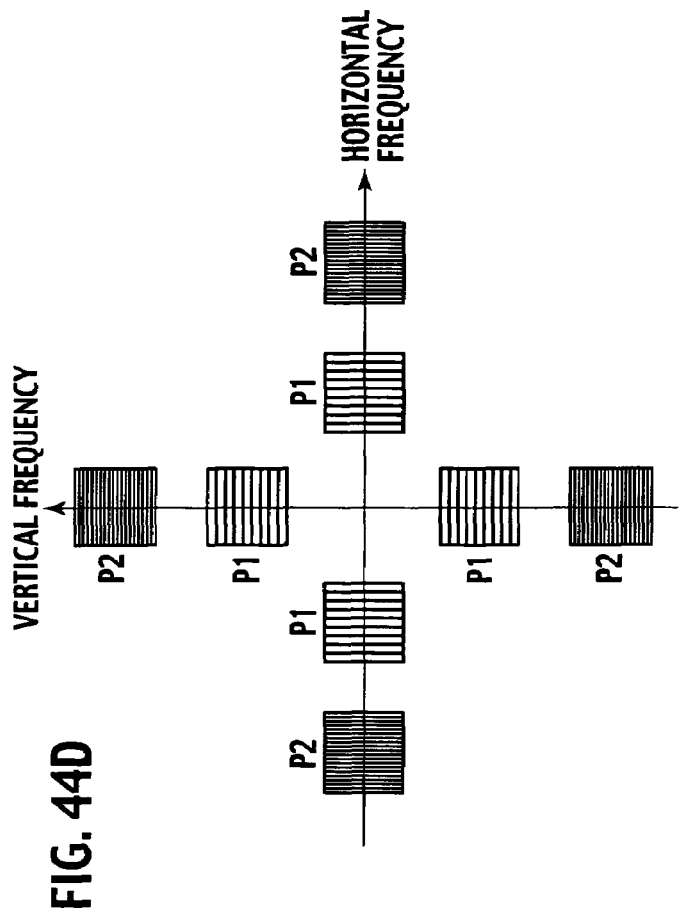
FIG. 44D
FIG. 44A
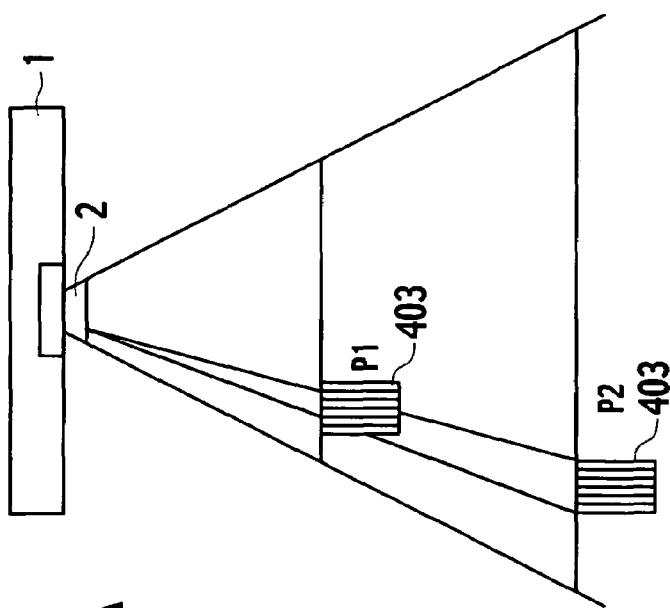
FIG. 44B
FIG. 44C

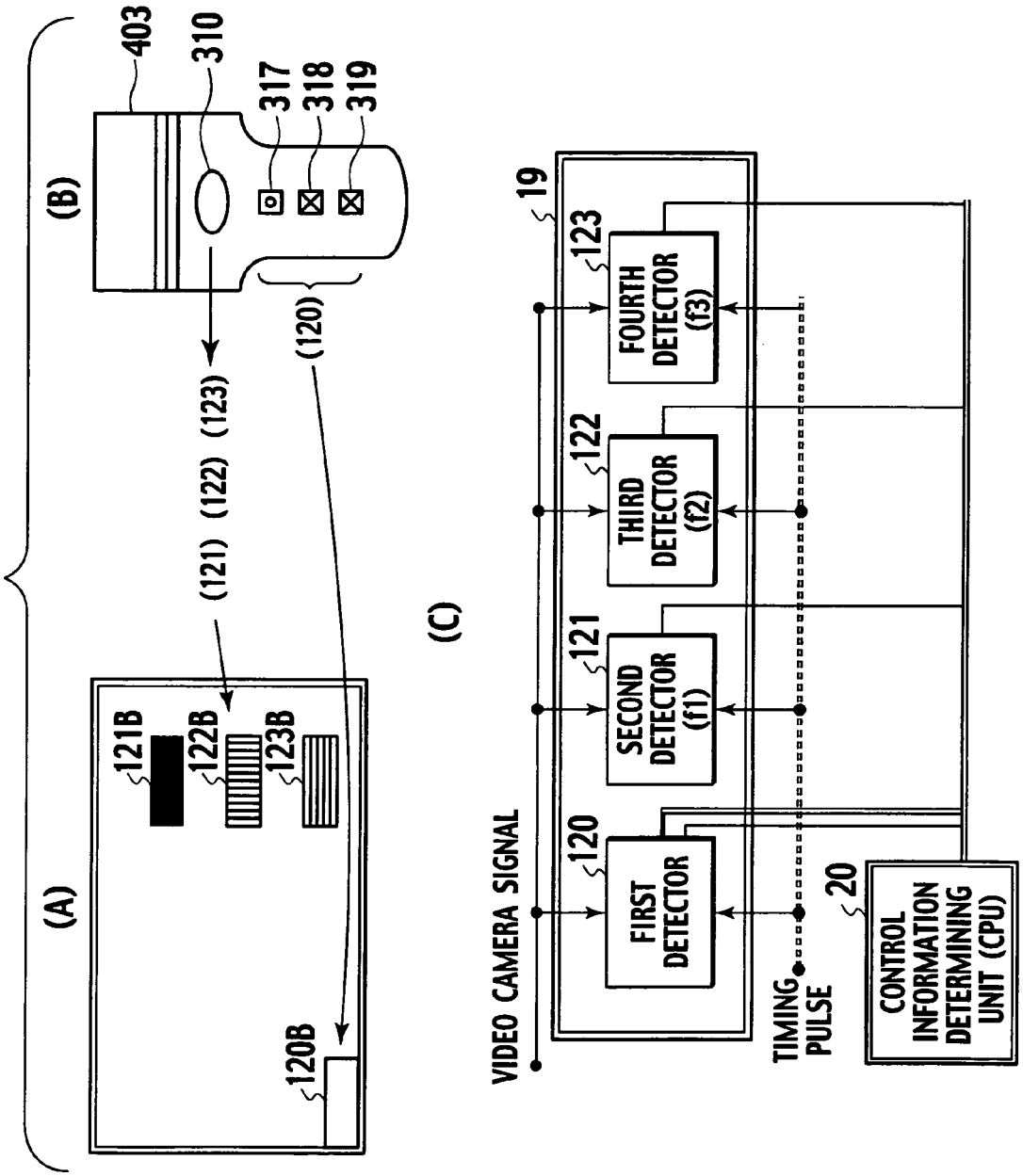

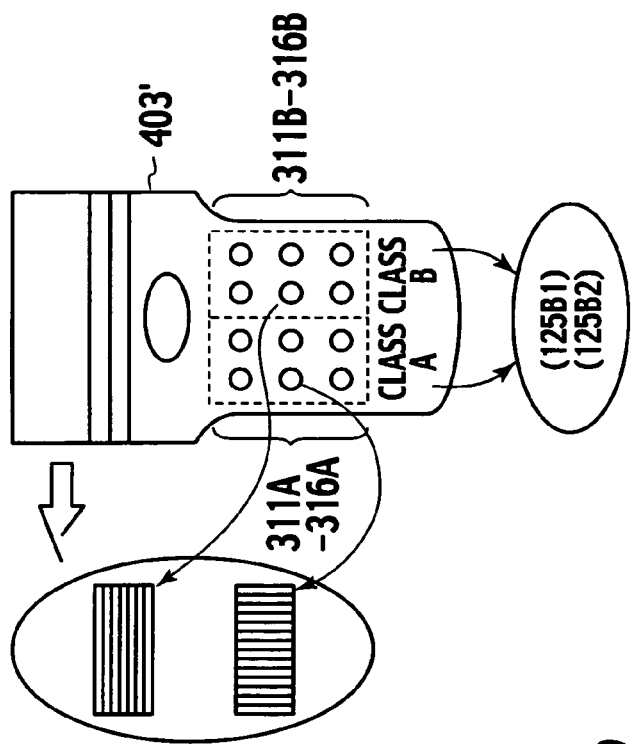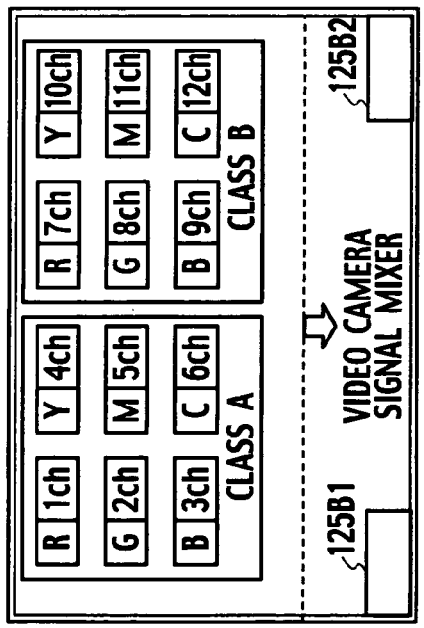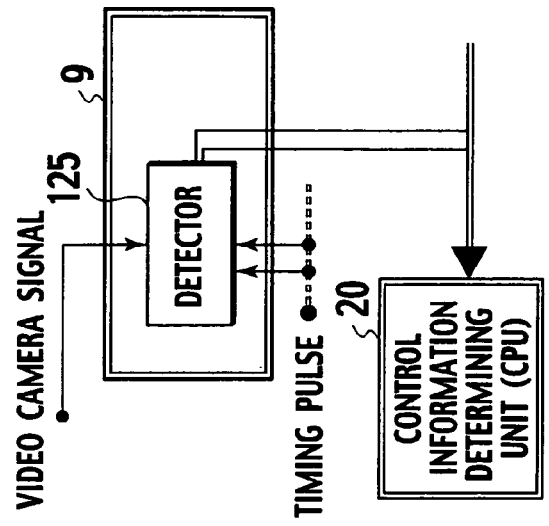

FIG. 60

| | SPATIAL FREQUENCY REGION DISCRIMINATION | |
|---|---|---|
| | CLASS A<br>FIRST FREQUENCY REGION<br>(VERTICAL STRIPE) | CLASS B<br>SECOND FREQUENCY REGION<br>(HORIZONTAL STRIPE) |
| RED | FIRST CONTROL<br>YR: CLASS A RED BUTTON | SEVENTH CONTROL<br>YR: CLASS B RED BUTTON |
| GREEN | SECOND CONTROL<br>YR: CLASS A GREEN BUTTON | EIGHTH CONTROL<br>YR: CLASS B GREEN BUTTON |
| BLUE | THIRD CONTROL<br>YR: CLASS A BLUE BUTTON | NINTH CONTROL<br>YR: CLASS B BLUE BUTTON |
| YELLOW | FOURTH CONTROL<br>YR: CLASS A YELLOW BUTTON | TENTH CONTROL<br>YR: CLASS B YELLOW BUTTON |
| MAGENTA | FIFTH CONTROL<br>YR: CLASS A MAGENTA BUTTON | ELEVENTH CONTROL<br>YR: CLASS B MAGENTA BUTTON |
| CYAN | SIXTH CONTROL<br>YR: CLASS A CYAN BUTTON | TWELFTH CONTROL<br>YR: CLASS B CYAN BUTTON |

COLOR DISCRIMINATION ns such as video-on-demand services have required users to navigate complex menu systems using basic directional controls, creating friction in the user experience.

ELECTRONIC APPLIANCE

BACKGROUND OF THE INVENTION

1. Field of the Invention

The present invention relates to an electronic appliance such as a television receiver or a personal computer having a display device and, more particularly, an electronic appliance in which a remote control method in the electronic appliance is improved.

2. Description of the Related Art

In the 1980s, home appliances such as television receivers started to have infrared remote controllers. Remote-control user interfaces have widely spread and greatly changed the style of use of home appliances. At present, the remote control is in the main stream. The remote controllers basically employ the same scheme when accomplishing functions. Namely, they require a user to push a key corresponding to a desired function. For example, a remote controller for a television receiver has keys "Power", "Channel", "Volume", "Input Switching", and the like to realize convenient remote control of the television receiver.

To control data broadcasting which has started recently, a user must repeatedly manipulate "Up", "Down", "Left", "Right" keys and an "Enter" key on a remote controller until a desired menu is displayed. This is troublesome for the user. An EPG (electronic program guide) displays a matrix of guides and prompts the user to select a desired one of the guides by pushing keys on a remote controller. This is also troublesome for the user.

To cope with the problem, Japanese Unexamined Patent Application Publication No. 2003-283866 has disclosed a controller that employs a position specifying device such as a mouse to provide positional information, encodes the positional information into a time-series of key codes or a time-series pattern of pushed key signals, and transmits the time-series of key codes to a television receiver.

This related art requires a user to conduct a pointing operation, which resembles the pointing operation of a personal computer, when remotely controlling a television receiver. If the user is unfamiliar with a personal computer, such pointing operation is troublesome for the user. Applying the operation techniques of personal computers to home appliances is unreasonable in view of information literacy (ability to use information). There is a need for a new controller suitable for remote-controlling today's television receivers.

Due to advancement in network technology, television receivers and displays for personal computers can display various types of information from storage media or from the Internet. Such a variety of information pieces involve a variety of handling methods, and current remote controllers accompanying home appliances are insufficient to cope with such a variety of handling methods. There is a need for a remote controller capable of coping with many handling methods.

Only by expanding the size and capacity, the conventional remote controller can cover a variety of complicated functions of present home appliances such as television receivers. For example, a menu of data broadcasting requires a user to conduct many steps of pointing operations, and therefore, the user is forced to use the conventional remote controller as a pointing device. The conventional remote controller, however, is problematic to use it as a pointing device. When controlling a plurality of networked devices, the user must manipulate their respective remote controllers via a display. The number of remote controllers increases in proportion to the number of networked devices. This problem is frequently experienced in present days when a television receiver, for example, is connected to other devices such as a VTR, a video disk, and an audio unit. It is bothersome for the user to find a correct one among the remote controllers of these interlinked devices. In addition, the conventional remote controller is substantially unable to select and control information pieces provided by various web sites via the Internet.

In contrast, in view of the above respects, the applicant of this application has proposed the controller for the electronic appliance, which can accomplish both flexibility for various electronic devices and convenience of the remote control and also omit an on-hand operation of the remote. This controller picks up an image of an action of the user's hand by the video camera and discriminates an operation content based on the action. However, such a problem lies that this controller cannot fulfill its function in a darkroom.

SUMMARY OF THE INVENTION

The present invention has been made in view of the above circumstances, and it is an object of the present invention to provide an electronic appliance capable of fulfilling compatibly flexibility and convenience of a remote control of the electronic appliance and also operating the remote control in a darkroom to improve the convenience much more.

In order to solve the above problems in the prior art, according to one aspect of the present invention, there is provided an electronic appliance comprising a display device (23); a video camera (2) that picks up an image of an operator positioned in front of the display device; a mirror image converter (14) configured to execute a mirror image conversion of the image picked up by the video camera; an operation image generator (16) configured to generate an image for operation including an image of at least one operation button; a mixer (17) configured to mix an image signal of the image that underwent the mirror image conversion with an image signal of the image for operation; a detector (31 to 34, 110 to 116, 110', 120 to 123) configured to detect a predetermined selecting operation for selecting one of the at least one operation button made by an operator displayed on a screen of the display device using an on-hand control unit having light emitting portion, with a mixed image obtained by the mixer displayed on the screen of the display device; and a controller (20) configured to execute a control operation corresponding to the selected operation button for which the predetermined selecting operation is detected by the detector.

Here, preferably the light emitting portion of the on-hand control unit has a light emitting means for emitting a light in N colors (N is an integer of 2 or more), and the on-hand control unit has N color selecting buttons corresponding to the N colors, the detector has a discriminating means for discriminating the N colors, and the controller executes a control operation corresponding to a color discriminated by the discriminating means of the detector.

Also, preferably the on-hand control unit has operation buttons used to cause the light emitting portion to emit the light corresponding to the predetermined selecting operation, and an infrared light emitting means for emitting infrared information that indicates a determination of the predetermined selecting operation, whereby the light emitting portion and the infrared light emitting means are configured to operate according to an operation state of the operation button, the electronic appliance further comprising an infrared sensor that senses the infrared information, and wherein the controller determines the predetermined selecting operation detected by the detector based on the infrared information indicating the determination of the predetermined selecting operation, sensed by the infrared sensor, and executes the control operation.

Also, preferably the on-hand control unit has a selfluminous means for emitting lights in light emission patterns corresponding to M (M is an integer of 1 or more) spatial frequency regions, and M frequency region selection buttons that correspond to the light emission patterns corresponding to M spatial frequency regions, the detector has a discriminating means for discriminating the light emission patterns corresponding to M spatial frequency regions, and the controller executes the control operation corresponding to a spatial frequency region discriminated by the discriminating means of the detector.

Also, preferably the on-hand control unit has a selfluminous means for emitting lights in N colors (N is an integer of 1 or more) in each of light emission patterns corresponding to M (M is an integer of 1 or more) spatial frequency regions, and M×N frequency/color region selection buttons that correspond to N colors in each of the light emission patterns corresponding to M spatial frequency regions, the detector has a discriminating means for discriminating M×N types of light emission states, and the controller executes the control operation corresponding to a light emission state discriminated by the discriminating means of the detector.

According to the electronic appliance of the present invention, compatibly flexibility and convenience of a remote control of the electronic appliance can be fulfilled, and the remote control can be operated in a darkroom, and also the convenience in use can be improved much more. Also, the operation of the electronic appliance by using a on-hand control unit can be simplified with the color selecting buttons, and the operability can be improved. In addition, a control operation selected by an operator can be determined without any fail in a short time if a sensor that senses infrared information from infrared light emitting means is used together.

Further, since light emission patterns in predetermined frequency regions can be employed, the operation of the on-hand control unit can be simplified much more, the operability can be improved, and the control operation selected by the operator can be made sure much more. Also, since the light emission patterns and the light colors can be combined with each other, operation contents executed by the on-hand control unit can be largely increased, and the operability can be improved.

The nature, principle and utility of the invention will become more apparent from the following detailed description when read in conjunction with the accompanying drawings.

BRIEF DESCRIPTION OF THE DRAWINGS

In the accompanying drawings:

FIGS. 15A through 15E show a configurative example of a universal remote controller used in a first embodiment of the present invention;

FIG. 24 shows another practical example of the universal remote controller;

FIG. 27 is a functional block diagram showing a control information determining unit (CPU) of FIG. 2;

FIG. 29 is a time chart showing a process of determining a selected operation button;

FIGS. 44A to 44D show a relationship among a position of the universal remote controller used in the third embodiment, a waveform of a video camera signal, and a spatial frequency;

FIGS. 49A and 48B show another design example of a 90-degree fan filter that has a pass band in the horizontal direction;

FIG. 53 shows a relation among the buttons on the screen of the television receiver, buttons of the universal remote controller used in the third embodiment, and the detectors;

FIGS. 59A-59C show a relation among the buttons on the screen of the television receiver, buttons of a universal remote controller used in a fourth embodiment, and the detectors; and FIG. 60 is a table showing combinations between frequencies allocated to the buttons of the universal remote controller used in the fourth embodiment and colors.

DESCRIPTION OF THE PREFERRED EMBODIMENTS

First Embodiment

A first embodiment of the present invention will be explained with reference to the drawings hereinafter.

Figure 1:
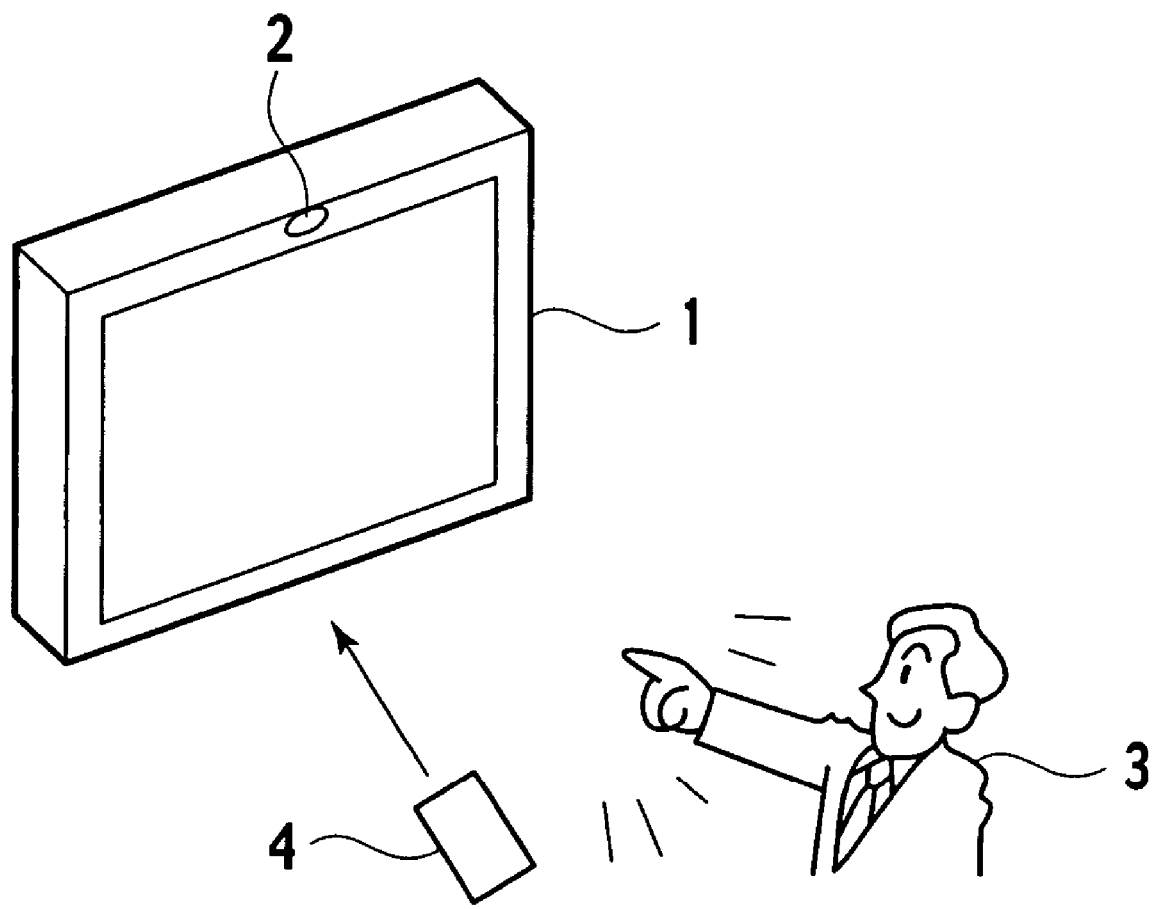
FIG. 1 roughly shows a method of controlling an electronic appliance according to the present invention.

FIG. 1 shows the difference between an operation using a remote controller according to a related art and an operation according to the present invention. A user (operator) 3 operates a television receiver 1. According to the related art, the user 3 must hold the remote controller 4, direct the remote controller 4 toward the television receiver 1, and push a key of required function on the remote controller 4.

On the other hand, the first embodiment provides the television receiver 1 with a video camera 2. The video camera 2 photographs the user 3. From the image provided by the video camera 2, an operation conducted by the user 3 is recognized and an operation corresponding to the recognized operation is carried out with respect to the television receiver 1 or any other device connected to the television receiver 1. The operation conducted by the user 3 may be a physical (hand, foot, face, or the like) motion to select a button in a menu displayed on the television receiver 1. In the first embodiment, a most practical way, i.e., a hand motion is employed to control the television receiver 1. If the ambient lighting of the television receiver 1 is dim, the similar effect to the action of the hand can be attained by using a remote controlling unit (on-hand controlling unit) having a selfluminous function. The remote controlling unit will be described in detail later.

Figure 2:
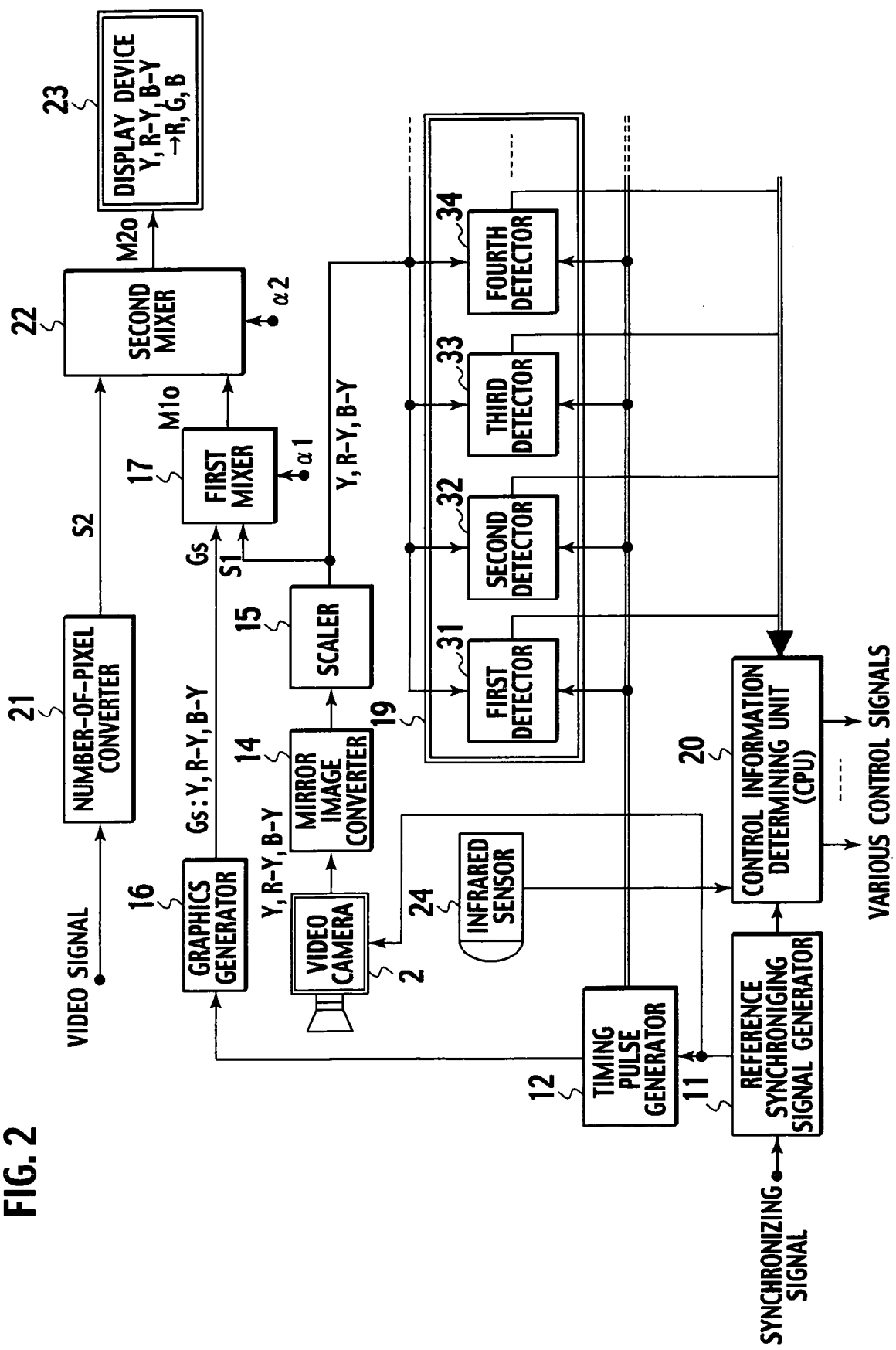
FIG. 2 is a block diagram showing a controller for controlling an electronic appliance (television receiver) according to an embodiment of the present invention.

FIG. 2 is a block diagram showing a television receiver 1 and a controller for controlling the same according to an embodiment of the present invention. The television receiver 1 has a reference synchronizing signal generator 11, a timing pulse generator 12, a graphics generator 16, a video camera 2, a mirror image converter 14, a scaler 15, a first mixer 17, a pixel converter 21, a second mixer 22, a display 23, a detector unit 19, an infrared sensor 24, and a control information determining unit (CPU) 20.

The reference synchronizing signal generator 11 generates horizontal periodic pulses and vertical periodic pulses as reference signals for the television receiver 1, based on input synchronizing signals. The synchronizing signals are horizontal and vertical synchronizing signals of the video signal input into the number-of-pixel converter 21. When receiving a television broadcasting signal or a video signal from an external device, the generator 11 generates pulses synchronized with a synchronizing signal of the input signal. The timing pulse generator 12 generates pulses having optional phases and widths in horizontal and vertical directions for the respective blocks of FIG. 2. The video camera 2 is arranged on the front side of the television receiver 1 as shown in FIG. 1 and photographs the user 3 or an object in front of the television receiver 1. The video camera 2 outputs a brightness (Y) signal and color difference (R–Y, B–Y) signals in synchronization with the horizontal and vertical periodic pulses provided by the reference synchronizing signal generator 11. According to the first embodiment, the number of pixels of an image photographed by the video camera 2 is equal to the number of pixels of the display 23. If they are not equal to each other, a pixel converter will be required.

The mirror image converter 14 horizontally inverts an image from the video camera 2 and provides a mirror image, which is displayed on the display 23. Accordingly, if the video camera 2 provides an image of a character, it is horizontally inverted like a character image reflected from a mirror. In the first embodiment, a mirror image conversion is executed by the approach to reverse the image in the horizontal direction using a memory. If the display 23 is a CRT (cathode ray tube), a horizontal deflecting operation may be reversely carried out to horizontally invert an image. In this case, other images or graphics to be mixed with an image from the video camera 2 must be horizontally inverted in advance.

The scaler 15 adjusts the size of the image photographed by the video camera 2. Under the control of the control information determining unit 20, the scaler 15 two-dimensionally adjusts an expansion ratio or a contraction ratio. Instead of expansion or contraction, the scaler 15 may adjust horizontal and vertical phases.

The graphics generator 16 forms a menu according to a menu signal transferred from the control information determining unit 20. If the menu signal is a primary color signal involving R (red), G (green), and B (blue) signals, the graphics generator 16 generates, from the primary color signal, a Y (brightness) signal and color difference (R-Y, B-Y) signals, which are synthesized or mixed with an image signal in a later stage. The number of planes of the generated graphics is optional. In the first embodiment, the number of planes is one. The number of pixels of the menu according to the first embodiment is equal to the number of pixels of the display 23. If they are not equal to each other, a pixel converter must be inserted to equalize them.

The first mixer 17 mixes an output signal Gs of the graphics generator 16 with an output signal S1 of the scaler 15 according to a control value $\alpha 1$ that controls a mixing ratio. The first mixer 17 provides an output signal M1o as follows:

$$M1o = \alpha 1 \cdot S1 + (1 - \alpha 1) \cdot Gs$$

The control value $\alpha 1$ is a value between 0 and 1. As the control value $\alpha 1$ increases, a proportion of the scaler output signal S1 increases and a proportion of the output signal Gs of the graphics generator 16 decreases. The mixer is not limited to the one explained above. The same effect will be achievable with any mixer that receives two systems of signal information.

The detector unit 19 consists of a first detector 31, a second detector 32, a third detector 33, a fourth detector 34, and the like. The number of the detectors contained in the detector unit 19 is not particularly limited but it is dependent on the number of push buttons contained in the menu generated by the graphics generator 16. Here, the push buttons resemble operation buttons that are displayed on a computer screen and are clicked with a mouse. The push buttons represent control operations, respectively.

The control information determining unit 20 analyzes data provided by the detector unit 19 and outputs various control signals. The control information determining unit 20 is a controller that controls various units according to the provided data. Operations of the control information determining unit 20 are carried out by software. Algorithms of the software will be explained later. To carry out various operations, the first embodiment employs hardware (functional blocks) and software (the CPU in the control information determining unit 20). Classification of operations into hardware and software of this embodiment does not limit the present invention.

The number-of-pixel converter 21 executes the number-of-pixel conversion to equalize the number of pixels of an input video signal with the number of pixels of the display 23. The input video signal is a video signal as a broadcasting television signal (including a data broadcasting signal) received by a built-in tuner (not shown), or a video signal such as the video (VTR) input or the like coming from the outside of the television receiver 1. Horizontal and vertical synchronizing signals are extracted from the input video signal, although not shown herein, and then respective portions are synchronized with the horizontal and vertical synchronizing signals of the input video signal by the reference synchronizing signal generator 11.

The second mixer 22 has a function similar to that of the first mixer 17. The second mixer 22 mixes the output signal M1o of the first mixer 17 with an output signal S2 of the pixel converter 21 at a control value $\alpha 2$ that controls a mixing ratio. The second mixer 22 provides an output signal M2o as follows:

$$M2o = \alpha 2 M1o + (1 - \alpha 2) \cdot S2$$

The control value $\alpha 2$ is a value between 0 and 1. As the control value $\alpha 2$ increases, a proportion of the first mixer output signal M1o increases and a proportion of the pixel converter output signal S2 decreases. The mixer 22 is not limited to the one explained above. The same effect will be provided with any mixer that receives two systems of signal information in the first embodiment.

The display 23 may be a cathode ray tube (CRT), a liquid crystal display (LCD), a plasma display panel (PDP), a projection display, or the like. The display 23 may employ any proper display method. The display 23 receives a brightness signal Y and color difference signals R-Y and B-Y, converts them into R, G, and B primary color signals, and displays an image.

The infrared sensor 24 decodes a control signal emitted from the infrared remote controller and received by a light receiving portion thereof, and outputs the decoded information to the control information determining unit 20. The control information determining unit 20 determines the control information (contents operated by the user 3) according to the information emitted from the infrared remote controller and the information supplied from the detector unit 19.

Figure 3:
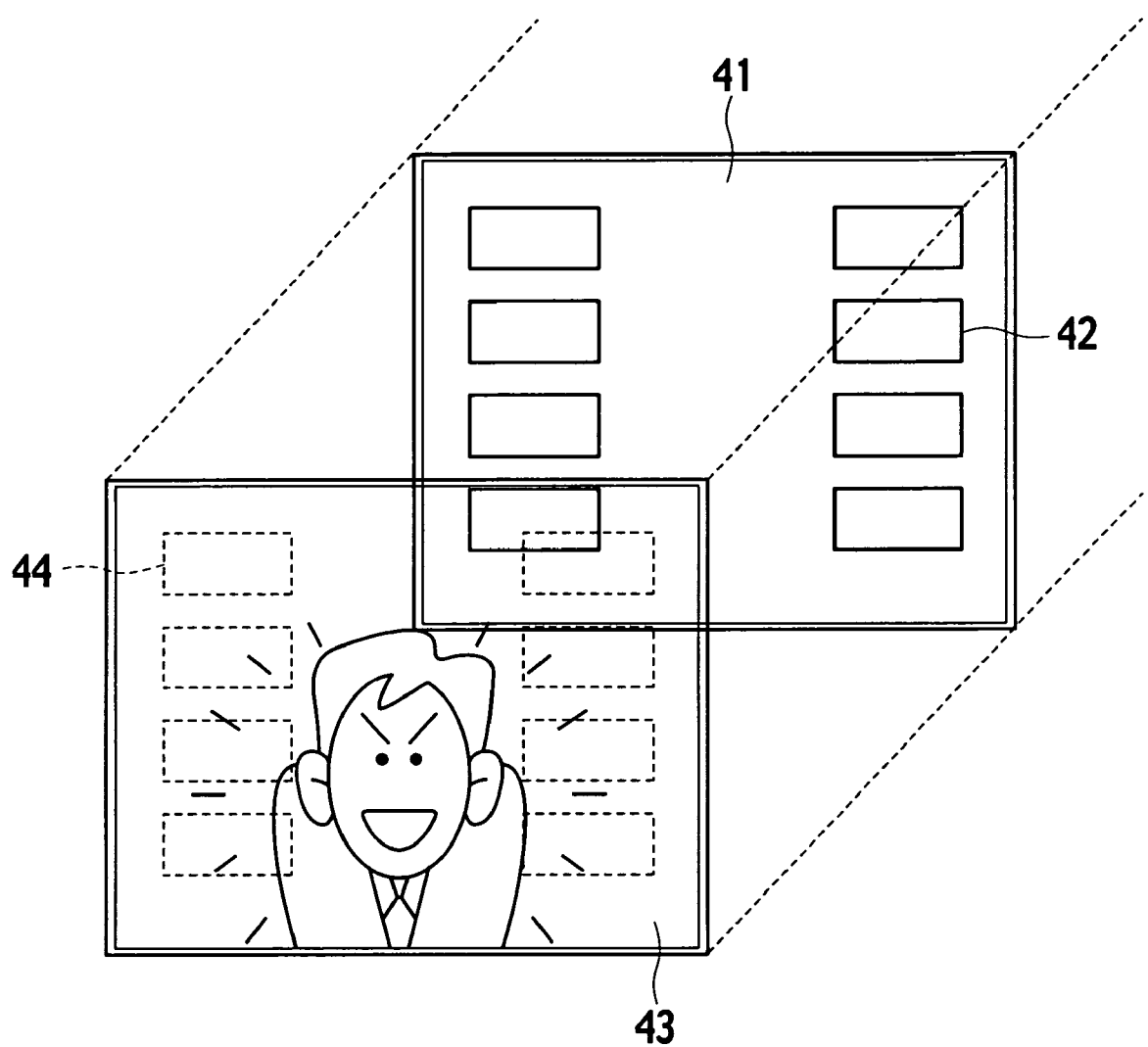
FIG. 3 shows an image of an operator and an operational image.

Operation of the television receiver 1 having the above-mentioned structure, as well as operation conducted by a user will be explained. FIG. 3 shows a graphics image 41 and a scaler output image 43. The scaler output image 43 is a mirror image of an image photographed by the video camera 2. The number of pixels of the scaler output image 43 is equalized with the number of pixels of the graphics image 41 through a scaling process. Signals representative of the images 41 and 43 are mixed in the first mixer 17. The graphics image 41 provides a menu on which the user performs a control operation. Each square 42 in the graphics image 41 is a push button (operation button). The scaler output image 43 is a mirror image of the user photographed by the video camera 2. In the scaler output image 43, each square 44 depicted with a dotted line represents a detection area of the detector unit 19 composed of the detectors 31-34, and the like. The squares 44 in the scaler output image 43 are arranged at the same positions as the push buttons 42 in the graphics image 41.

Figure 4:
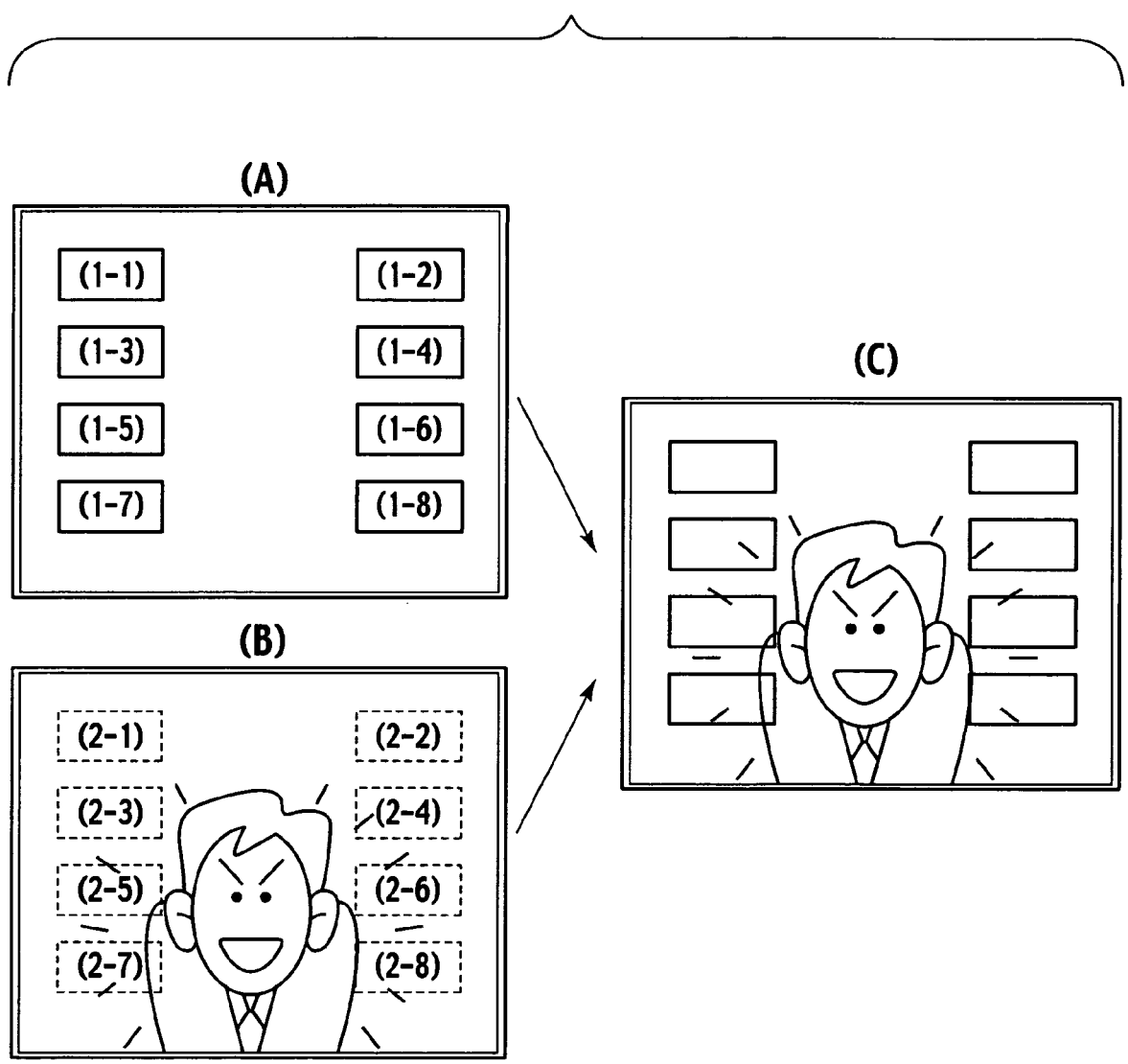
FIG. 4 shows the overlaying (mixing) of an operator's image and an operational image.

FIG. 4 shows a mixing process carried out in the first mixer 17. In FIG. 4, an image (A) shows the control menu generated by the graphics generator 16. The menu includes push buttons (1-1) to (1-8). An image (B) of FIG. 4 is the user's image that has been photographed by the video camera 2, mirror-converted, and scaled. The user's image (B) includes detection areas (2-1) to (2-8) corresponding to the detectors of the detector unit 19, respectively. An image (C) of FIG. 4 is an image formed in the first mixer 17 by mixing the images (A) and (B) with a control value $\alpha 1$ representing a mixing ratio. In proportion to the control value $\alpha 1$, the brightness and contrast of the image (C) becomes lower than those of the image (B).

The user's mirror image and control menu are overlaid and are displayed on the display 23. As a result, the user 3 can observe each motion of the user on the control menu (the push buttons (1-1) to (1-8)) displayed on the display 23. To conduct a control operation to the television receiver 1, the user 3 watches the display 23 and moves the hand (body) of the user so as to touch a target one of the push buttons (the push buttons (1-1) to (1-8)) displayed on the display 23. Namely, the user moves his or her hand onto one of the displayed push buttons and conducts a control operation. Although such an expression is used here that the user 3 touches the push buttons (1-1) to (1-8), this expression does not signify that the user 3 actually touches the screen. This expression signifies that the video image of the user 3 displayed on the display 23 touches the push buttons (1-1) to (1-8) by holding the user's hand toward the positions corresponding to the push buttons (1-1) to (1-8). In other words, the television receiver 1 is controlled when the user 3 takes an action to position the image of the user's hand on the pushbuttons (1-1) to (1-8) while looking at the display 23.

Pushing any push button is detected by detecting the hand in any of the detection areas (2-1) to (2-8) corresponding to the push buttons (1-1) to (1-8). Then, the control information determining unit 20 outputs a control signal corresponding to a control operation assigned to the push button manipulated by the user 3. At this time, the push button in question may be displayed in a different shape and/or a different color, to indicate that the user's operation has been recognized. For example, the pushed push button may be changed into a pushed shape.

Figure 5:
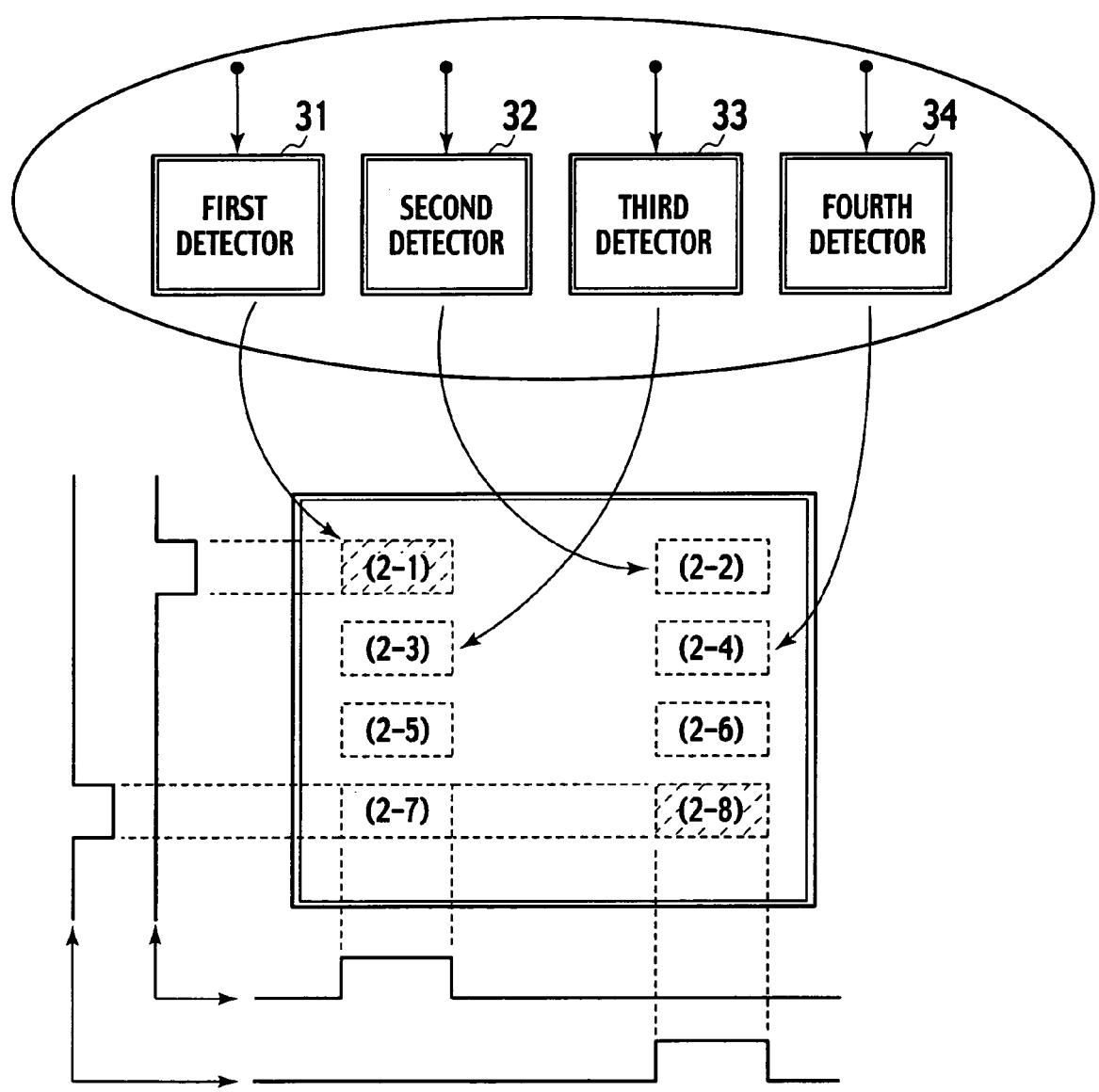
FIG. 5 shows relationships between detectors shown in FIG. 2 and detected areas on a display.

FIG. 5 shows relationships between the detection areas (2-1) to (2-8) set in the image from the video camera 2 and the detectors 31 to 34 in the detector unit 19. FIG. 5 also shows horizontal and vertical timing pulses to identify the detection areas (2-1) and (2-8).

Figure 6:
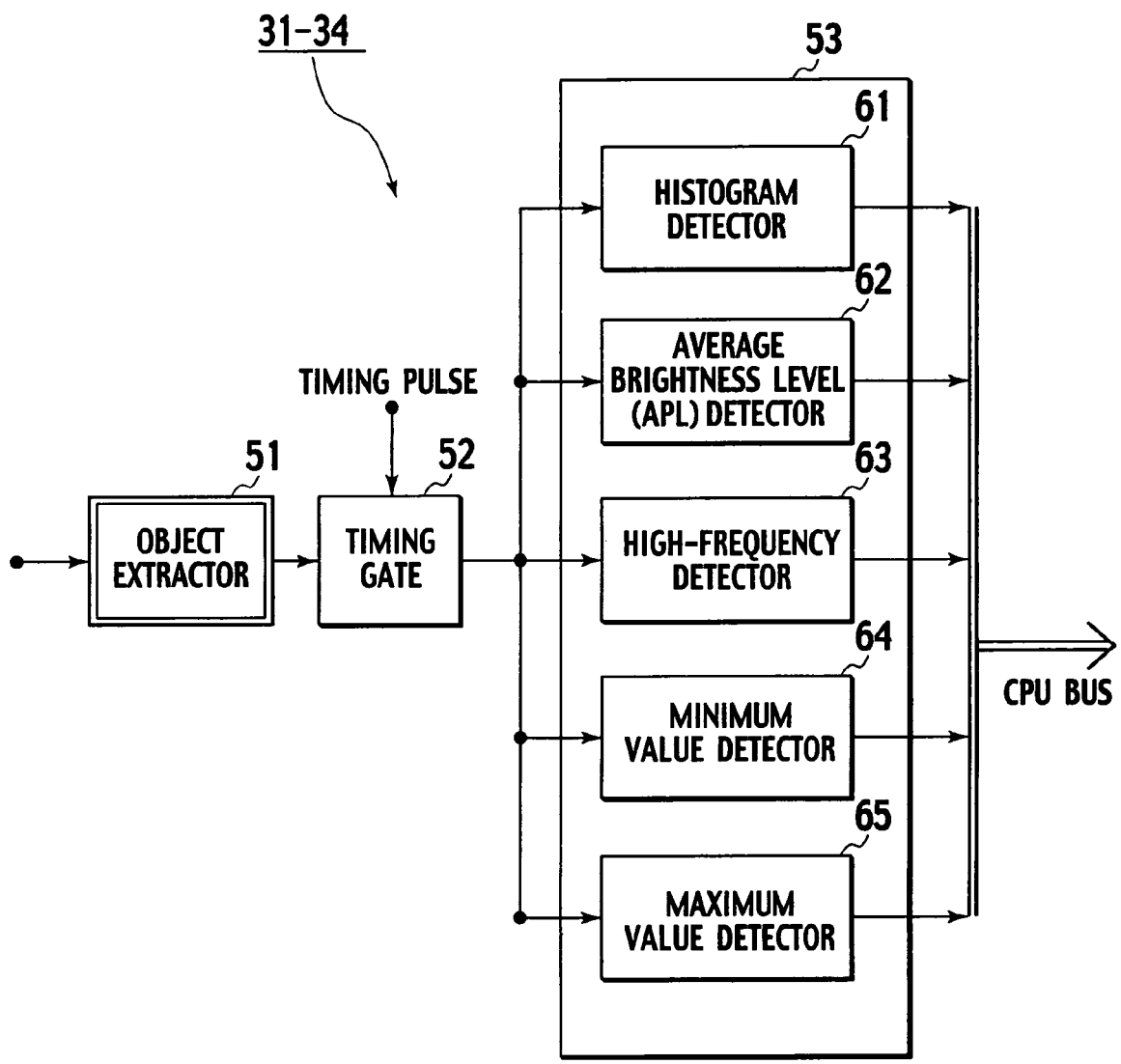
FIG. 6 is a block diagram showing one of the detectors shown in FIG. 2.

FIG. 6 shows the details of one of the detectors 31 to 34. The detector has an object extractor 51, a timing gate 52, and an object characteristic detector 53. The timing gate 52 controls the passage of an image signal from the video camera 2 according to the timing pulses shown in FIG. 5. A portion of the image signal the timing gate 52 passes is a detection area ((2-1) to (2-8)) indicated with a dotted square in FIG. 5. The signals defined and specified by the detection area ((2-1) to (2-8)) are subjected to various filtering processes to extract the hand of the user photographed by the video camera 2.

Figure 7:
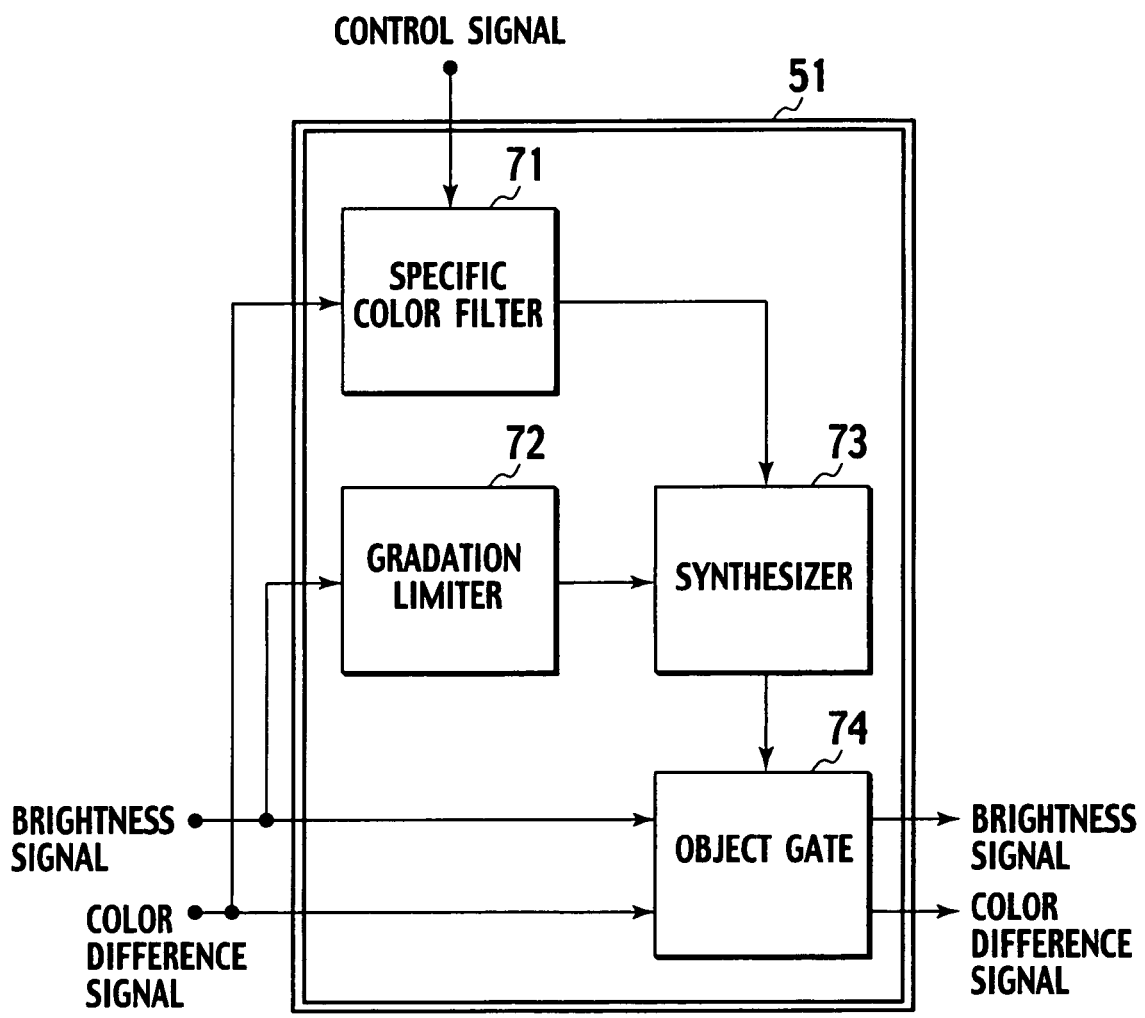
FIG. 7 is a block diagram showing an object extractor of FIG. 6.
Figure 8:
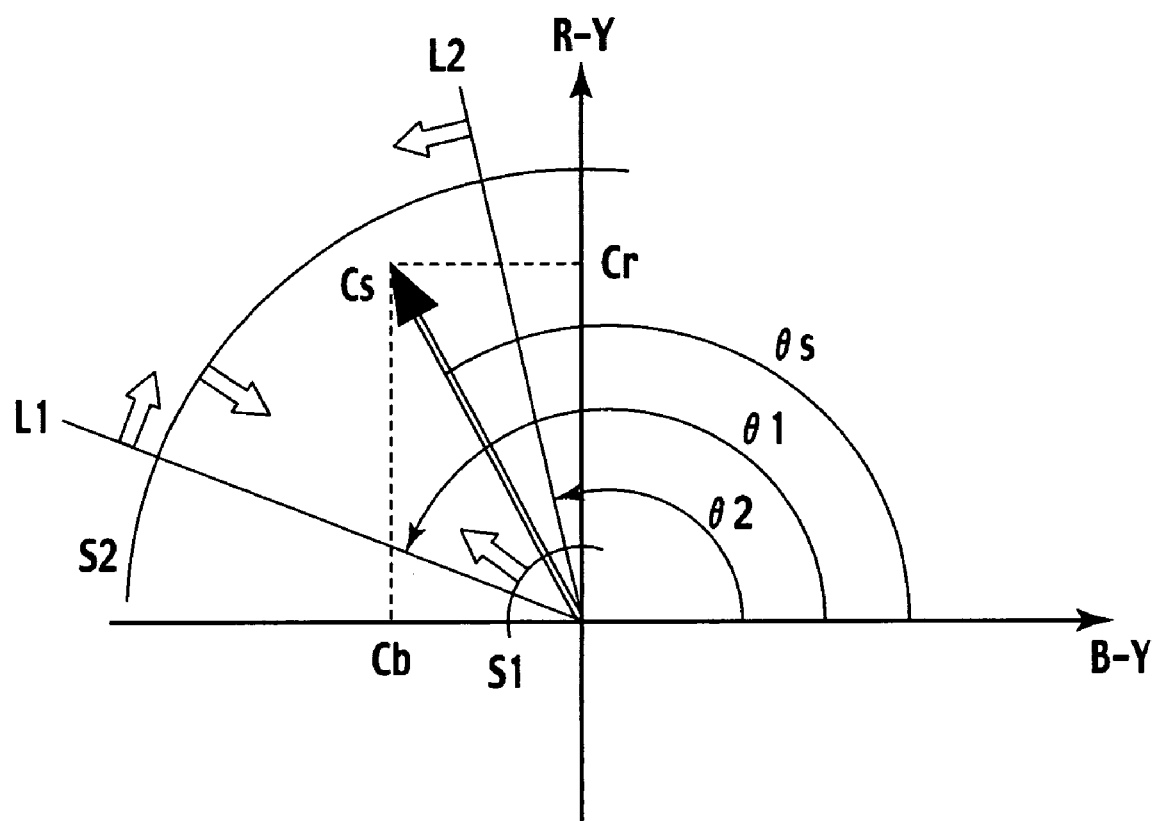
FIG. 8 shows the hue and degree of saturation of an object to be extracted by the object extractor.

The object extractor 51 has a filter suitable for filtering the characteristics of an objective image. According to the first embodiment, the object extractor 51 detects the hand of the user 3 by filtering a skin color. FIG. 7 shows the details of the object extractor 51. The object extractor 51 has a specific color filter 71, a gradation limiter 72, a synthesizer 73, and an object gate 74. The specific color filter 71 will be explained with reference to FIG. 8 that shows a color difference plane with an ordinate representing an R−Y axis and an abscissa representing a B−Y axis. Every color signal in television signals is expressible with a vector on coordinates of FIG. 8 and can be evaluated from polar coordinates. The specific color filter 71 limits the hue and color depth (degree of saturation) of a color signal consisting of color difference signals. In FIG. 8, a hue is expressed with a left-turn angle with the B−Y axis in the first quadrant serving as a reference (zero degrees). The degree of saturation is a scalar quantity of a vector. The origin of the color difference plane has a saturation degree of 0 with no color. The degree of saturation increases as it separates away from the origin, to increase the depth of color.

In FIG. 8, the specific color filter 71 passes a hue that falls in a range smaller than an angle of θ1 that defines an equal hue line L1 and larger than an angle of θ2 that defines an equal hue line L2. Also, the specific color filter 71 passes a color depth that falls in a range smaller than an equal saturation degree line S2 and larger than an equal saturation degree line S1. This range in the second quadrant corresponds to a skin-color range, i.e., the color of a hand to be extracted according to this embodiment. This, however, does not limit the present invention. The specific color filter 71 detects whether or not color difference signals (R−Y, B−Y) from the video camera 2 are within the range surrounded by the equal hue lines and equal saturation degree lines. To achieve this, an angle and a degree of saturation must be calculated from the color difference signals.

Figure 9:
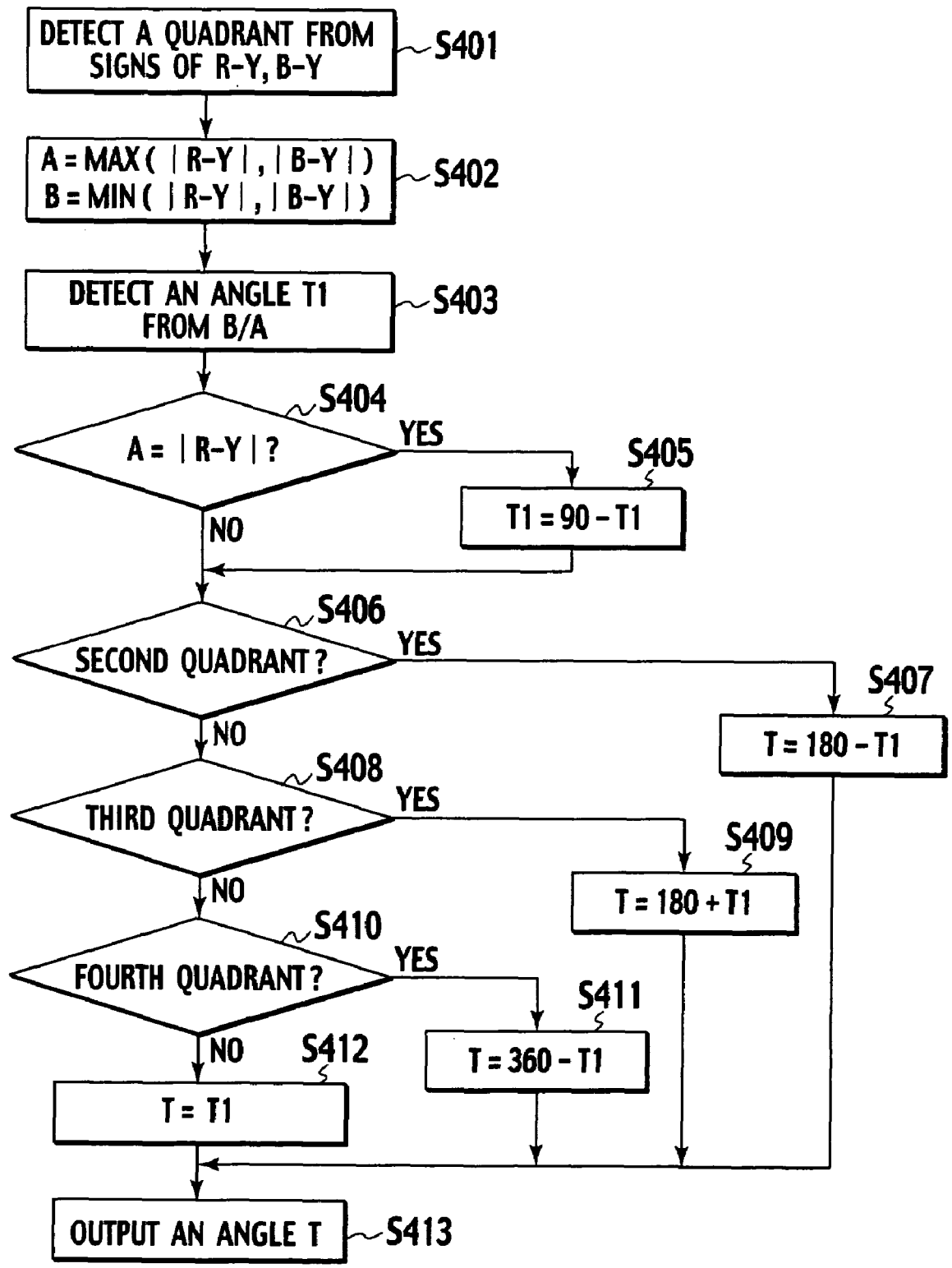
FIG. 9 is a flowchart showing a process of computing a hue from color difference signals.

The angle calculation is carried out as shown in FIG. 9. Steps shown in FIG. 9 calculate, for each input pixel, an angle formed in the color difference plane of FIG. 8. The angle calculation steps shown in FIG. 9 may be realized by software or hardware. According to the first embodiment, the steps of FIG. 9 are realized by hardware. In FIG. 9, step S401 refers to the signs of color difference signals R−Y and B−Y of each input pixel and detects a quadrant in the color difference plane where the hue of the input pixel is present. Step S402 finds a larger one of the absolute values of the color signals R−Y and B−Y as A and a smaller one thereof as B.

Step S403 detects an angle T1 from B/A. As is apparent in step S402, the angle T1 is within the range of 0° to 45°. The angle T1 is calculable from a broken line approximation or a ROM table. Step S404 determines whether or not A is equal to |R−Y|, i.e., whether or not |R−Y|>|B−Y|. If |R−Y|>|B−Y| is not true, step S406 is carried out. If |R−Y|>|B−Y| is true, step S405 replaces the angle T1 with (90−T1). Then, $\tan^{-1}((R-Y)/(B-Y))$ is calculated.

The reason why step S403 sets the range of 0° to 45° for detecting the angle T1 is because the inclination of the curve $\tan^{-1}((R-Y)/(B-Y))$ sharply increases to such an extent that is improper for the angle calculation.

Step S406 employs the quadrant data detected in step S401 and determines if it is the second quadrant. If it is the second quadrant, step S407 calculates T=180−T1. If it is not the second quadrant, step S408 determines whether or not it is the third quadrant. If it is the third quadrant, step S409 calculates T=180+T1. If it is not the third quadrant, step S410 checks to see if it is the fourth quadrant. If it is the fourth quadrant, step S411 calculates T=360−T1. If it is not the fourth quadrant, i.e., if it is the first quadrant, step S412 sets T=T1. At the end, step S413 outputs, for the pixel, the angle T in the color difference plane of FIG. 8.

With the steps mentioned above, an angle of input color difference signals R−Y and B−Y in the color difference plane is found in the range of 0° to 360°. Steps S404 to S412 correct the angle T1 detected in step S403 to an angle T. Steps S404 to S411 correct the angle T1 according to a proper one of the first to fourth quadrants.

A color depth or a saturation degree is calculated as follows:

$$Vc=\text{sqrt}(Cr \times Cr + Cb \times Cb)$$

where Cr is an R−Y axis component of a color signal and Cb is a B−Y axis component, as shown in FIG. 8. "sqrt( )" is an operator to calculate a square root.

This process may be carried out by software or hardware. The multiplication and square root operations are difficult to realize by hardware and involve a large number of steps if realized by software. Accordingly, the above-mentioned process may be approximated as follows:

$$Vc=\max(|Cr|,|Cb|)+0.4\times\min(|Cr|,|Cb|)$$

where max(|Cr|, |Cb|) is an operation to select a larger one of |Cr| and |Cb|, min(|Cr|, |Cb|) is an operation to select a smaller one of |Cr| and |Cb|, and Vc is a scalar quantity of a vector to indicate a saturation degree in this embodiment.

Thereafter, it is evaluated whether or not the angle (hue) T and saturation degree Vc are within the range of equal hue line angles θ1 to θ2 and within the range of equal saturation angle (color depth) lines S1 to S2. The color filter 71 of FIG. 7 passes any signal that is within these ranges.

Figure 10:
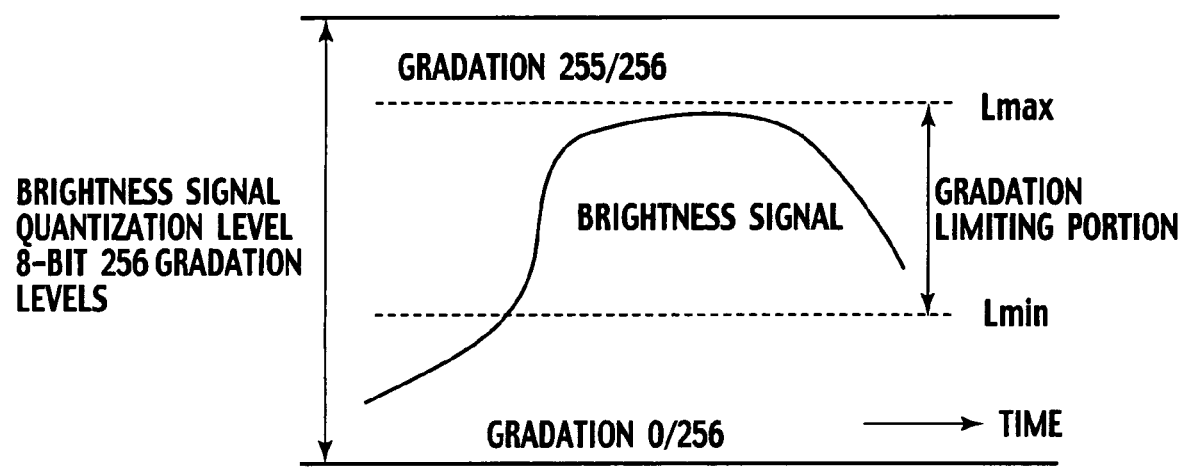
FIG. 10 shows a brightness signal level of an object to be extracted by the object extractor.

The gradation limiter 72 of FIG. 7 is to limit specific gradation levels in a brightness signal as shown in FIG. 10. In the case of an 8-bit digital signal, there are 256 gradation levels ranging from 0 to 255. To limit a range of gradation levels, a maximum level Lmax and a minimum level Lmin are set to pass a brightness signal within this range.

The synthesizer 73 receives signals from the color filter 71 and gradation limiter 72, synthesizes them to obtain an intraregional pulse. Namely, if there are both (AND) the signal passed through the specific filter 71 and signal passed through the gradation limiter 72, the synthesizer 73 provides a high-level pulse.

The intraregional pulse from the synthesizer 73 is supplied to the object gate 74. If the intraregional pulse is at high level, the object gate 74 passes the brightness signal and color difference signals. If the intraregional pulse is at low level, the object gate 74 blocks the input signals and outputs signal of predetermined values. According to the first embodiment, the signals of predetermined values are a black-level brightness signal and color difference signals of saturation degree of zero.

The color filter 71 limits the hue (angle) and saturation degree of a color signal, and the object extractor 51 further limits the signal from the color filter 71 according to the level of a brightness signal. When selecting a skin color, the color filter 71 may limit the hue and saturation degree of a color signal. The skin color, however, varies depending on, for example, tanned states or races. To cope with various skin colors, the embodiment adjusts the range of hues, the range of saturation degrees, and the range of gradation levels, according to the control signal input into the specific color filter 71, thereby detecting a human hand. If the hues, the saturation degrees, and the gradation levels are adjusted appropriately, the human hand can be discriminated from portions except the human hand by optimizing parameters.

Figure 11:
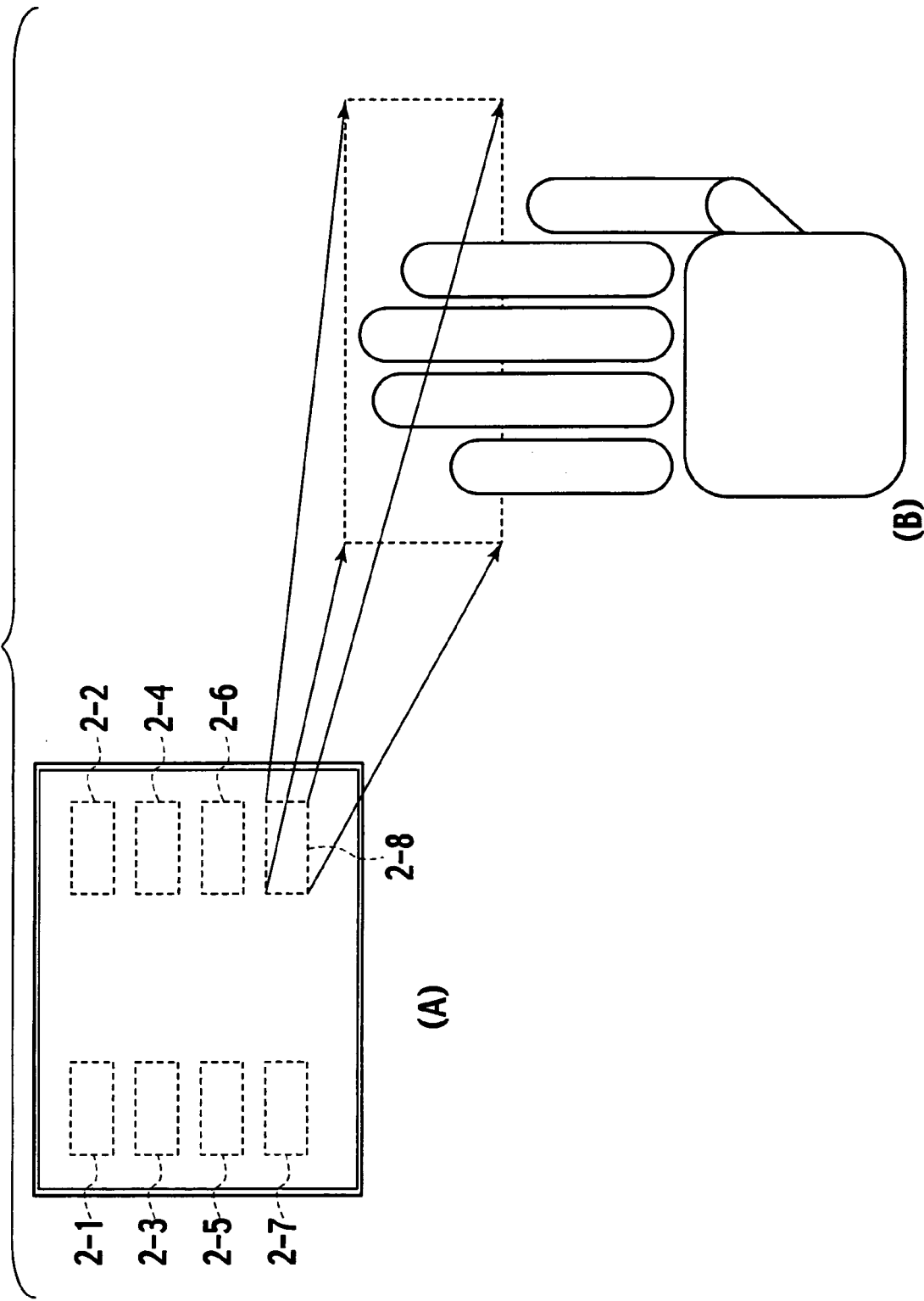
FIG. 11 shows a hand and a displayed operation menu having operation buttons one of which is pointed with the hand.
Figure 12:
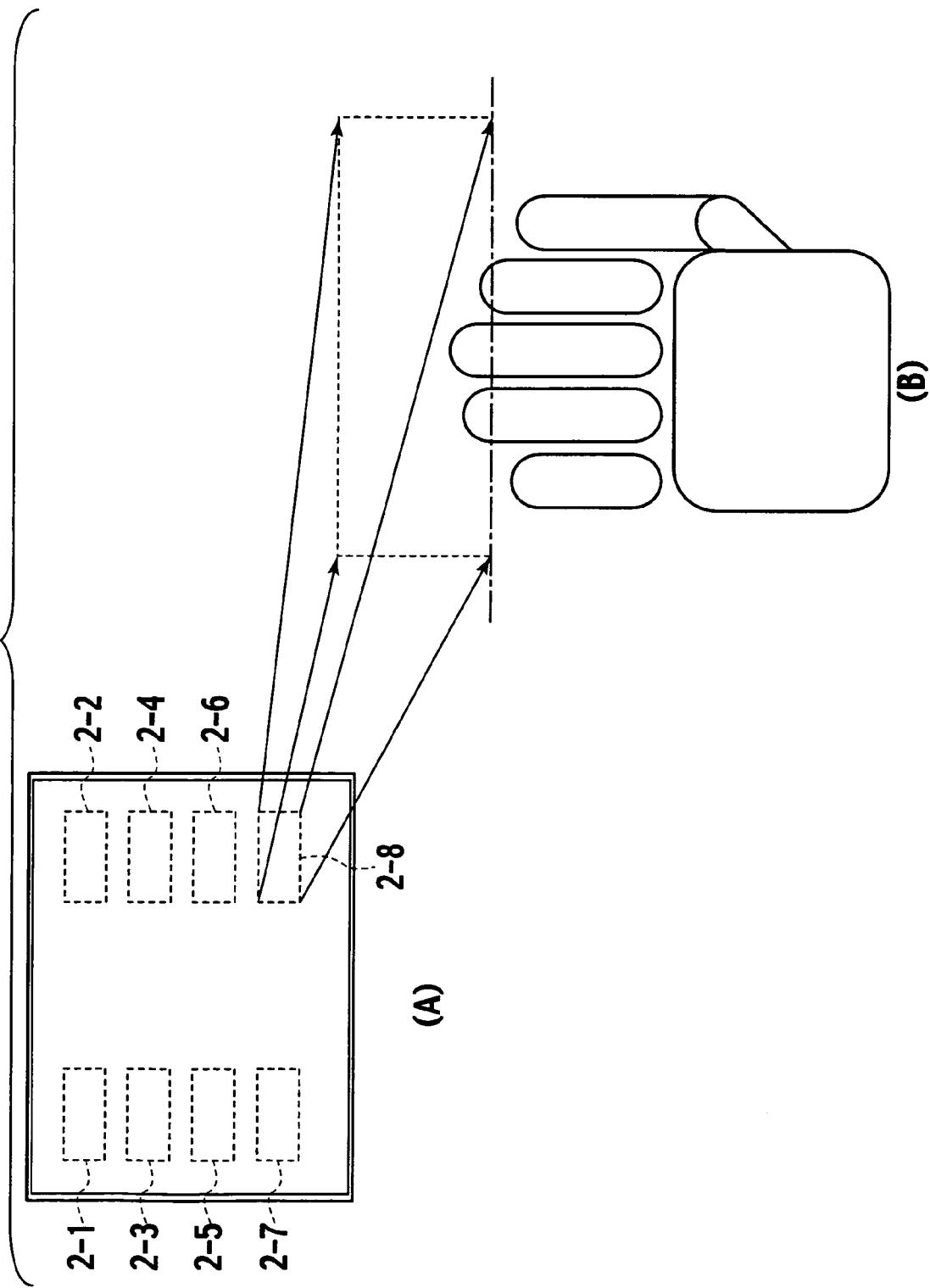
FIG. 12 shows the hand and operation menu of FIG. 11, the fingers of the hand being bent on the one operation button.

Each image (A) in FIGS. 11 and 12 shows an image provided by the video camera 2 and the detection areas (2-1) to (2-8) set in the image and shown by dotted lines. According to the first embodiment, the user 3 holds a hand against any of the detection areas (2-1) to (2-8) corresponding to the push buttons (1-1) to (1-8), and motions of the hand are detected as control information. Each image (B) in FIGS. 11 and 12 shows a motion of the hand of the user. The image (B) of FIG. 11 shows that the user 3 holds his or her hand against the detection area (2-8) corresponding to the push button (1-8) with the hand extended. The image (B) of FIG. 12 shows that the user 3 bends the fingers of the hand. According to the first embodiment, bending fingers twice is recognized as pressing any push button ((1-1) to (1-8)). This, however, does not limit the present invention. For example, only holding a hand against a push button ((1-1) to (1-8)), or bending fingers once, or thrice, or more may be recognized as pressing a push button ((1-1) to (1-8)).

With reference to the images (A) and (B) of FIG. 13, a hand operation will be explained along a time axis. A period Tm is a period between a finger extended state and a finger bent state. For the sake of clarity of explanation, (A) and (B) of FIG. 13 employ the period Tm as a minimum time unit and sets time points T0, T1, T2, and the like along the time axis.

Figure 13:
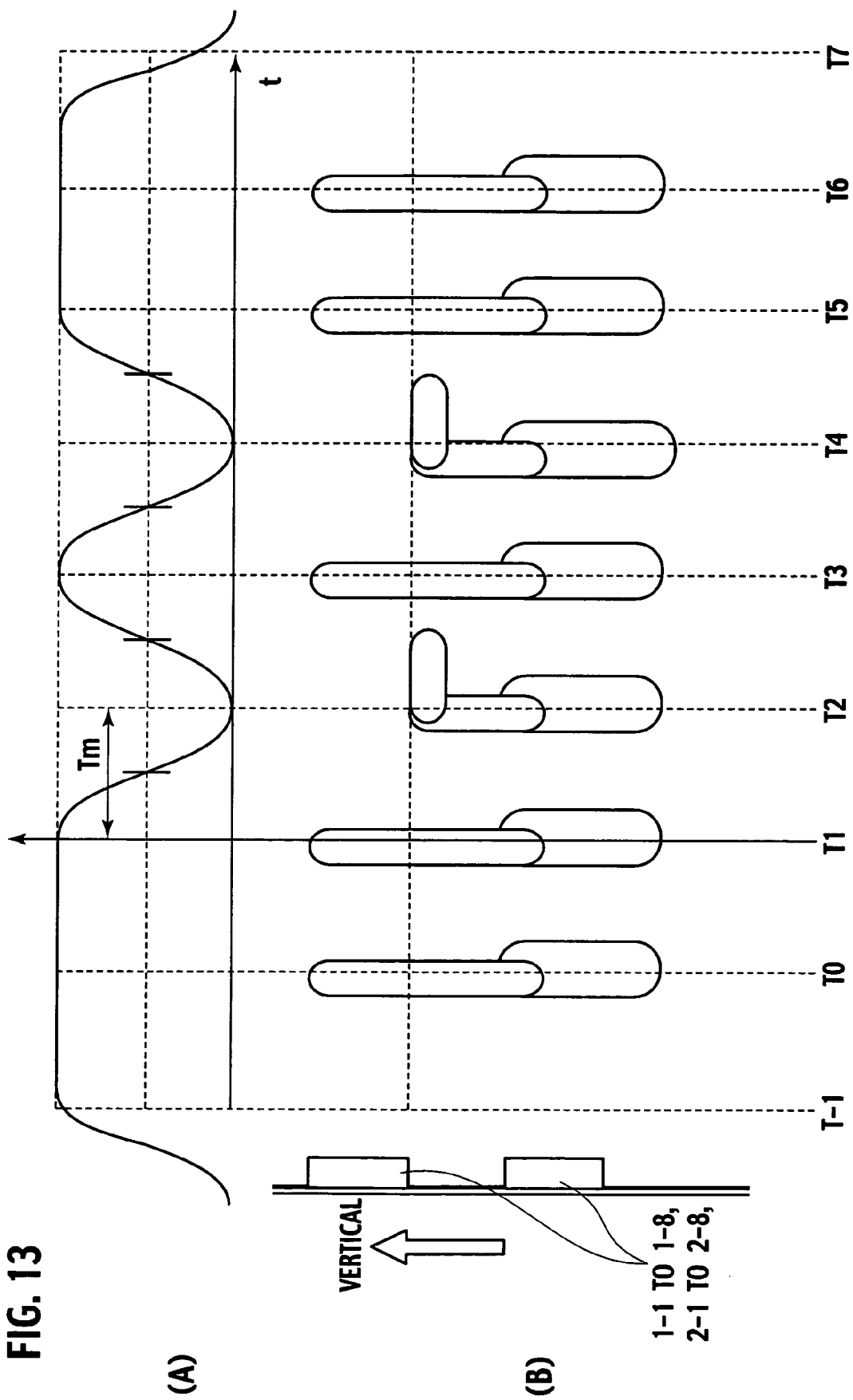
FIG. 13 is a time chart showing changes in the shape of a displayed hand when the fingers of the hand are bent twice.

(B) of FIG. 13 shows conceptually a part of the push buttons (1-1) to (1-8) or the detection areas (2-1) to (2-8) on the left end portion.

At time T-1, no hand is held against the display 23. At time T0, the user holds a hand over a target push button. From time T1, the user keeps the hand holding state for the period Tm. At time T2, the user bends the fingers of the hand. At time T3, the user extends the fingers. At time T4, the user again bends the fingers. At time T5, the user again extends the fingers. From time T6, the user keeps the finger extended state for the period Tm. At time T7, the user withdraws the hand.

These are hand motions carried out on the push buttons (1-1) to (1-8). A waveform depicted in (A) of FIG. 13 shows changes in the area of a projected image of the hand on the push button depicted as a model in (B) of FIG. 13. The action of the hand can be specified by analyzing this waveform.

Figure 14B:
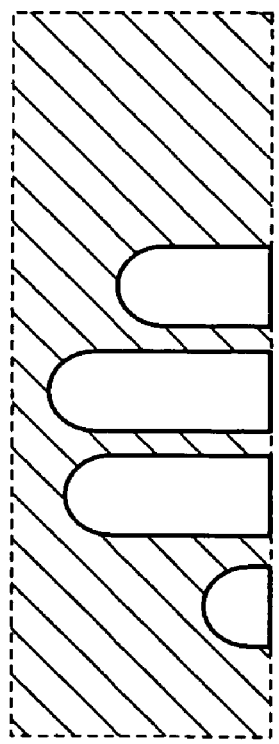
FIGS. 14A and 14B each show a hand overlaid on an operation button.
Figure 14A:
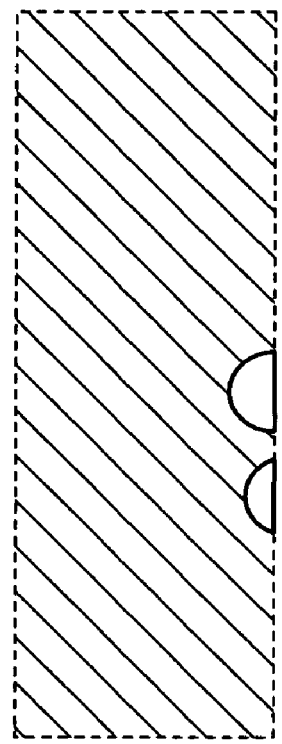

FIGS. 14A and 14B show images formed from output signals of the object extractor 51. The timing gate 52 passes a push button area ((1-1) to (1-8)) in the signals from the object extractor 51 and blocks the other area. Each signal supplied to the timing gate 52 has a color filtered through the specific color filter 71 that passes only a skin color. Each signal supplied to the timing gate 52 is also limited in gradation levels by the gradation limiter 72. Namely, each signal to the timing gate 52 represents a limited area with the remaining area being colored black (a brightness signal of zero and a color signal of zero). Based on the signals from the object extractor 51, the timing gate 52 limits a push button area, to provide an image containing a hand area and a black background area (hatched part) as shown in FIGS. 14A and 14B. FIG. 14A shows a finger extended state and FIG. 14B shows a finger bent state. Coloring an area other than the hand area black is to improve detecting accuracy of the detector unit 19 in later stages.

From FIGS. 14A and 14B, the characteristics of the image are detected. The object characteristic detector 53 of FIG. 6 has functional blocks to detect various characteristics in an image. Namely, the object characteristic detector 53 has a histogram detector 61, an average gradation level (average picture level (APL)) detector 62, a high-frequency detector 63, a minimum value detector 64, and a maximum value detector 65. There are other characteristics specific to a given image. According to the first embodiment, characteristic detected by the detectors 61 to 65 are used to identify a hand and recognize an operation carried out by the hand. In this case, it is preferable that all the histogram detector 61 to the maximum value detector 65 should be provided, but at least the histogram detector 61 should be provided since the finger action can be recognized only by the histogram detector 61, for example.

According to the first embodiment, the detectors 61 to 65 are made of hardware to generate the data representing respective features in the sensing areas (2-1) to (2-8) on the screen in unit of screen (field and frame unit: vertical period unit) and then send out the data to the control information determining unit 20 via a CPU bus. The control information determining unit 20 stores the data generated on the software by the detectors 61 to 65 in the variables, and executes a data processing described later.

The histogram detector 61 separates gradation levels into, for example, eight stepwise groups and counts the number of pixels belonging to each group and provides the control information determining unit 20 with the frequency of each group per field or frame. The APL detector 62 adds up gradation levels of each field or frame, divides the sum by the number of pixels, and provides the control information determining unit 20 with the average of the field or frame. The high-frequency detector 63 employs a spatial filter (two-dimensional filter) to extract high-frequency components, and provides the control information determining unit 20 with the frequencies of the high-frequency components per field or frame. The minimum value detector 64 provides the control information determining unit 20 with a minimum gradation level of a brightness signal of each field or frame. The maximum value detector 65 provides the control information determining unit 20 with a maximum gradation level of a brightness signal of each field or frame.

The control information determining unit 20 stores the received data in the variables, and executes a data processing by the software. The processes of detecting the action of the hand are carried out subsequently from here, but the processes are carried out subsequently from here by the software in the first embodiment.

In the meanwhile, the video from the video camera 2 is not clear in a condition that a room in which the television receiver 1 is placed is dark, i.e., in a darkroom, and thus there is a possibility that it is difficult to discriminate the action of the hand of the user 3. Therefore, in the first embodiment, in order to make the remote control possible firmly under various environments in which the general-use television receiver is used, a universal remote controller is used. This universal remote controller is the remote controller with versatility, which can solve the problem in a darkroom state and can be utilized to operate all devices that can cope with the networking. Also, the universal remote controller is the remote controller with a new concept, which has interchangeability with the action of the hand of the user 3 and is convenient in use and has flexibility in operation of various devices by expanding functions.

A configurative example of a universal remote controller 401 used in the first embodiment is shown in FIGS. 15A to 15E. FIG. 15A is a plan view showing a surface facing the user 3 who operates the universal remote controller 401, and FIG. 15B is a side view showing the same. The universal remote controller 401 has a main body 301 and a foldable cover 302. The closed cover 302 is shown in FIGS. 15A, 15B. A broken line in FIG. 15B shows the opened cover 302. The cover 302 has a rectangular light emitting portion 303 provided on a surface that is exposed when the cover 302 is closed, and circular light emitting portions 304 positioned at four corners of the light emitting portion 303. An achromatic or particular color button (referred to as a "specific color button" hereinafter) 310, an R button 311 colored in red, a G button 312 colored in green, a B button 313 colored in blue, a C button 314 colored in cyan color, a M button 315 colored in magenta color, and a Y button 316 colored in yellow are provided to the main body 301. The specific color button 310 is exposed when the cover 302 is opened. The buttons 311 to 316 are called a color selecting button.

FIG. 15C is a plan view showing a state that the cover is opened. FIG. 15D is a plan view showing a state that the cover is opened when viewed from the back side, and positions of the light emitting portions 303 and 304 on the back surface are shown. FIG. 15E is a side view showing a state that the cover is opened, and the cover is inclined at a slight angle. An arrow indicated in FIG. 15E shows conceptually a light emitted from the light emitting portions 303 and 304. When the buttons 319 to 316 are pushed in place of the action of the hand to emit the light while directing the light emitting portions 303, 304 of the universal remote controller 401 toward the television receiver 1, the operation contents can be discriminated since the light emitting portions 303, 304 are shot by the video camera 2.

Figure 16:
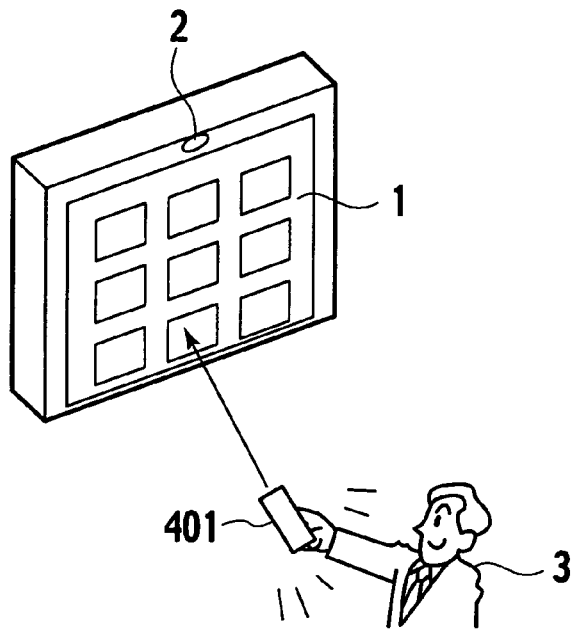
FIG. 16 shows an outline of an operation using the universal remote controller used in the first embodiment.

An operation of the universal remote controller 401 will be explained with reference to FIG. 16 hereunder. In FIG. 16, the nine push buttons are arranged in a 3×3 matrix. In place of the action of the hand, the universal remote controller 401 changes a light emitting state of the light emitting portion 303 to form the same waveform as that senses by the detector 19 based on the action of the hand. The user 3 moves the position of the universal remote controller 401 projected on the screen onto the push button depicted on the graphics, and then pushes the predetermined button of the universal remote controller 401 to cause the television receiver 1 to execute the function allocated to the push button.

Accordingly, the television receiver 1 can be operated by the remote controller so as to have the interchangeability with the action of the hand, and also the universal remote controller 401 can be utilized in a state close to the darkroom since such remote controller has a selfluminous function. Even when the universal remote controller 401 is moved, the user can recognize the position of the universal remote controller 401 because the light is emitted from the light emitting portions 303, 304. Display devices utilized in a TV screen, or the like as a light emitting device may be used for the light emitting portion 303 without provision of the light emitting portions 304, and then only the periphery of the light emitting portion 303 may be made luminous. In the following explanation, the push buttons on the menu are called the screen buttons and the push buttons of the universal remote controller 401 are called the remote controller buttons distinguishably.

Next, lighting contents of the light emitting portion 303 will be explained hereunder.

Figure 17:
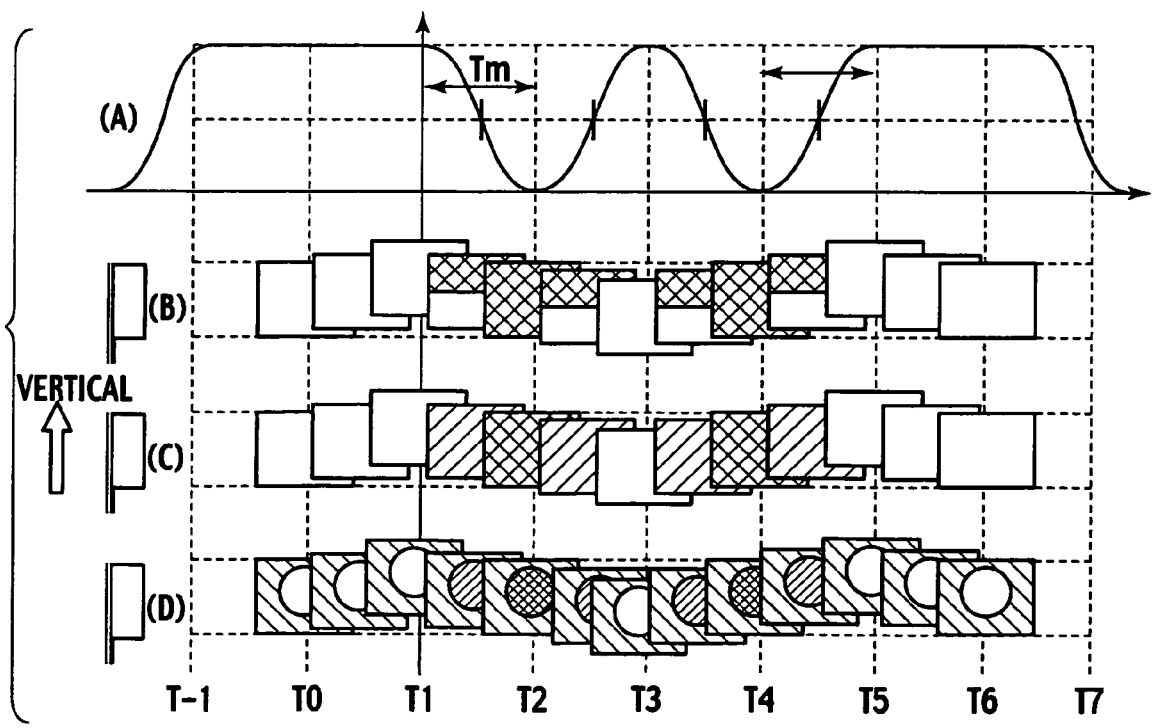
FIG. 17 is a time chart showing contents of light emissions of light emitting elements of the universal remote controller used in the first embodiment.

Waveform (A) in FIG. 17 is a waveform same as the waveform shown in (A) of FIG. 13, and represents a change of the projected area of the action of the hand, i.e., the sensed result of the APL detector 62 in FIG. 6. In (B), (C) and (D) of FIG. 17, an ordinate denotes the vertical direction of the screen and an abscissa denotes a lapse of time. Also, a quadrangular figure depicts schematically a shape of the light emission of the light emitting portion 303, and shows such a behavior that the light emission content is changed with the lapse of time. In FIG. 17, the crosshatching represents the lowest brightness and the hatching represents the intermediate brightness. Also, for convenience, changes of the quadrangular figures in each time are depicted to superpose with each other. In order to facilitate the understanding, the quadrangular figures are depicted to shift along the vertical direction bit by bit. When the user operates the universal remote controller 401, a displacement is somehow allowable.

Diagram (B) in FIG. 17 shows the case where the results sensed by the histogram detector 61 and the APL detector 62 in FIG. 6 are set to agree with the waveform in (A) of FIG. 17 by changing the area of the light emitting region of the light emitting portion 303. Diagram (C) in FIG. 17 shows the case where the average brightness sensed result is set to agree with the waveform in (A) of FIG. 17 by causing the overall light emitting portion 303 to emit the light and changing the gray level. Diagram (D) in FIG. 17 shows the case where the average brightness sensed result is set to agree with the waveform in (A) of FIG. 17 by changing a luminous intensity of the light emitting portion 303.

The light emitting device used in the light emitting portion 303 can change either the light emitting area or the luminous intensity (brightness). Various light emitting devices such as light bulb, light emitting diode (LED), LCD, electroluminescence element (EL), and the like or the light storage materials such as light storage paint, and the like can be employed. Also, the display device of the mobile phone or the personal digital assistance (PDA) having the similar light emitting function to these can fulfill a role of the universal remote controller 401 if the function of outputting the light corresponding to the waveform in (A) of FIG. 17 is provided. In this manner, either the remote controller dedicated to operate the television receiver 1 or the remote controller used commonly in other device such as the mobile phone, or the like may be used as the universal remote controller 401. Here, since the light emitting area and the luminous intensity themselves can be changed by the well-known technology, explanation of the particular configuration to change the light emitting area and the luminous intensity in the universal remote controller 401 will be omitted herein.

Next, a method of controlling the screen button based on a difference in luminous color that the user 3 selected after the kind of the luminous colors of the universal remote controller 401 is increased will be explained hereunder. This method senses with which color the luminous color of the universal remote controller 401 selected by the user 3 coincides, by using the specific color filters corresponding to different luminous colors of the universal remote controller 401 respectively after the constant-hue lines of the specific color filter 71 for passing only the color in the particular range on the color difference plane in FIG. 7 are adjusted. In the first embodiment, the luminous colors of the universal remote controller 401 are set to the skin color and six colors described as follows, but the number of colors is not limited to these six colors.

Figure 18:
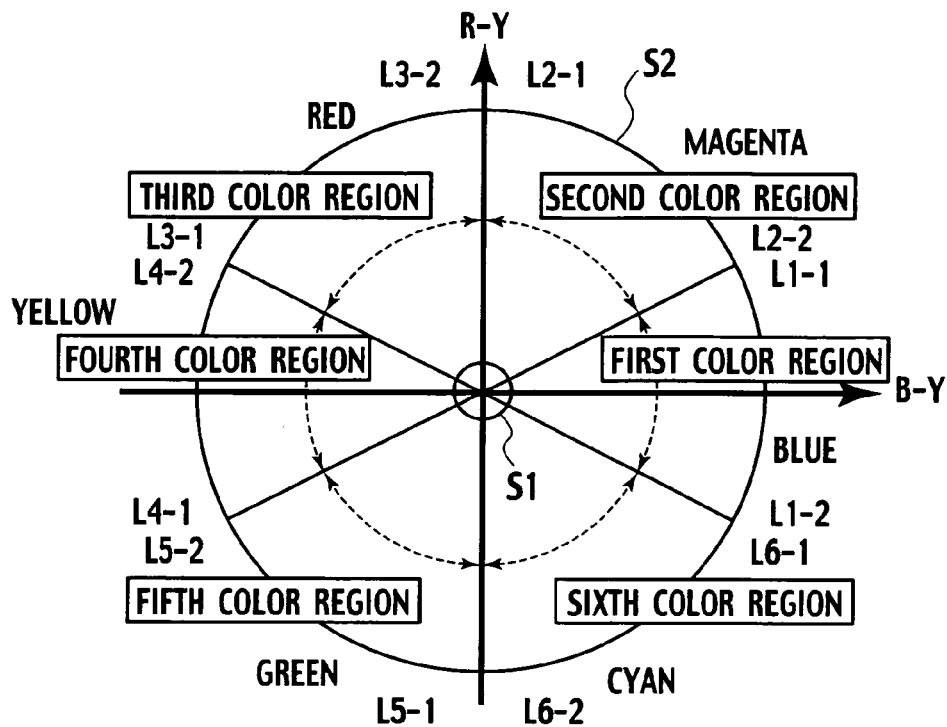
FIG. 18 is a color difference plan view explaining an example of a pass band of a color region filter.
Figure 19:
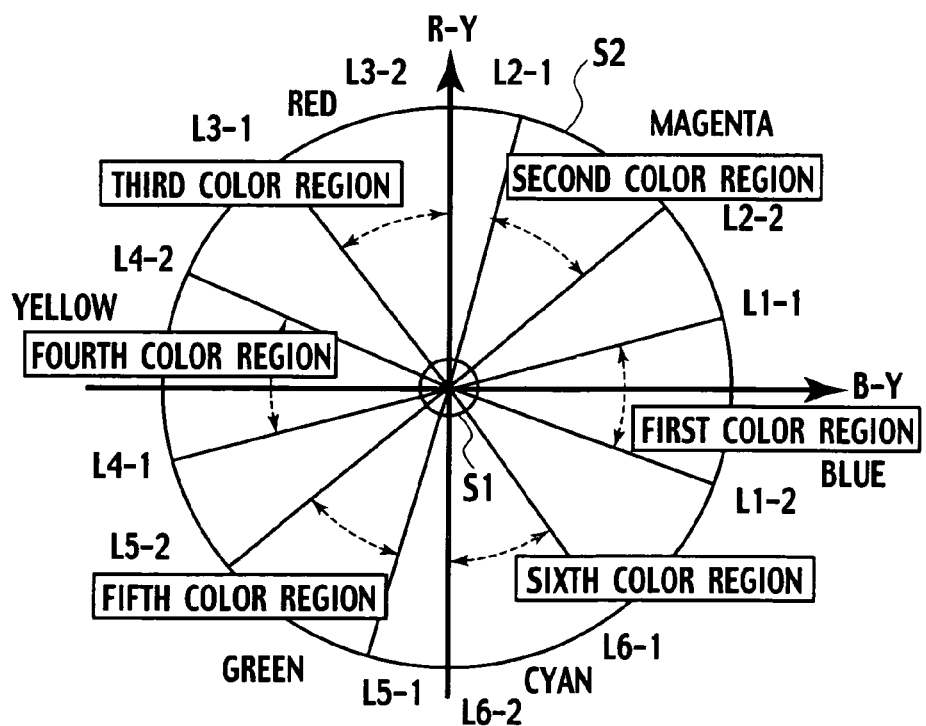
FIG. 19 is a color difference plan view explaining another example of a pass band of a color region filter.

FIG. 18 is a color difference plan view explaining an example in which a 360-degree plane is divided into six color regions at an equal interval. The first to sixth color regions correspond to blue, magenta, red, yellow, green, and cyan respectively. FIG. 19 is a color difference plan view explaining another example in which widths of the first to sixth color regions are narrowed respectively. If the light can be emitted in any color from the light emitting portion 303, the universal remote controller 401 can emit the light in predetermined color precisely, so that the pass band of the filter 71 can be set considerably narrowly in this manner. The pass band of the filter may be set to an appropriate width with regard to the possibility of the wrong detection due to the influence of the external light.

Figure 20:
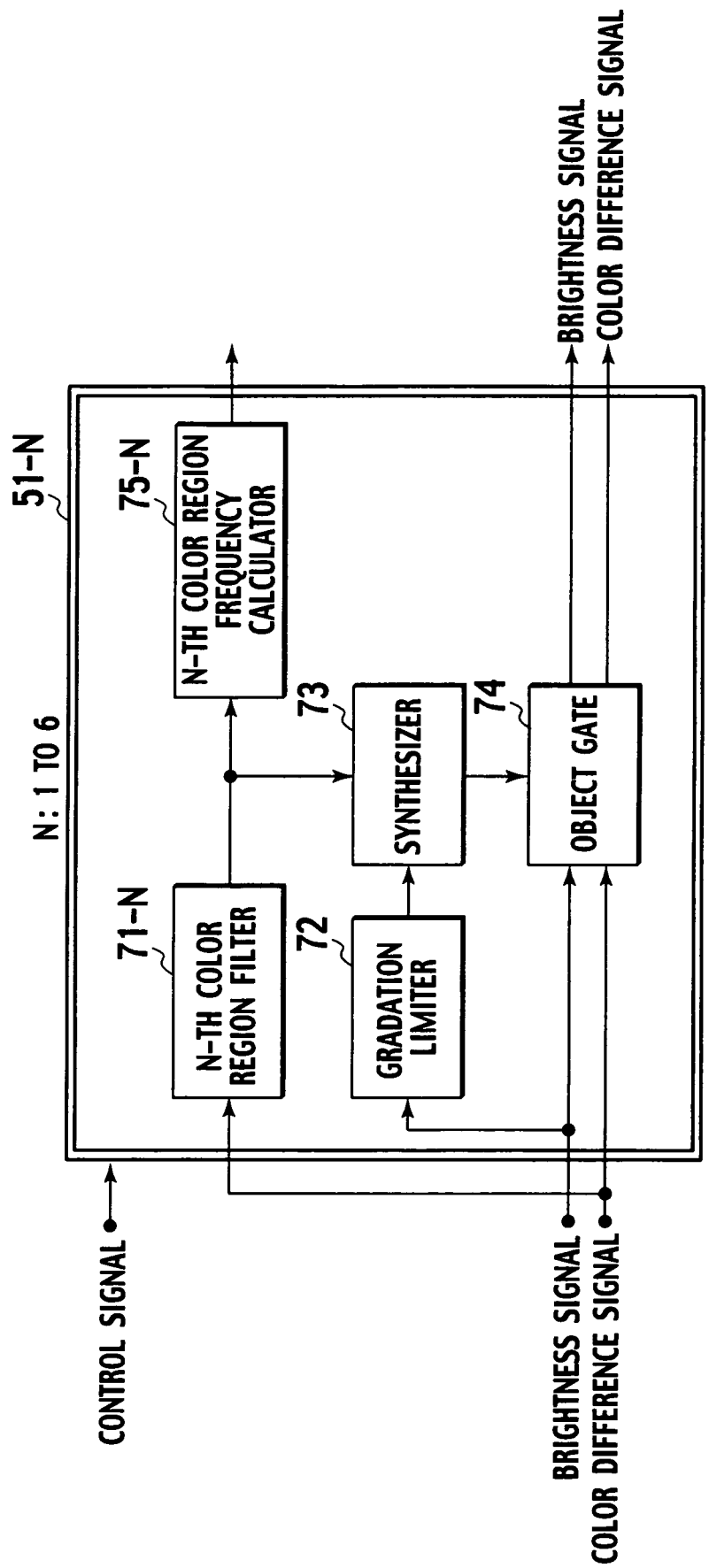
FIG. 20 is a block diagram showing a configuration of a color discrimination object extractor.

FIG. 20 is a block diagram showing a configuration of a color discrimination object extractor 51-N having a color discriminating function, which is developed from the object extractor 51 in FIG. 7. The specific color filter 71 of the object extractor 51 is changed to an N-th color region filter 71-N, and an N-th color region frequency calculator 75-N is added. The N-th color region frequency calculator 75-N is set to correspond to the N-th color region out of the six color regions shown in FIG. 19. Therefore, N is an integer from 1 to 6, and six object extractors 51-N are provided every color region.

The N-th color region frequency calculator 75-N counts up a counter (not shown) when an output of the N-th color region filter is 1 or when an output of the N-th color region filter is in excess of a particular value if the binary value is not used, and then outputs the frequencies at which the color difference signal in the N-th color region is input. This output is used in a process at a later stage to discriminate in what color the light is emitted from the universal remote controller 401. The input brightness signal and the color difference signals are gated by the object gate 74 based on an output of the synthesizer 73. The synthesizer 73 logically synthesizes the outputs of the N-th color region filter 71-N and the gradation limiter 72, and the process is executed herein by using the binary values of 1, 0 in the first embodiment. In place to this, the signal having the gradation in several bits may be arithmetically operated by the synthesizer 73 in response to the color saturation and the brightness level, and then gated by the object gate 74 in response to the gradation of the output of the synthesizer 73.

Figure 21:
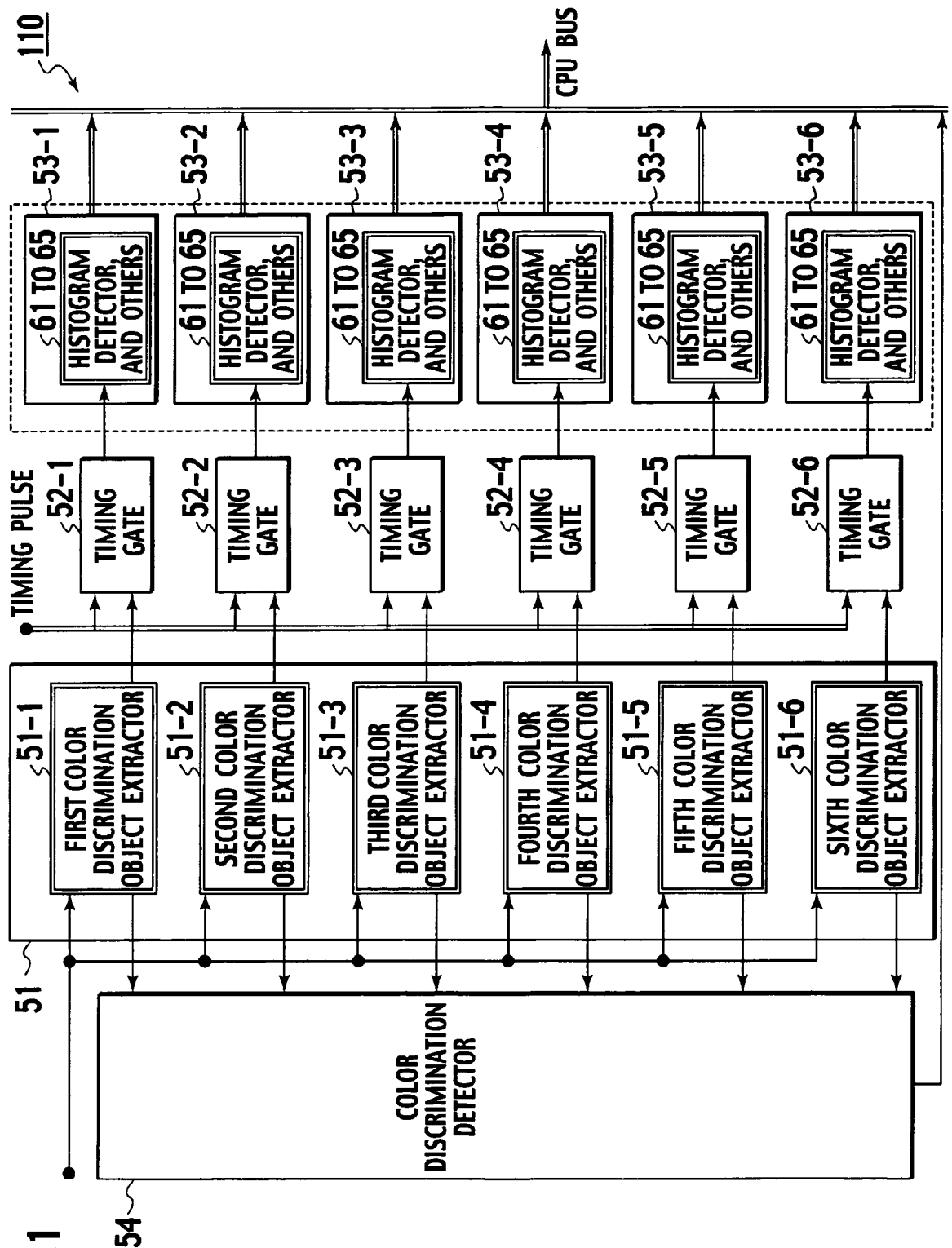
FIG. 21 shows a configuration of a detector containing the color discrimination object extractor.

FIG. 21 is a block diagram showing a configuration of a color discriminating detector 110. This color discriminating detector 110 is obtained by developing the configurations of the detectors 31 to 34 shown in FIG. 6 into a color discriminating configuration. This color discriminating detector 110 has first to sixth color discrimination object extractors 51-1 to 51-6, timing gates 52-1 to 52-6, object characteristic data detectors 53-1 to 53-6, and a color discrimination detector 54. An output of the object gate 74 in the N-th color discrimination object extractor 51-N (N: 1 to 6) corresponding to six different color regions respectively is input into the timing gate 52-N (N: 1 to 6), and an output of the N-th color region frequency calculator 75-N (N: 1 to 6) is input into the color discrimination detector 54. The color discrimination detector 54 calculates the maximum value of the frequency in each (N-th) color region. This is because the color of the light that the universal remote controller 401 emits to the screen button has the highest frequency. The color discrimination detector 54 transfers a value indicating a color region having the maximum value to the control information determining unit 20 via the CPU bus. The value indicating the color region supplied from the color discrimination detector 54 to the control information determining unit 20 acts as the information used when the control information determining unit 20 decides what color is effective, i.e., which screen button is effective and what content is to be controlled.

Since six timing gates 52-N discriminate the color region in the same screen button region, the output signals are gated at the same timing. The gated signal is output to the object characteristic data detector 53-N (N: 1 to 6) provided to every color region, and then the object characteristic data detector 53-N transfers the data such as the histogram, and the like to the control information determining unit 20. Since the control information determining unit 20 can decide which color region is effective based on the information input from the color discrimination detector 54, it supplies the data in one effective region from the object characteristic data detector 53-N to compensators 221 to 225 and operation detectors 201 to 205, which are provided in the control information determining unit 20 and described later.

Next, how the frequency in respective regions calculated by the N-th color region frequency calculator 75-N in the N-th color discrimination object extractor 51-N should be processed will be explained hereunder.

Figure 22:
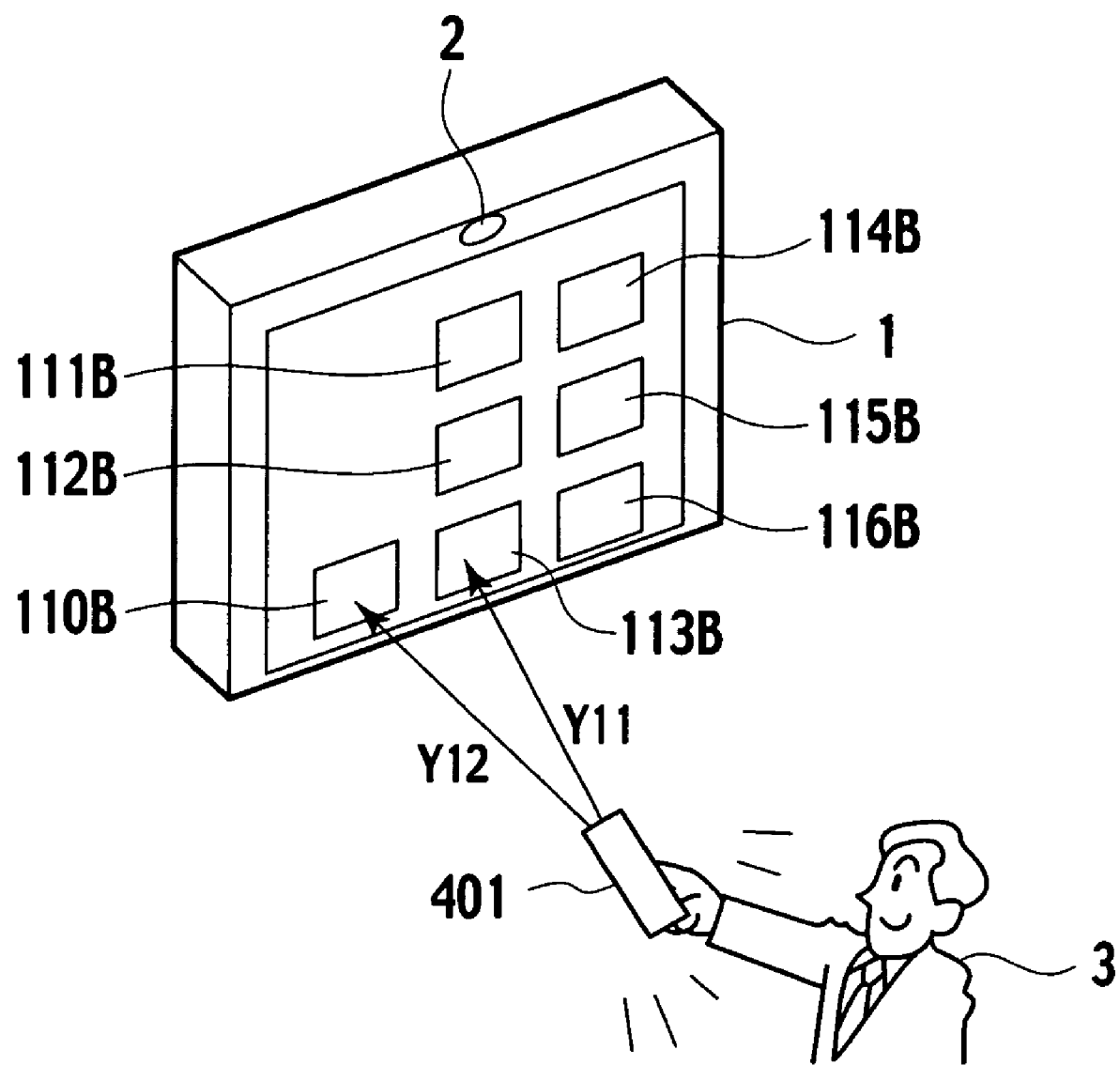
FIG. 22 shows an outline of the operation of the universal remote controller to use a color discriminating function.

FIG. 22 is a view explaining the operation of the universal remote controller by the user 3 like FIG. 16, and is different from FIG. 16 in that the menu has one achromatic button 110B and six color buttons colored in six colors respectively, i.e., red button 111B, green button 112B, blue button 113B, cyan button 114B, yellow button 115B, and magenta button 116B.

The functional indications put on the buttons of the normal remote controller, e.g., "Power", "Channel", "Volume", "Input switching", etc. are not put on the buttons of the universal remote controller 401. The indications to select the operation are put on six color buttons 111B to 116B on the graphic menu of the screen, and the user 3 selects the desired button on the screen.

When the user 3 operates six color buttons 111B to 116B on the screen, he or she moves the specific color button 310 in FIG. 15 displayed on the screen onto the desired button and then pushes the specific color button 310. An arrow Y11 indicated in FIG. 22 shows such operation. Since the function of the button is put on six color buttons 111B to 116B on the screen respectively, the user 3 moves the universal remote controller 401 onto the desired button while checking the function and then pushes the specific color button 310. In this case, because the color buttons 111B to 116B are sorted by color according to their functions, only the pushing of the specific color button 310 is requested even when any of the color buttons 111B to 116B should be pushed.

As other approach, the color buttons 111B to 116B may be used simply as the information to explain the function of each color, and the achromatic button 110B on the lower left portion of the screen may be used as the button to select respective functions. When the achromatic button 110B is operated, the universal remote controller 401 in FIGS. 15A to 15E projected on the screen is moved onto the achromatic button 110B, and then any one of six color selecting buttons 311 to 316 on the universal remote controller 401 is pushed. An arrow Y12 indicated in FIG. 22 shows such operation. In this case, since the pushed button is the achromatic button 110B only, the television receiver 1 must discriminate which color that corresponds to the desired function is selected. Then, the user 3 pushes any one of six color selecting buttons 311 to 316 on the universal remote controller 401.

The lights emitted from the universal remote controller 401 are six types of colors in FIG. 18 and an achromatic color or a specific color (here, a skin color same as the hand). As described above, the desired function of six color buttons 111B to 116B on the screen is selected by pushing the specific color button 310, and also the desired function of the achromatic button 110B is selected by pushing any one of six color selecting buttons 311 to 316.

Two types of above operations may be separately used appropriately because they are different simply in that the buttons on the screen should be selected or the buttons of the universal remote controller 401 should be selected. In case the function is selected by using the color buttons 111B to 116B, the achromatic button 110B is not always needed and thus can be deleted.

Figure 23:
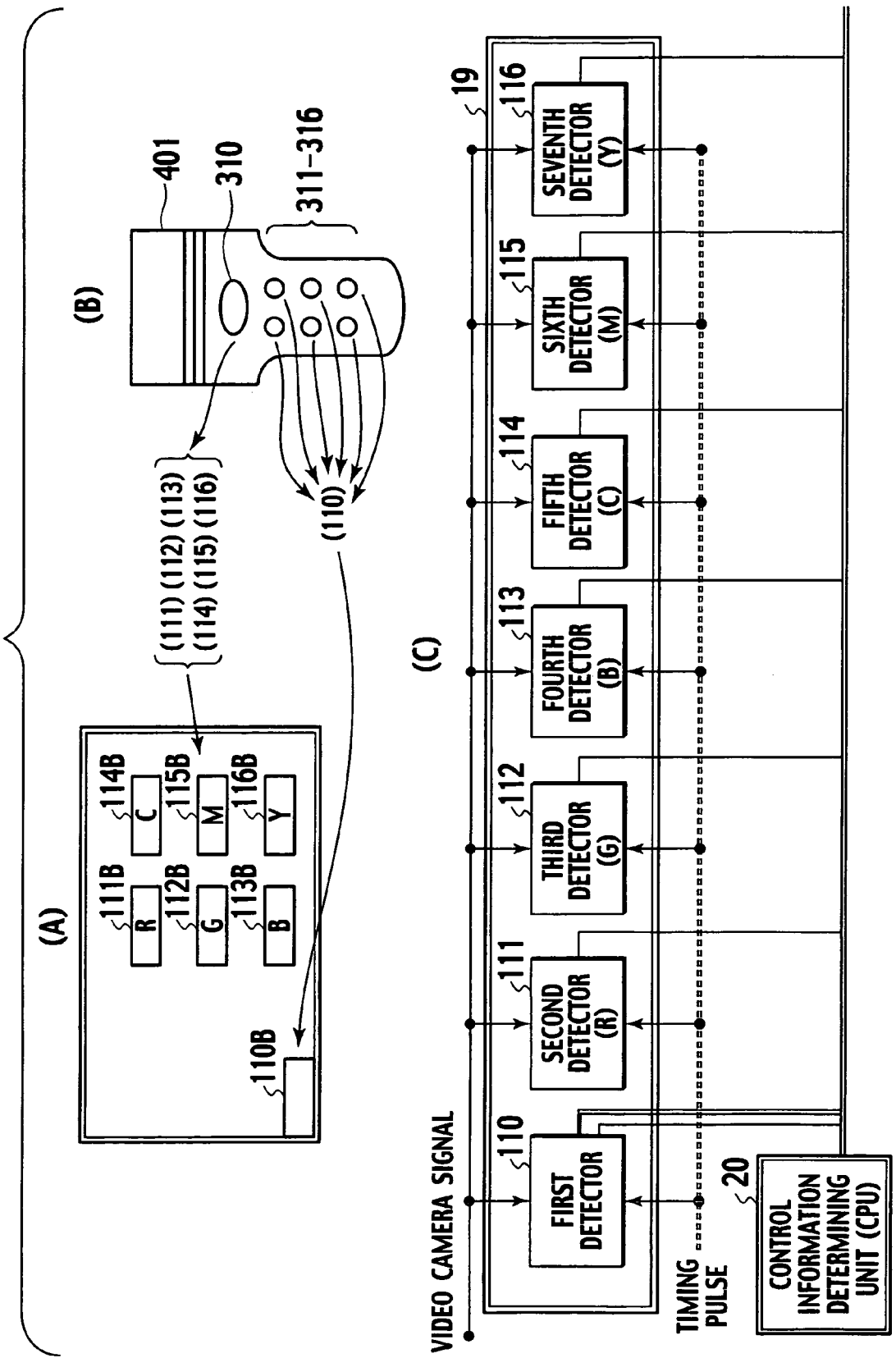
FIG. 23 shows the relation among the buttons on a screen of the television receiver, buttons of the universal remote controller used in the first embodiment, and the detectors.

Next, how two types of selecting operations made by the user 3 should be sensed by the detector 19 will be explained along with a first practical example shown in FIG. 23 hereunder. (A) in FIG. 23 shows the screen on which the menu of the television receiver 1 and the video camera signal are mixed. (B) in FIG. 23 shows the contents of buttons of the universal remote controller 401. (C) in FIG. 23 shows the detector 19 corresponding to the menu depicted in (A) of FIG. 23 and the control information determining unit 20. Here, the detector 19 has detectors 110 to 116 instead of the detectors 31 to 34 in FIG. 2.

The contents of the menu screen in (A) of FIG. 23 are similar to that in FIG. 22, and the color buttons 111B to 116B on the screen to show six color regions and the achromatic button 110B are shown. In order to facilitate the understanding, reference symbols 110B to 116B corresponding to the detectors 110 to 116 in (C) of FIG. 23 are affixed to the achromatic button 110B and six color buttons 111B to 116B in (A) of FIG. 23. Also, respective buttons of the universal remote controller 401 and the numbers of the corresponding detectors and also correspondences between the screen buttons 110B to 116B and the numbers of the detector 110 to 116 are shown in (B) of FIG. 23.

The first detector 110 shown in (C) of FIG. 23 corresponds to the achromatic button 110B in (A) of FIG. 23. As described above, the achromatic button 110B is operated by any one of six color selecting buttons 311 to 316 on the universal remote controller 401. Since the detector 110 receives the six types of color information through the video camera 2, the detector 110 must discriminates the color. The detector 110 is the color discriminating detector having the color discrimination object extractor 51-N having a color discriminating function in FIG. 21. Therefore, the detected output from the color discrimination detector 54 in FIG. 21 and the output from the object characteristic data detector 53-N can be obtained from the detector 110. In contrast, the detectors 111 to 116 provided to correspond to the color buttons 111B to 116B may have the object extractor 51 as in FIG. 7 since they should discriminate six types of controls according to the position on the screen. In this case, suppose that the specific color filter 71 can also deal with the achromatic color.

The detector 110 having the color discrimination object extractor 51-N passes the light through only a position range of the screen button via the timing gate 52-N, and transfers the data such as histogram, APL, high-frequency frequency detection, minimum value, maximum value, and the like within that range to the control information determining unit 20. In the detector 110, the information indicating which color is effective is transferred from the color discrimination detector 54 shown in FIG. 21 to the control information determining unit 20 in response to the signal fed from the color discrimination object extractor 51-N. The control information determining unit 20 evaluates the data from the object characteristic data detector 53-N in the effective color region, and determines the operation made by the universal remote controller 401.

FIG. 24 is a view explaining a second practical example of the universal remote controller 401 using the color discrimination. Diagram (A) in FIG. 24 shows a screen of the television receiver 1, and the video camera signal that is mixed with the menu of the graphics is displayed under a broken line that is added for the purpose of explanation. The graphics image and the signals such as the broadcast, the video input, or the like are mixed with the background of graphics image, as the case may be, are displayed in the area over the broken line.

The banners in six colors provided over the broken line are not the screen buttons shown in (A) of FIG. 23 but the marks used to inform the user of the function of color for the color discrimination. The banners are referred to as universal information. As shown in (A) of FIG. 24, screen buttons 110B1 and 110B2 are arranged on the left and right bottom sides of the screen. The universal remote controller 401 is shown in (B) of FIG. 24, and a first detector 110' and the control information determining unit 20 are shown in (C) of FIG. 24. The first detector 110' corresponding to the screen buttons 110B1 and 110B2 and shown in (C) of FIG. 24 has the same function as the first detector 110 in (C) of FIG. 23. Two timing pulses being input into the first detector 110' correspond to two operating phases of the detector 110' given by the screen buttons 110B1, 110B2. Also, the first detector 110' has the N-th color discrimination object extractor 51-N.

An operating method of the universal remote controller 401 shown in FIG. 24 will be explained as follows. The user 3 checks operation information "red (R): 1 channel, green (G): 2 channel, blue (B): 3 channel, yellow (Y): 4 channel, magenta (M): 5 channel, and cyan (C): 6 channel" by watching the screen of the television receiver 1, then holds the universal remote controller 401 toward any of the screen buttons 110B1, 110B2, and then pushes any of the color selecting buttons 311 to 316 to cause the light emitting portion 303 to emit in predetermined color. Here, the operation information in the 1 channel to the 6 channel are a simple example.

In the first embodiment, the universal remote controller 401 to which the color discriminating operation is added in this manner can execute six selecting operations by one user's action. The reason why the screen buttons 110B1, 110B2 are provided individually to two locations is that such buttons makes it possible for the user 3 to select the easy-use button according his or her taste. But one button may be provided to one location, as shown in FIG. 23. Since the user 3 is requested only to move the universal remote controller 401 to the screen button 110B1 or 110B2, the convenience in use can be improved.

In the universal remote controller 401, the selecting operation made by the action of the hand is replaced with the selecting operation made by using the light emitting portion 303, i.e., the waveform similar to the action of the hand is output to the output of the detector 19. In the first embodiment, two systems consisting of the system that can achieve the same effect as the action of the hand by emitting the light in particular color such as the achromatic color, the skin color, or the like and the system that can fix the holding position of the universal remote controller 401 by the on-hand selecting operation based on the color discrimination are shown. According to the two systems, the signal can be processed by the same configuration after the signal passed through the object extractor 51 in respective detectors 31 to 34, 110 to 116, 110' in the detector 19.

FIGS. 25A, 25B and FIGS. 26A, 26B show output data from the histogram detector 61 and APL detector 62. Each figure shows a gradation level histogram and an average brightness (APL). The APL is indicated with an arrow whose size represents the magnitude of the APL. An ordinate indicates the frequency of a gradation level group and an abscissa indicates gradation (brightness) levels separated into eight stepwise groups. A case 1 (FIGS. 25A and 26A) and a case 2 (FIGS. 25B and 26B) differ from each other in the brightness of a hand. The case 1 is a case where the frequency of the brightness is concentrated into a specific gradation level (here, the gradation level "5"), and the case 2 is a case where the frequency of the brightness is distributed over two gradation levels (here, the gradations "5" and "6").

Figure 25A:
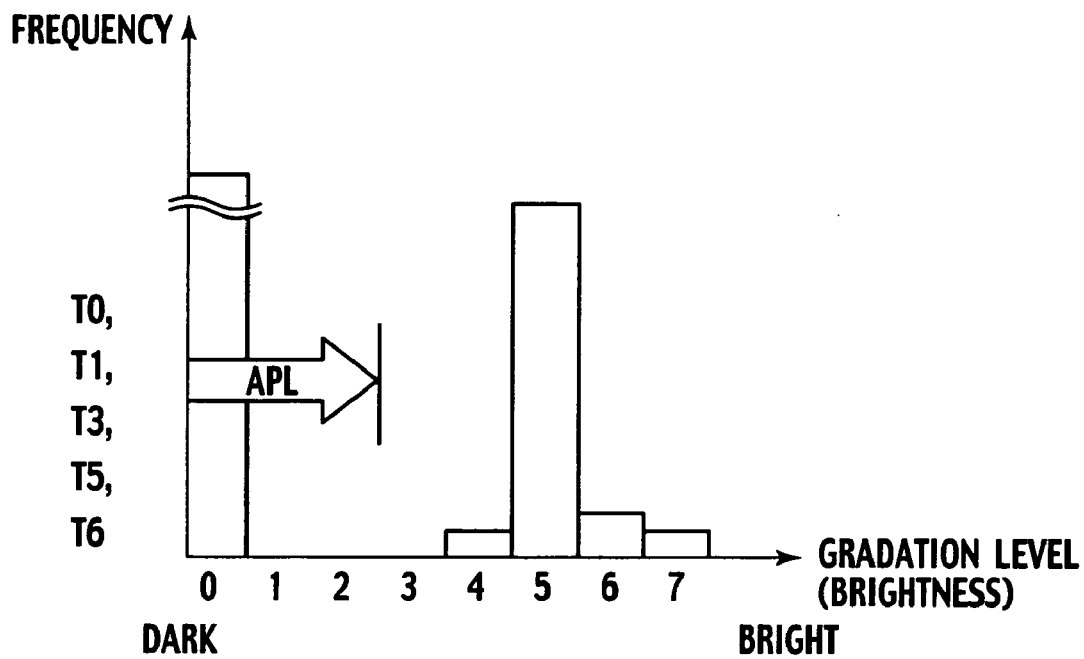
FIGS. 25A and 25B each show a distribution of gradation-level frequencies and an average picture level (APL) at times T0, T1, T3, T5, T6 of FIG. 13.
Figure 25B:
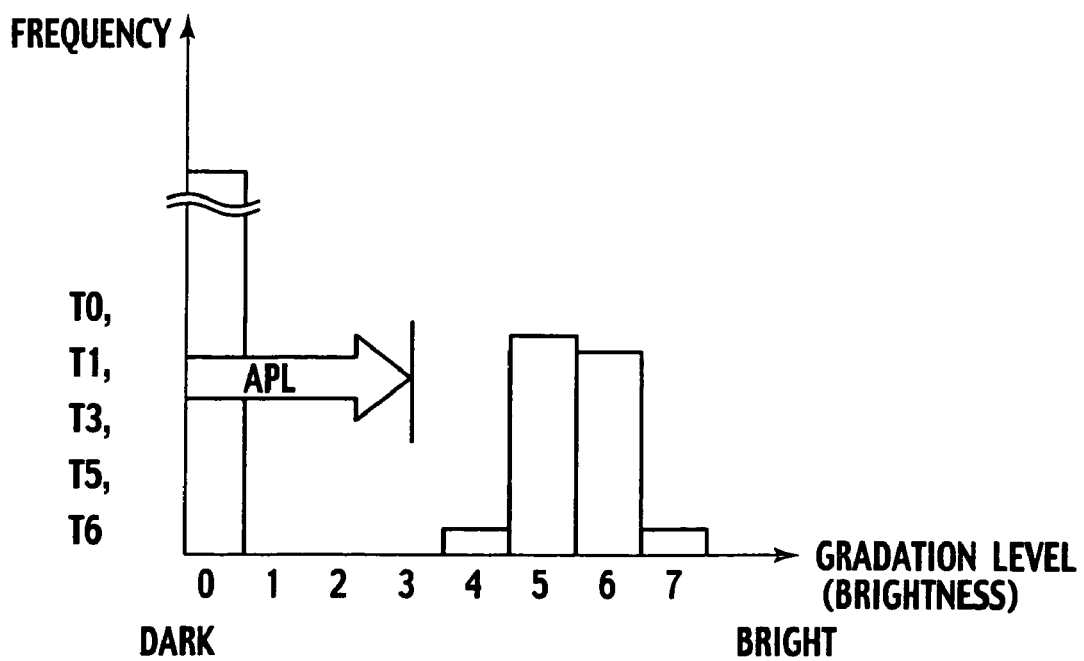
Figure 26A:
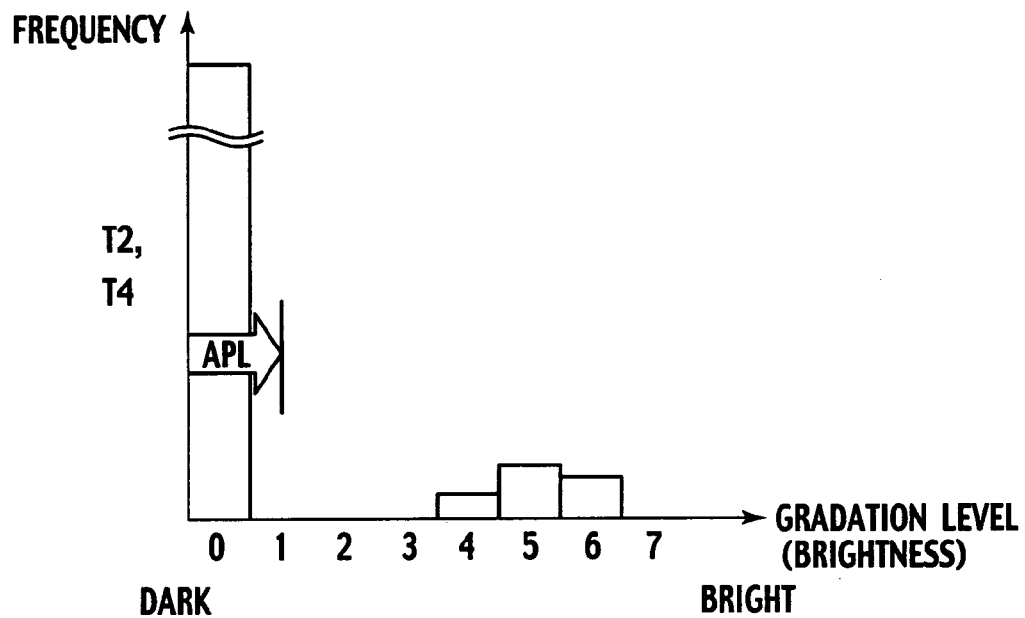
FIGS. 26A and 26B each show a distribution of gradation-level frequencies and an average picture level (APL) at times T2, T4 of FIG. 13.
Figure 26B:
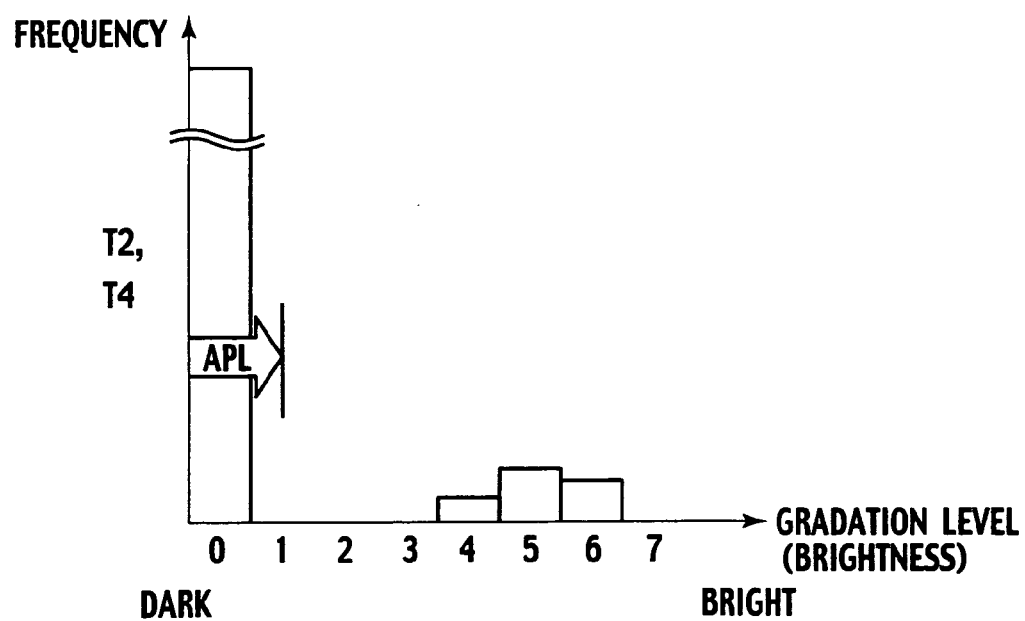

The histograms shown in FIGS. 25A and 25B correspond to the time points T0, T1, T3, T5 and T6 of FIG. 13, and the histograms shown in FIGS. 26A and 26B correspond to the time points T2 and T4. Since the object is extracted while limiting the color to the skin color as the particular color or the achromatic color by the object extractor 51 and the object is extracted while limiting the color to six colors by the object extractor 51-N having a color discriminating function, and the regions blocked by the particular color filter 71 and the N-th color region filter 71-N are set as the black, the frequency of the histogram is distributed in the black portion (gradation level "0") and portions (gradation levels "4" to "7") in which the gradation is limited.

A method of discriminating a state of the hand (fingers) based on the data of the histogram or a state of the light emission of the universal remote controller 401 can be considered variously. For example, a state of the action of the hand or a state of the light emission of the universal remote controller 401 can be discriminated by summing up the frequencies of limited gradation levels in the range of "4" to "7". Also, as can be appreciated by comparing FIGS. 25A, 25B and FIGS. 26A, 26B, the frequency of the gradation level "0" as the black portion is different between a state that the user holds up the fingers and a state that the user bends the fingers. This is because a quantity of the gradation level "0" portion contained in the output signals of the object extractors 51, 51-N is different, as can be understood from FIGS. 14A and 14B. Therefore, a state of the action of the hand or the light emission of the universal remote controller 401 can be discriminated based on only the frequency of the gradation level "0". Such discrimination executed based on only the frequency of the gradation level "0" is convenient because the process in the discriminating operation of the control information determining unit 20 can be simplified.

Since a variation in a total value of the histograms is close in content to a variation in APL but only their values are different in scale, the analysis based on APL can be executed in the same way as the analysis of the histogram. Therefore, a state of the action of the hand or the light emission of the universal remote controller 401 can be discriminated based on APL. It is preferable that, in order to improve discrimination accuracy, the evaluation/decision should be made by using the different sensing means. The detected data from the high-frequency detector 63, the minimum value detector 64, and the maximum value detector 65 can be evaluated similarly and then the discrimination is made based on a large amount of different detected data, so that the discrimination accuracy can be improved.

The high-frequency detector 63 detects a frequency of an edge component between the fingers and the background in black. The edge component is reduced when the fingers are bent, as can be seen from FIGS. 14A and 14B, and its variation is similar to the histogram or the APL. In the above example, portions out of the object extracting range are made black. But in some cases such portions should be made white instead of black depending on the color or the gradation of the object picked up by the video camera 2. In such case, the discrimination accuracy can be improved by employing the minimum value detector 64 and the maximum value detector 65.

In the discrimination in the control information determining unit 20 as to a state of the action of the hand or the light emission of the universal remote controller 401, the basis of the algorithm is identical in all sense items of the object characteristic data detectors 53, 53-N but is different in scale according to each sense item. The outputs of the object characteristic data detectors 53, 53-N are transferred to the control information determining unit 20 via the CPU bus. The control information determining unit 20 discriminates a state of the action of the hand or the light emission of the universal remote controller 401, and then outputs an appropriate signal.

FIG. 27 is a functional block diagram explaining an operation of the control information determining unit 20. The control information determining unit 20 has a selector 230, first to fifth scale compensators 221 to 225, first to fifth operation detectors 201 to 205, and a control information generator 210. As can be seen from FIG. 27, the first to fifth scale compensators 221 to 225 and the first to fifth operation detectors 201 to 205 are provided to correspond to the histogram detector 61, the APL detector 62, the high-frequency detector 63, the minimum value detector 64, and the maximum value detector 65 in the object characteristic data detector 53 respectively. As shown in FIG. 27, when the object characteristic data detector 53 corresponds to the object characteristic data detector 53-N provided every color region, the selector 230 selects the data corresponding to a desired color region from the output of the object characteristic data detector 53-N. The data indicating the color region obtained from the color discrimination detector 54 in FIG. 21 is input into the selector 230, and then the selector 230 selects any output of the object characteristic data detector 53-N based on the data.

Here, six object characteristic data detectors 53-N are provided and outputs of the object characteristic data detectors 53-N are selected at the rear stage of the object characteristic data detectors 53-N. But such a configuration may be considered that only one object characteristic data detector 53 is provided and the color region may be selected at the front stage of the object characteristic data detector 53. If doing this, the configuration can be simplified, nevertheless the operations become troublesome because the operation of the object characteristic data detector 53 must be differentiated by using different screen buttons in one screen. Therefore, in the first embodiment, six object characteristic data detectors 53-N are provided, and the output of the object characteristic data detector 53-N is selected in the control information determining unit 20.

Figures 28A, 28B:
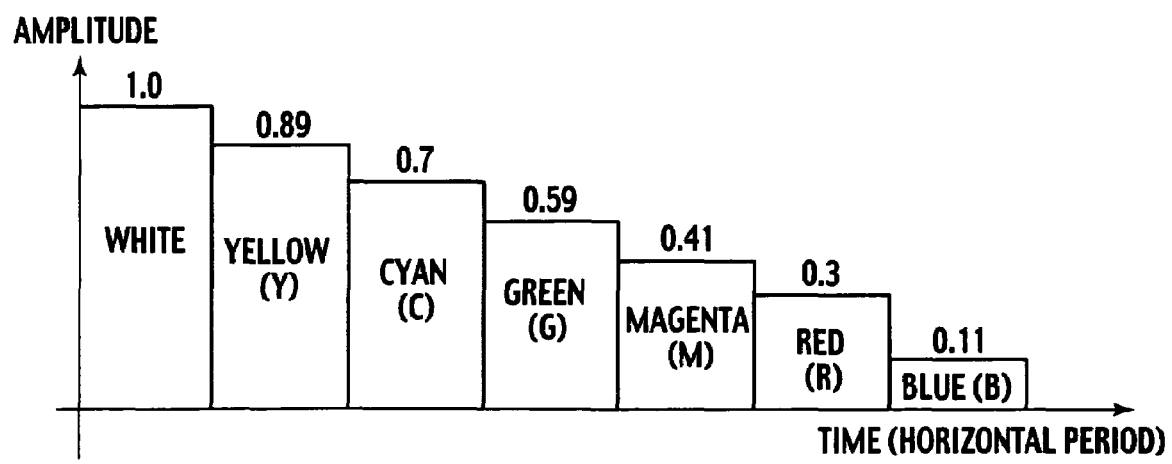
FIGS. 28A and 28B show amplitude values of the brightness signals based on the BT601 standard.

The first to fifth scale compensators 221 to 225 adjust a scale of the input data, which is for each color if a color is to be discriminated, according to the contents of the detectors 61 to 65 in the object characteristic data detectors 53-N such as the histogram, the APL, and the like. This adjustment fulfills a role of normalization to supply a constant-scale signal to the operation detectors 201 to 205 at a later stage. Here, a correction value of the color is defined precisely in the first to fifth scale compensators 221 to 225. FIG. 28A shows amplitude values of the brightness signals corresponding to ITU-RBT601 colorimetry in respective colors, and FIG. 28B shows color bar signals based on the amplitudes in respective colors in order of brightness amplitude.

As seen from FIGS. 28A and 28B, since the brightness signal amplitude is different every color, the correction is needed to evaluate the histogram, the APL signal, and the like. A reciprocal number of the brightness amplitude of each color gives the correction value. The first to fifth scale compensators 221 to 225 make the amplitudes as uniform as possible every color data, and then supply the data to the operation detectors 201 to 205. In this case, explanation is made by using the ordinary television broadcast standard BT601, but coefficient values and correction values are different according to the standard, e.g., BT 709 is applied to HDTV (Hi-Vision).

The operation detectors 201 to 205 output a sense flag in answer to the sensed results of the corresponding detectors 61 to 65, and supply the flag to the control information generator 210. The control information generator 210 evaluates the contents of the input sense flag, and outputs predetermined control information. Here, the evaluation is made by utilizing the operators of the computer, e.g., logical sum, logical product, exclusive OR, >, <, and the like. The control information generator 210 outputs the control signal based on the calculated result of the operation expression including these operators. In the first embodiment, the control information generator 210 outputs the control information when the logical sum of the outputs of all operation detectors 201 to 205 is output, i.e., when at least one operation detector outputs the sense flag.

The details of the operation detectors 201 to 205 will be explained. A sum of the frequencies of the limited gradation levels in the histogram is used to detect a hand operation. FIG. 29 shows data changes obtained from the histograms. Time points T0 to T6 of FIG. 29 correspond to the time points T0 to T6 of FIG. 13, respectively. A waveform (A) of FIG. 29 shows changes in the sum of the frequencies of gradation levels 4 to 6 of the histograms. The gradation level groups 4 to 6 represent an area of the hand or an average brightness of the light emitting portion 303 of the universal remote controller 401. A waveform (B) of FIG. 29 shows a result after removing offset components from the waveform (A), and the value become 0 when no change occurs in the waveform in a Tm period. A diagram (C) of FIG. 29 is obtained by integrating the waveform (A). In the diagram (C), an arrow represents a gate pulse to identify a hand motion. A diagram (D) of FIG. 29 is obtained by digital-filtering the waveform (B). This is to find a cross-correlation with respect to a hand motion. The diagrams (C) and (D) represent a process required until the control information determining unit 20 makes a final determination after the user operates the screen buttons or operates the universal remote controller 401 in a predetermined way.

The waveforms or diagrams (A) to (E) of FIG. 29 will be explained in detail.

The waveform (A) of FIG. 29 is the same as that of FIG. 13 showing hand motions. Portions that are irrelevant to the determination of hand motions are omitted from the waveform (A). The period Tm is a period between a finger extended state and a finger bent state and serves as a hand operation reference period (interval). A period from time T0 to T1 is a hand holding period in which the user holds his or her hand over a push button for about the period Tm to activate the push button. Here, the wording "the screen button is activated" signifies such a state that the screen button is being operated (the hand or the universal remote controller 401 is held toward the sensing area corresponding to the screen button).

In a period from T1 to T2, the user bends the fingers of the hand. In a period from T2 to T3, the user extends the fingers. In a period from T3 to T4, the user again bends the fingers. In a period from T4 to T5, the user again extends the fingers. In a period from T5 to T6, the user keeps the finger extended state for the period Tm. A series of these motions resemble a mouse double clicking operation, and one may easily carry out these motions. The universal remote controller 401 causes the light emitting portion 303 to emit the light such that the completely same waveform as the action of the hand can be obtained, and gives an inputting means that has an interchangeability with the action of the hand.

Figure 30:
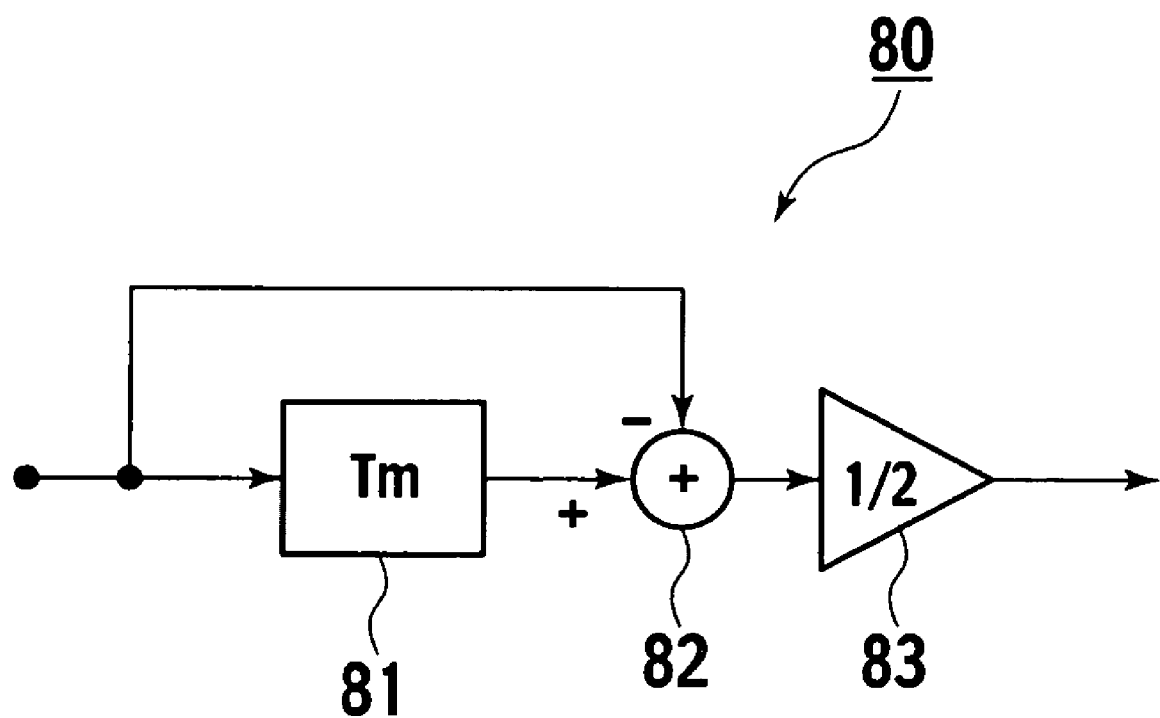
FIG. 30 is a block diagram showing a digital filter for removing DC components.

FIG. 30 shows a configurative example of a filter 80 that is used to obtain the waveform (B) of FIG. 29 by removing a DC component from the waveform (A) of FIG. 29. The filter 80 consists of a delay unit 81 for delaying an input signal by the period Tm, a subtracter 82 for subtracting an input signal from an output signal of the delay unit 81, and an attenuator 83 for attenuating a signal level by ½. This filter is a high-pass digital filter having tap coefficients of (−½, ½) around the period Tm. The delay by the period Tm is to pass a waveform related to a hand motion. The configuration of the digital filter is not limited to this example. The configuration of FIG. 30 is simple and involves a small absolute delay.

Figure 31:
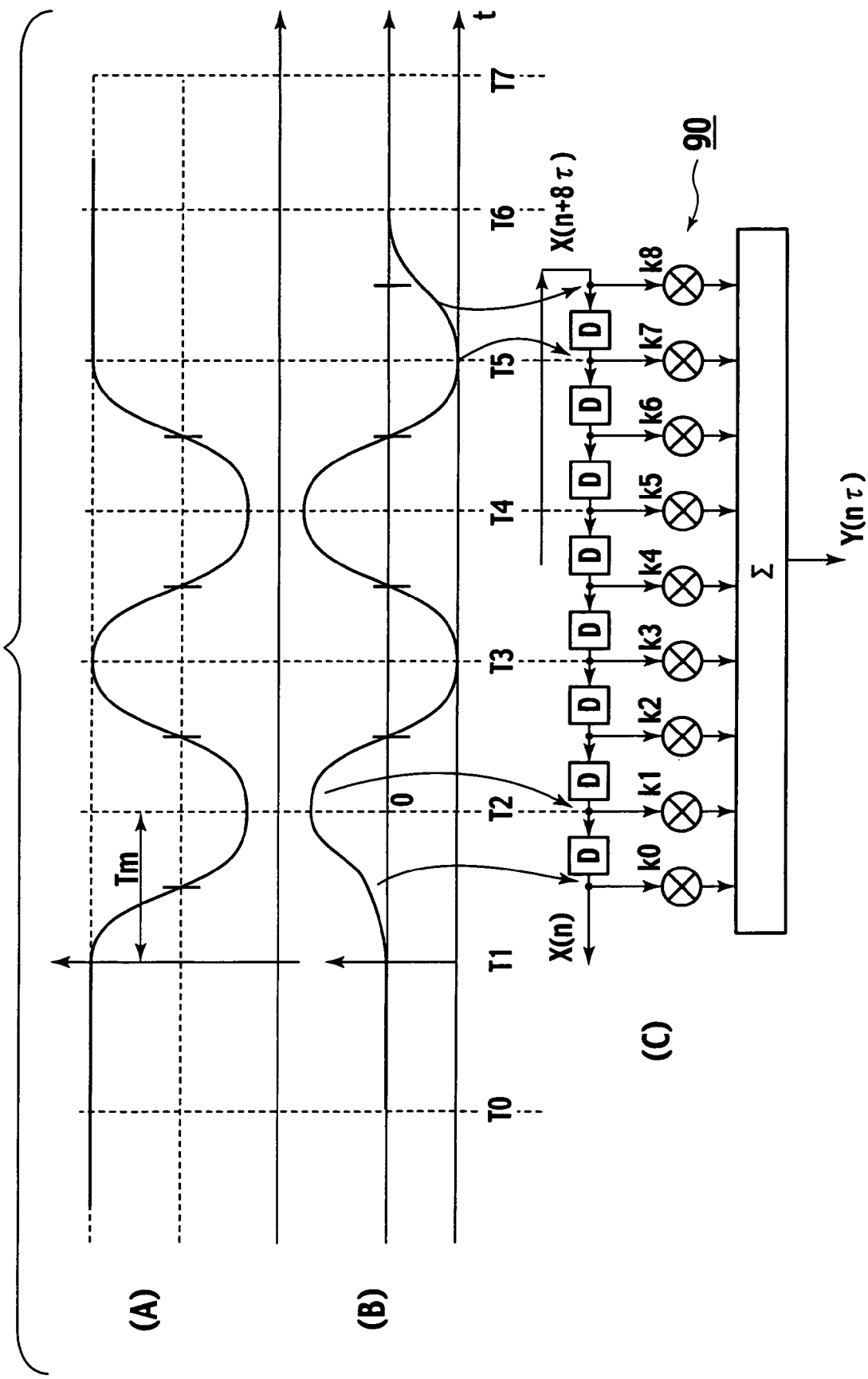
FIG. 31 shows a relationship between digital filters (one of which is shown in FIG. 30) and processed waveforms.

Diagram (C) of FIG. 31 shows a cross-correlation digital filter 90 that is used to obtain the waveform (D) of FIG. 29 by applying the cross-correlation to the waveform (B) of FIG. 29. The cross-correlation digital filter 90 is provided in operation detectors 201 to 205 respectively. Waveforms (A) and (B) of FIG. 31 correspond to the waveforms (A) and (B) of FIG. 29. A square mark with "D" in the lower part of FIG. 31 represents a delay of one vertical period and corresponds to a D-flip-flop (hereinafter referred to as DFF) used in the digital filter. Marks k0, k1, . . . , k8 are tap coefficients of the cross-correlation digital filter 90. A block recited as × is a multiplier, and a block recited as Σ is a calculator that calculates a total sum of outputs of the multipliers. A cross-correlation calculated value Y(nt) is output from this calculator. Since values equivalent to the waveform (B) of FIG. 31 is set as the tap coefficients k0, k1, . . . , k8, the cross-correlation calculated value Y(nt) output from the cross-correlation digital filter 90 has a larger value as a coincidence between the waveform input into the cross-correlation digital filter 90 and the waveform (B) of FIG. 31 becomes higher. If both coincide completely with each other, the cross-correlation calculated value Y(nt) has the maximum value.

The operation conducted by the digital filters of FIG. 31 is expressed as follows (N is 9 in the example of FIG. 31):

$$Y(n\tau) = \sum_{i=0}^{N-1} x(n+i\tau)k(i\tau)$$

The digital filters shown in FIG. 31 receive the waveform (C) of FIG. 31 from the right side thereof. This is because correlations among respective values of the waveform (B) of FIG. 31, DFFs to which respective values are input, and the multipliers can be made easy to understand. The tap coefficients k0, k1, . . . , k8 are used to calculate the correlation between the waveform and the action of the hand or the contents of the light emission of the universal remote controller 401 to be detected. Therefore, when the sensed object is different from the action like the above double-clicking, the tap coefficients corresponding to respective actions may be set. Also, if a plurality of cross-correlation digital filters having a plurality of different tap coefficients mutually are provided, a plurality of different operations can be detected.

In an example in FIG. 31, because the cross-correlation digital filter 90 has nine taps, a period required for the cross-correlation is nine vertical periods. If a video signal has 60 vertical periods per second, the nine taps take about 1/7 seconds. This requires a hand motion of relatively high speed. Because actually it is difficult for the user to take the action of the hand like the double-clicking for 1/7 second, a period required for the cross-correlation may be prolonged by further increasing the number of taps. When the universal remote controller 401 is used, there is no necessity that, because the action of the hand can be performed like the double-clicking in a shorter time than the action of the hand, the number of taps do not need to be so increased.

In the first embodiment, the configuration to apply the cross-correlation to the waveform (B) of FIG. 31 is employed. But the waveform (A) of FIG. 31 may be employed. In this case, accuracy can be enhanced further when the waveform (B) of FIG. 31 is employed. In order to enhance further accuracy, a waveform derived by squaring the waveform (B) of FIG. 31 may be employed.

Figure 32:
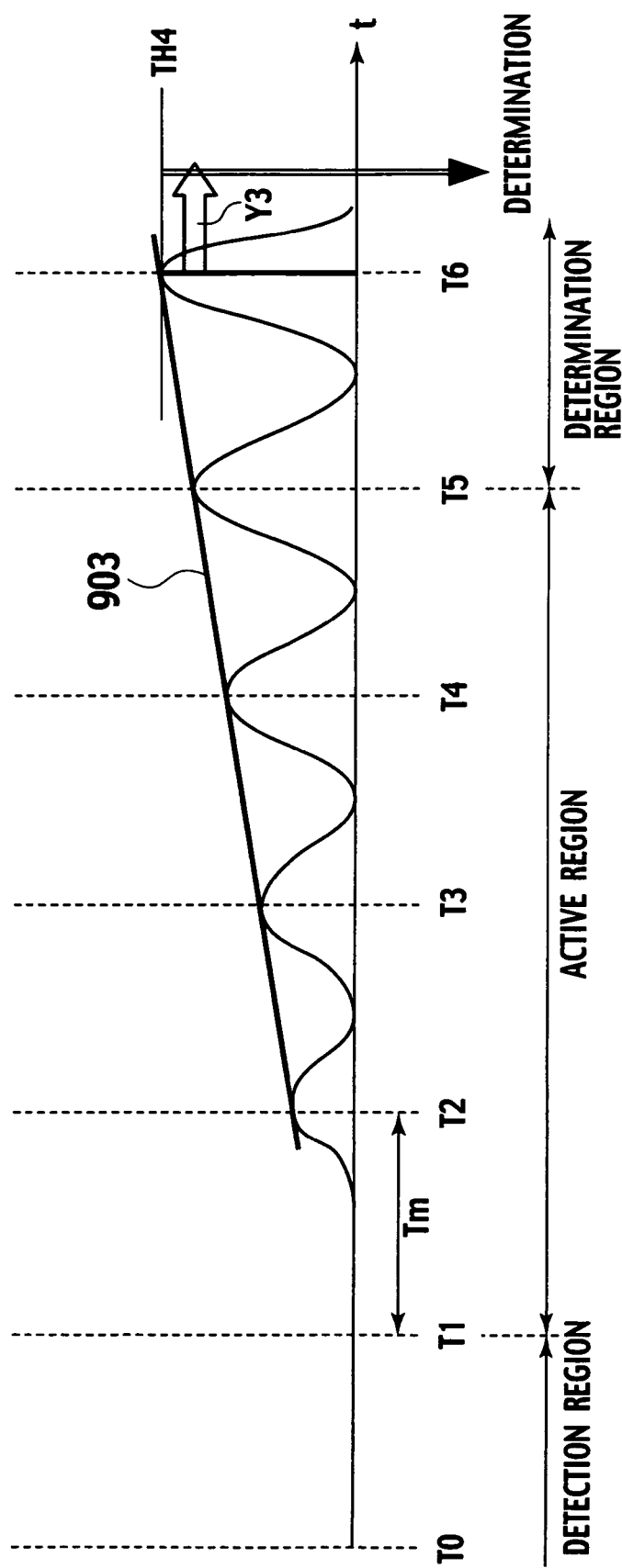
FIG. 32 is a time chart showing changes in cross-correlation between an operation to be detected.

Returning to FIG. 29, a waveform 901 in (D) of FIG. 29 will be explained hereunder. (D) of FIG. 29 shows the waveform 901 of the cross-correlation calculated value Y(nt) that is output from the cross-correlation digital filter 90 and is turned into a model. As time passes, the degree of matching between the waveform obtained based on the action of the hand and the tap coefficients increases to increase a peak value. A waveform 902 shows an envelop of an integrated waveform that is derived by integrating the absolute values of the waveform (D) of FIG. 29. It is confirmed that the predetermined operation has been made by the hand or the universal remote controller 401 at a point of time when the waveform 902 exceeds a threshold value TH4. As shown in FIG. 32, such a configuration may be employed that the action of the hand or the universal remote controller 401 should be confirmed based on a waveform 903 that shows an envelop of an integrated waveform that is derived by squaring the waveform 902 and then integrating the squared values.

Diagram (C) of FIG. 29 is obtained by integrating the histogram data (A) of FIG. 29 along a time axis. A period up to time T1 is a period in which the user holds his or her hand or the universal remote controller 401 against the display 23. Waveform (B) of FIG. 29 is one obtained by extracting only a high-frequency component of the waveform (A) of FIG. 29, and accordingly becomes zero when the waveform (A) of FIG. 29 keeps constant. This means that the hand or the universal remote controller 401 is being held in a stationary state. It is of course that a slight action of the hand or the universal remote controller 401 is found even in a stationary state, but it can be regarded that the hand or the universal remote controller 401 is in its stationary state by neglecting such slight action. When the waveform (B) of FIG. 29 is between threshold values TH1a and TH1b and when the waveform (A) of FIG. 29 is above a threshold value TH0, the waveform is integrated and an integrated value In is increased gradually as shown in diagram (C) of FIG. 29. Initialization is carried out to produce an initial state of the integration when the waveform (A) of FIG. 29 is below the threshold value TH0. When the integrated value In in the diagram (C) of FIG. 29 exceeds a threshold value TH2, the screen buttons are activated. The period between the initialization and the point at which the threshold value TH2 is exceeded is a detection region. The integrated value In may be calculated when the waveform (B) of FIG. 29 is between the threshold values TH1a, TH1b or when the waveform (A) of FIG. 29 is more than the threshold value TH0.

After the integrated value of the diagram (C) of FIG. 29 exceeds the threshold value TH2, a period having a specific time constant is set as indicated with an arrow Y1. This is an active region that continues from the end of the detection region up to the start of a determination region. The active region conducts correlation calculations. The determination region refers to a result of the correlation calculations and determines if there is a hand operation or an operation of the universal remote controller 401, that controls the electronic appliance. The determination region starts when an integration of the absolute values of outputs of the cross-correlation digital filters exceeds the threshold value TH4. Another threshold value TH3 shown in the diagram (C) of FIG. 29 is smaller than the threshold value TH2. A period that exceeds the threshold value TH3 and is indicated with an arrow Y2-1 is used for determining a hand motion. The finger bending motion mentioned above ends when the user extends the fingers. The light emitting portion 303 of the universal remote controller 401 is lightened to get the similar waveform. The threshold value TH3 is used to confirm the last finger extending motion. A period indicated with an arrow Y2-2 before the period Y2-1 is considered to be a determination prohibited period to avoid an erroneous recognition. When the arrows Y1, Y2-1, and Y3 are established, an operation for a screen button is confirmed in the determination region.

It is preferable that the user 3 should be informed that the process goes to the detection region, by changing a color or shape of the graphics constituting the screen button or generating a sound. Also, it is preferable that the user 3 should be informed that the operation is confirmed, at a final time point of the active region or when the operation is confirmed in the determination region by changing a color or shape of the graphics or generating a sound. Also, it is preferable that the color or shape of the graphics or the sound should be differentiated when the process goes to the detection region and when the operation is confirmed. Accordingly, the user 3 can recognize that the operation is being made without fail, and thus the false operation can be avoided.

The absolute values of the threshold values TH3 and TH$ will be explained. The magnitude of an output value from the cross-correlation digital filter 90 is dependent on an area occupied by a hand. Thus, the threshold value TH3 may be set appropriately in answer to a time Tr that is consumed in the integration up to the threshold value TH2. The time Tr becomes shorter when the area toward which the hand is held is increased larger, and conversely the time Tr becomes longer when the area toward which the hand is held is decreased smaller. Therefore, the threshold values TH3 and TH4 are set high when the time Tr is long, and the threshold values TH3 and TH4 are set low when the time Tr is short. Also, the same effect as the adjustment of the threshold values TH3 and TH4 can be obtained by correcting a gain of the cross-correlation digital filter 90. In this manner, even though the area of the screen button toward which the hand is held is varied, the precise recognition can be done by setting appropriately the threshold values TH3 and TH4. This is completely true of the universal remote controller 401. Even though the area toward which the hand is held is slightly deviated from the position of the screen button, the error can be absorbed.

According to the first embodiment, all the buttons "Power," "Channel," "Volume," Input switching," "Up," "Down," "Left," "Right," "Enter," etc. provided to a general remote controller can be replaced with screen buttons that are operated by the universal remote controller 401. Even when the television receiver 1 is connected to any other device via the network and the user operates the other device via the television receiver 1, the user can display the screen buttons used to operate the other device on the screen of the television receiver 1 and then operate the other device. The user can operate various devices because the screen buttons may be set to meet to the operation contents of the other device.

The universal remote controller 401 that is the on-hand operating device can operate the television receiver 1 by its selfluminous function when the room in which the television receiver 1 is set is in a darkroom condition. When the color discriminating function is used, the function can be selected by the color button of the universal remote controller 401 while fixing the position thereof, toward which the universal remote controller 401 is held, at a particular location.

The present invention can handle not only television receivers but also any other electronic appliances having displays, such as personal computers, combinations of television receivers and video disk recorders, and combinations of television receivers and video tape recorders.

Second Embodiment

A second embodiment is an embodiment that can accelerate a response speed of the television receiver 1 to an operation of the universal remote controller 401. In the second embodiment, differences from the first embodiment will be explained mainly and thus explanation of common portions will be omitted herein. The second embodiment is particularly preferable to the case where a light storage material whose quantity of light cannot be varied is employed as the light emitting portion 303. Of course, the second embodiment can be employed in the case where a material other than the light storage material is employed as the light emitting portion 303.

Figure 33:
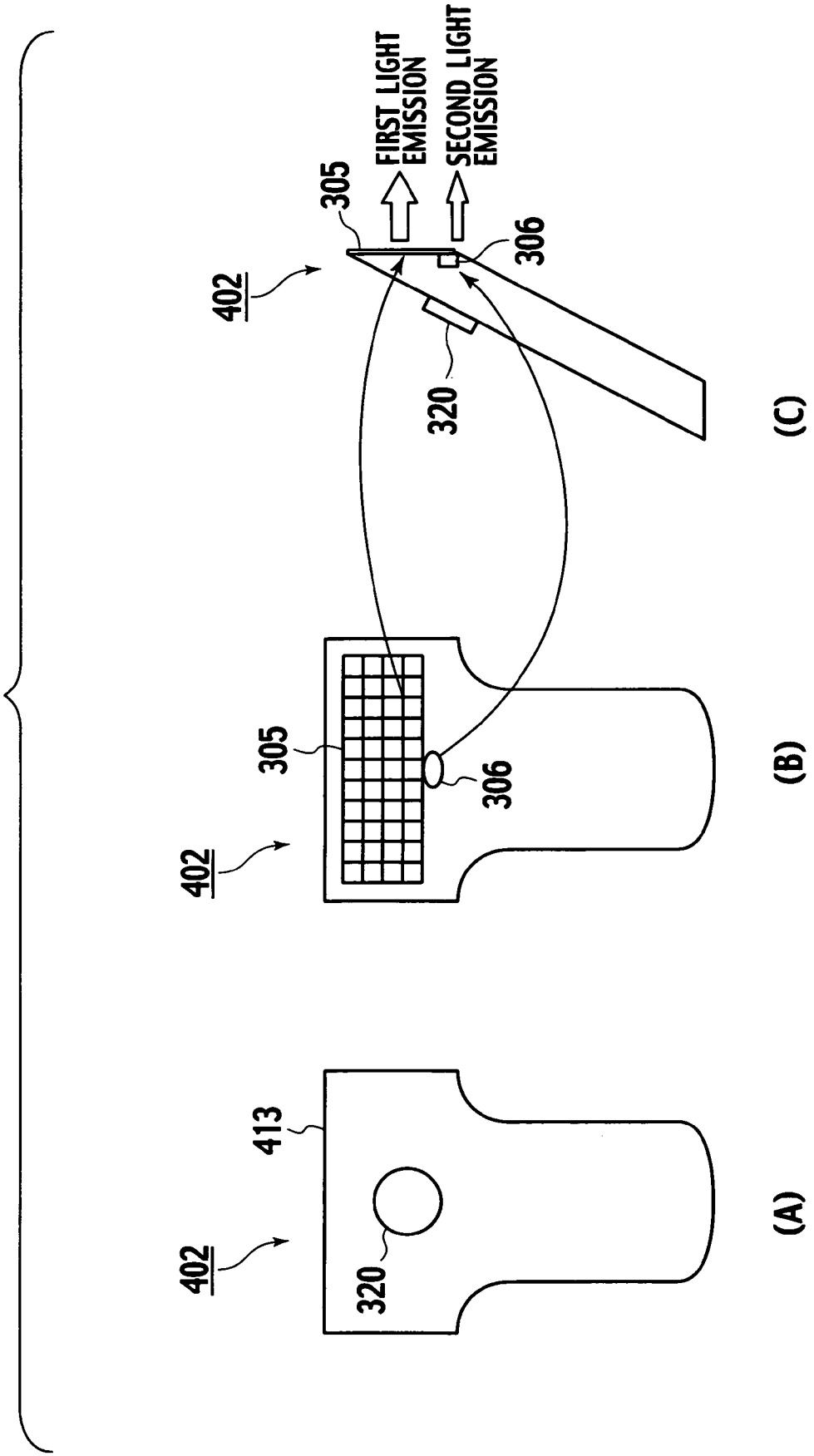
FIG. 33 shows a configurative example of a universal remote controller used in a second embodiment of the present invention.

FIG. 33 is a view explaining a universal remote controller 402 in the second embodiment, in which the function of the universal remote controller 401 in the first embodiment and a function of an infrared remote controller used widely are provided together.

Diagram (A) in FIG. 33 shows a plan view of a surface of the universal remote controller 402. A center button 320 fulfills both functions of a button used to emit the light in achromatic color or specific color from the universal remote controller 402 and a button that is called "Enter" or "OK" in a conventional infrared remote controller. This button 320 is referred to as a universal enter button (operation button) in the explanation.

Diagram (B) in FIG. 33 shows a plan view of a back surface of the universal remote controller 402. A specific color light emitting portion 305 is provided to the back surface thereof, and an infrared light emitting portion 306 for the infrared remote controller is provided in vicinity of the specific color light emitting portion 305. The specific color light emitting portion 305 and the infrared light emitting portion 306 are constructed such that the specific color light and the infrared light can be emitted in the same direction.

Diagram (C) in FIG. 33 shows a side view of the universal remote controller 402. The universal remote controller 402 is depicted under the assumption that the universal remote controller 402 is held in hand and the light emitting portions 305, 306 are held toward the television receiver 1 at some angle. A first light emission is a light from the specific color light emitting portion 305 of the universal remote controller 402. This first light emission is used instead of the action of the hand explained in the first embodiment. A second light emission is an infrared light from the infrared light emitting portion 306. The first and second light emissions are made simultaneously or predetermined timings by pushing the universal enter button 320.

Figure 34A:
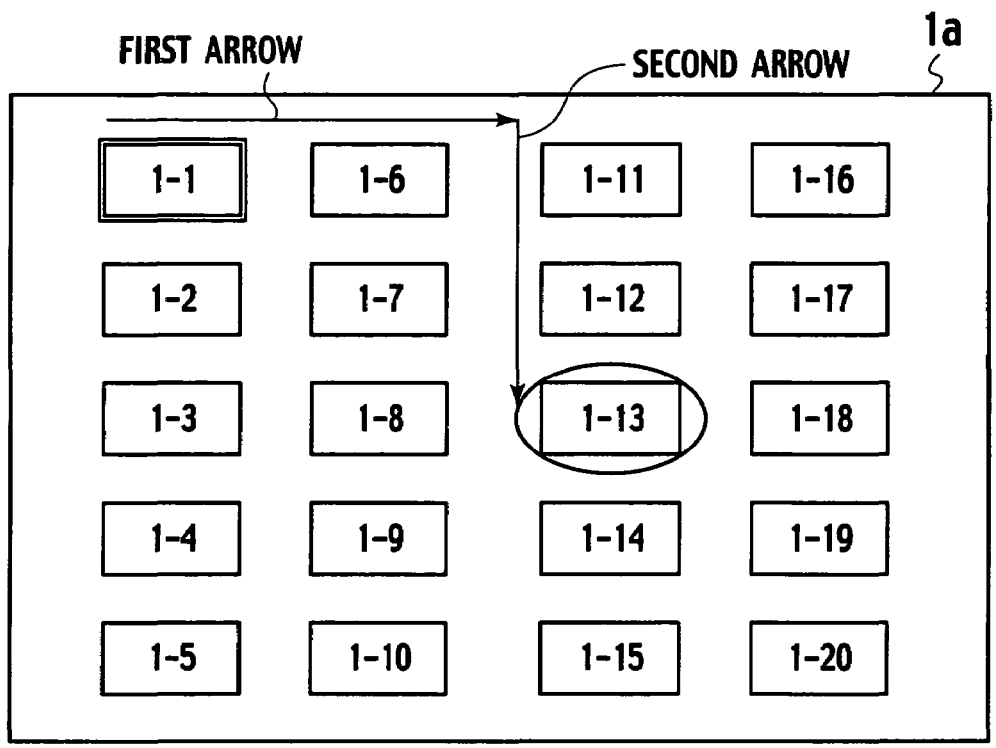
FIGS. 34A to 34C shows an operation of a conventional infrared remote controller.
Figure 34B:
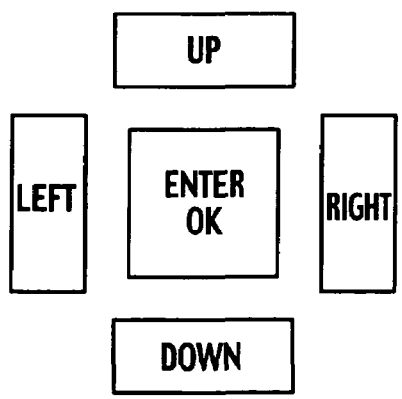
Figure 34C:
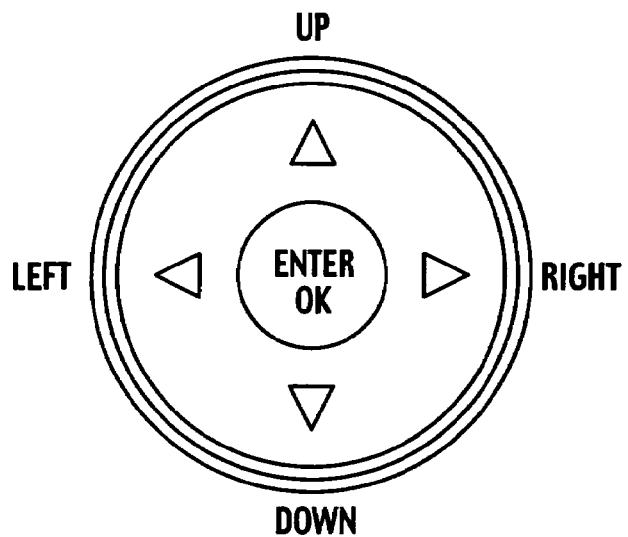

In order to facilitate the understanding of the second embodiment, an operation of an infrared remote controller used commonly at present will be explained hereunder. FIGS. 34A to 34C are views explaining operation modes of the infrared remote controller. FIG. 34A is a view of a television screen 1a when viewed from the front side, and shows a menu screen on which screen buttons 1-1 to 1-2 used to operate are depicted. There are two types of buttons of the infrared remote controller used to operate the screen buttons depicted in FIG. 34A. One of the buttons is shown in FIG. 34B, and "Up", "Down", "Left", "Right", "Enter" functions are constructed by individual buttons respectively. When a user pushes any button, an infrared light having a control function given on the button is emitted. The other type of buttons is shown in FIG. 34C, and "Up", "Down", "Left", "Right", "Enter" functions are constructed by one button. When the user pushes an edge of the button to incline the direction of the push button, an infrared light having each "Up", "Down", "Left", or "Right" control function is emitted.

The buttons shown in FIGS. 34A and 34C are different in the way of use, but both buttons are common in such a respect that the user selects the infrared light to perform an operation on the menu. In the case where the menu screen in FIG. 34A is operated by the common infrared remote controller, when a cursor is positioned on a screen button 1-1 and the screen button to be controlled is a screen button 1-13, e.g., when the cursor is moved along a route indicated by a first arrow and a second arrow, the cursor is moved from 1-1 to 1-6 and 1-6 to 1-11 by pushing the "Right" button twice and then moved from 1-11 to 1-12 and 1-12 to 1-13 by pushing the "Down" button twice. Then, the "Enter" button is pushed to determine the control. As a result, the button of the remote controller is pushed five times in total.

Next, an operation of the universal remote controller 402 will be explained with reference to FIG. 35 hereunder.

Figure 35:
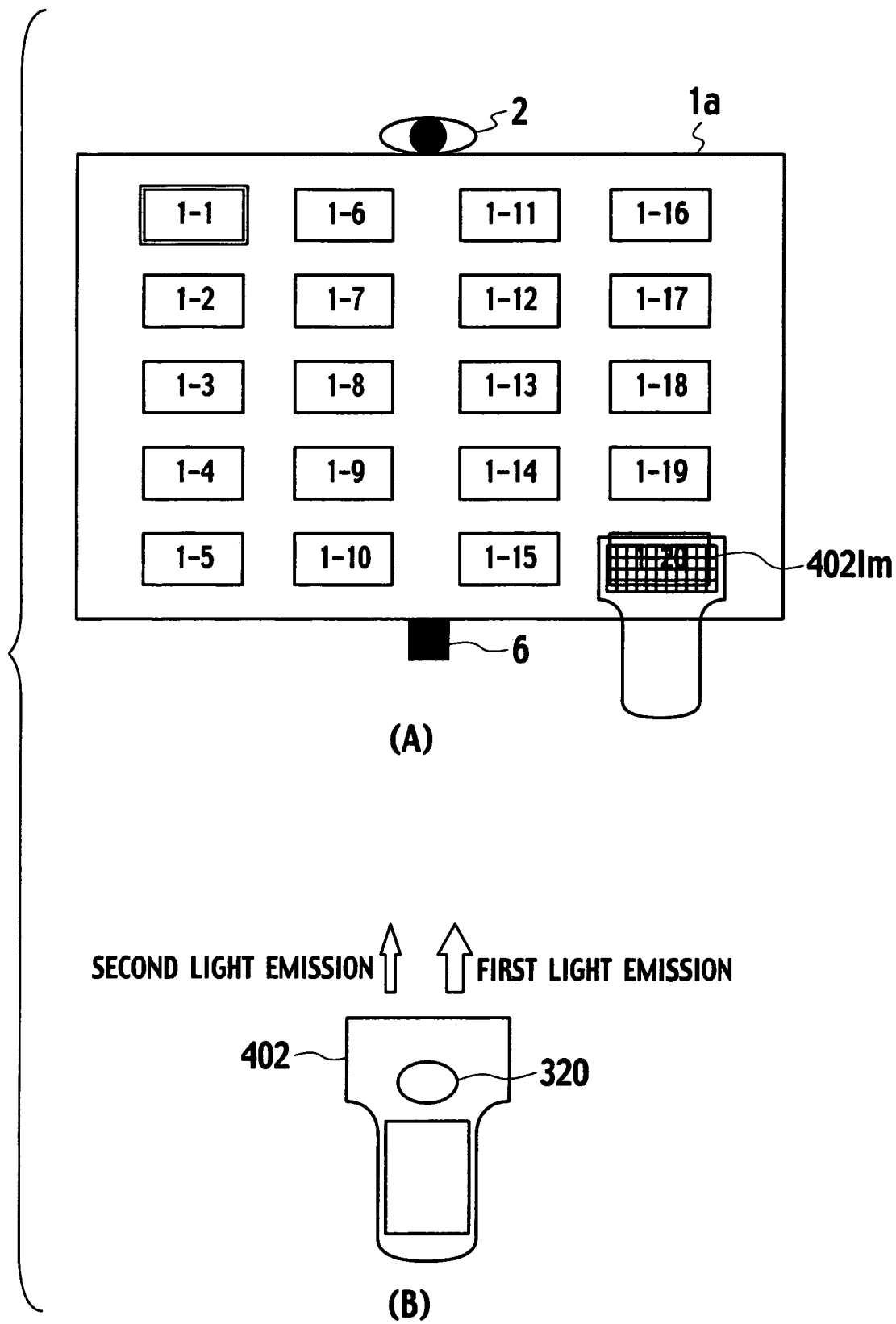
FIG. 35 shows an operation of the universal remote controller used in the second embodiment.

Diagram (A) in FIG. 35 shows a view of the television screen 1a when viewed from the front side thereof, and the video camera 2 is fitted to the top side of the screen and an infrared light receiving portion 6 is fitted to the bottom side of the screen. Here, when the cursor is positioned on the screen button 1-1 and then the function allocated to a screen button 1-20 is selected, the remote control buttons must be pushed eight times in an infrared remote controller in a prior art in order to move the cursor from the screen button 1-1 to the screen button 1-20 and then push the "Enter".

In contrast, when the universal remote controller 402 is used, the use 3 moves the image of the universal remote controller 402 projected on the screen onto the screen button 1-20 and then pushes the universal enter button 320 only. Here, 402Im shows the image of the universal remote controller 402 picked up by the video camera 2. Accordingly, the first light emission and the second light emission of the universal remote controller 402 are performed at predetermined timings. Light emitting timings of the first light emission and the second light emission at this time will be described later. The first light emission is an light emission in a specific color, and used to select the function set forth in the screen button 1-20. The infrared light receiving portion 6 reads a code of the "Enter" button of the infrared remote controller sent by the second light emission, so that a time required to decide that the function of the selected screen button should be executed can be defined in a short time.

Figure 36:
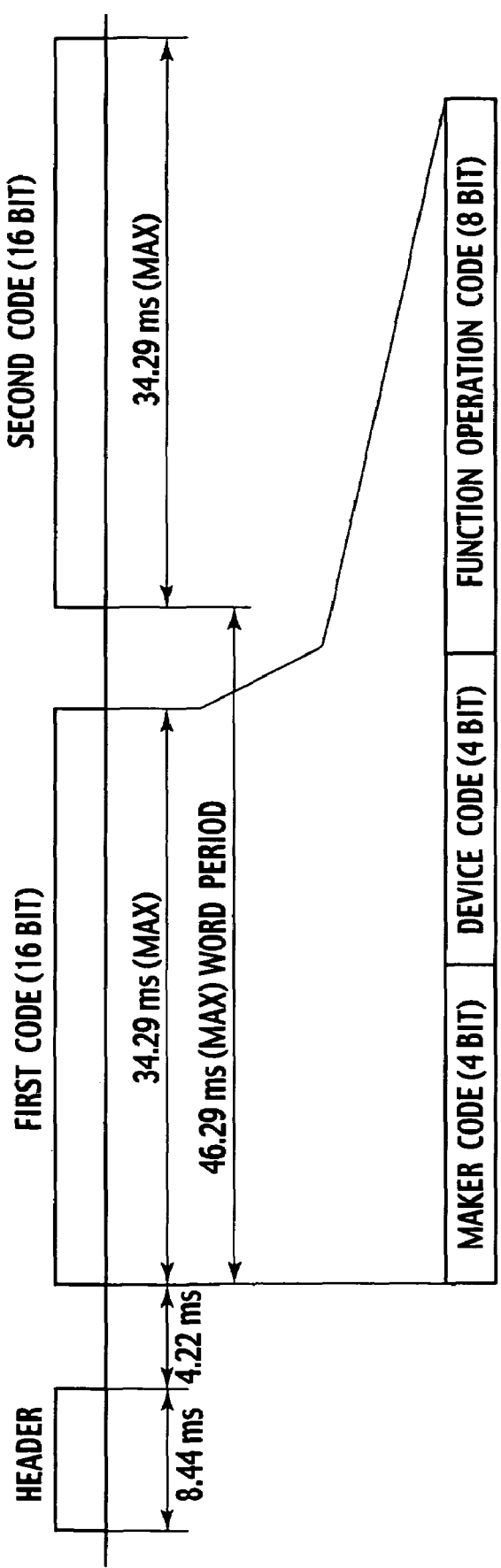
FIG. 36 shows contents of control codes of the infrared remote controller.

FIG. 36 is a view explaining contents of control codes of an infrared remote control transceiver. As a format of remote control codes, there are the common code standard called the Association for Electric Home Appliance format remote control and code standards set up by respective makers. Here, explanation will be made by citing an example out of them.

A header is output at a start of transmission to stabilize an infrared light receiver circuit (the infrared sensor 24 in FIG. 2). Then, a first code constructed by 1 word-16 bit is output and then a code having the same contents is output plural times subsequently to a second code. The bit configuration of 1 word-16 bit consists of a maker code 4 bit, a device (e.g., television, video, or the like) code 4 bit, and a function operation (e.g., channel selection) code (8 bit).

The above code standard book defines a carrier waveform using an infrared light, "1(Hi)" and "0(Lo)" waveforms of pulse, etc. A coincidence of at least 2 words of the 16-bit code must be read to receive, and a shortest time required for the reception is about 94 ms including a time for the header. When a coincidence of 4 words is read, about 186 ms is needed as a receiving time. A time required from a start of the reception to a determination of the operation is about 100 ms when a coincidence of 2 words is read, and is about 200 ms when a coincidence of 4 words is read, including a time for decoding the code.

When this time required from the reception of the infrared light to the determination of the operation is converted into a vertical period of a video signal, 6 vertical periods to 12 vertical periods are needed since one vertical period is 16.6 ms in terms of the video signal of 60 field/sec.

Figure 37:
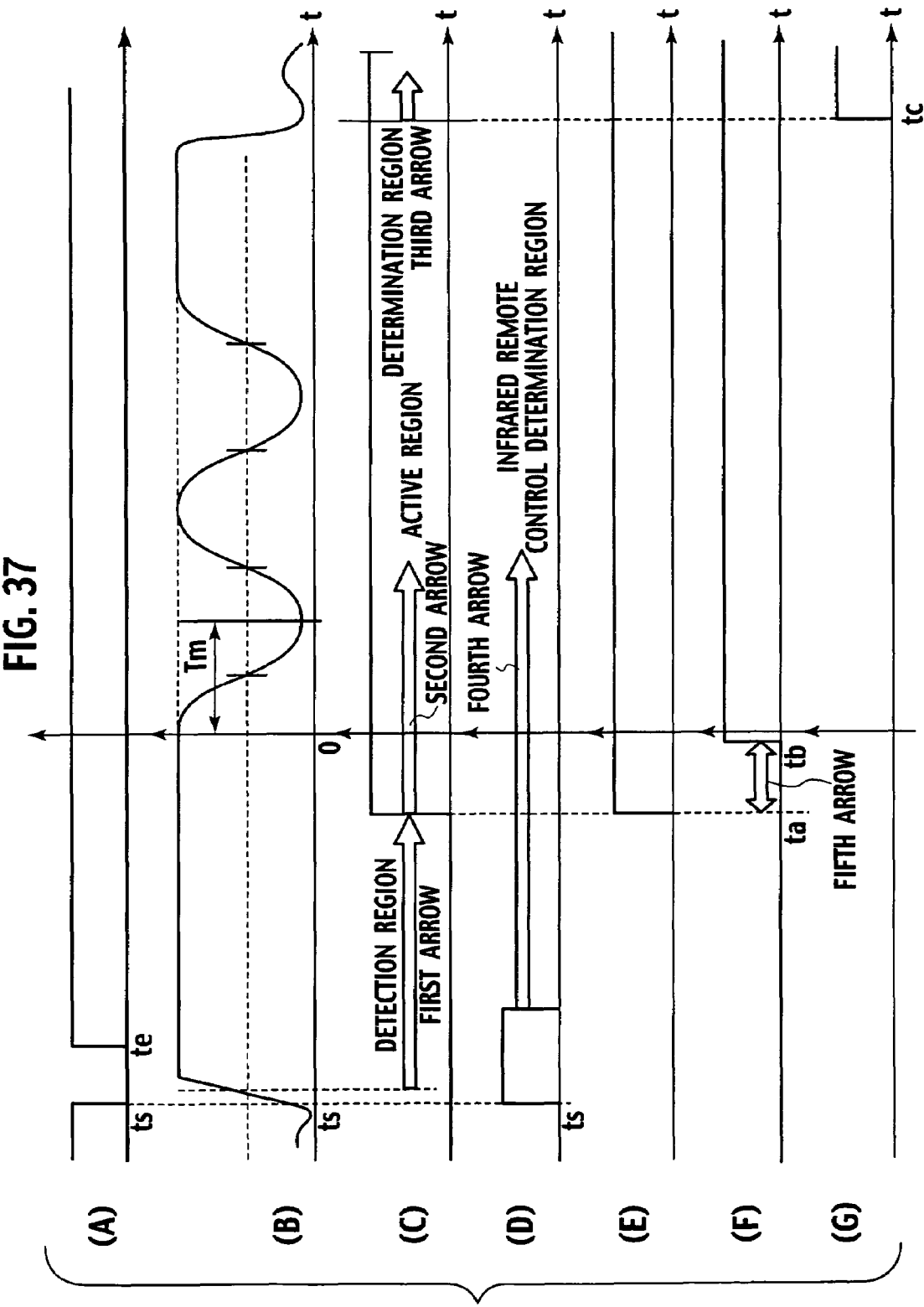
FIG. 37 is a first time chart explaining a process when an operator operates the universal remote controller used in the second embodiment.

FIG. 37 is a first time chart explaining processes executed until the determination of the operation after the universal remote controller 402 emits the light. Flow (A) of FIG. 37 shows that the universal enter button 320 is being pushed from a time ts to a time te, and the first light emission and the second light emission are started simultaneously at a time ts. Waveform (B) of FIG. 37 shows a waveform formed when a specific color light emission as the first light emission is shot by the video camera 2 and characteristics thereof are extracted by the detector 19. This waveform is the same waveform as that formed when the characteristics of the action of the hand is extracted.

Flow (C) of FIG. 37 shows a pulse indicating the active region. It is decided that the universal remote controller 402 is held toward the predetermined screen button for a period indicated by a first arrow as the detection region. Accordingly, it is decided which button has been selected. Then, the selected screen button enters into the active region in which the pulse is output for a particular period, as indicated by a second arrow. The active region is the period in which the action equivalent to the bending action of the hand made by the universal remote controller 402 is being evaluated by the cross-correlation digital filter 90. After the active region, the operation is determined in the determination region indicated by a third arrow.

Flow (D) of FIG. 37 shows a period in which contents of the infrared code that the infrared light emitting portion 306 emits at a time ts is received and decoded, and then the control content is determined. As described above, the time required from the reception of the remote control code to the determination is at least 6 vertical periods, and such period is depicted as a pulse. A fourth arrow indicates an infrared remote control determination region in which the operation made by the infrared remote controller is determined. Even when the first light emission and the second light emission are executed simultaneously, a time point at which the control is finally determined corresponds to any one of the flows (E), (F), (G) of FIG. 37 since the information processing courses after the first and second light emissions are received have a time lag.

An example shown in the flow (E) of FIG. 37 shows that the determination point is present within the infrared remote control determination region, and is determined at a leading edge of the pulse in the active region shown in the flow (C) of FIG. 37. An example shown in the flow (F) of FIG. 37 shows that the determination point is present within the infrared remote control determination region, and is determined when the overlap with the second arrow comes up to a particular period (for example, 5 vertical periods indicated by a fifth arrow). An example shown in the flow (G) of FIG. 37 shows that the control content is temporarily determined as shown in the flow (F) of FIG. 37 and is determined finally at a starting time point of the third arrow by evaluating a change of the light emission in the waveform (B) of FIG. 37.

When a quick response should be obtained, a time point shown in the flow (E) of FIG. 37 or a time point set by reducing the period indicated by the fifth arrow in the flow (F) of FIG. 37 may be employed. When the false detection should be avoided, a time point shown in the flow (F) of FIG. 37 may be employed. Also, these three determination points can be used separately according to the operation contents. For example, the control content may be determined at the time point of early response shown in the flow (E) or (F) of FIG. 37 for a play function, a pause function and the like on a menu screen of a recording device. In contrast, the control content may be determined at the time point shown in the flow (G) of FIG. 37 for a recording function on the menu screen. If Tm shown in the flow (B) of FIG. 37 is set to 10 frames, i.e., about ⅙ second, a response of the determination shown in the flows (E) and (F) of FIG. 37 is accelerated by about 1 second rather than the determination utilizing the specific color light emission shown in the flow (G) of FIG. 37. Also, it takes about 0.4 second from the pushing of the universal enter button 320 to the determination of the operation.

Figure 38:
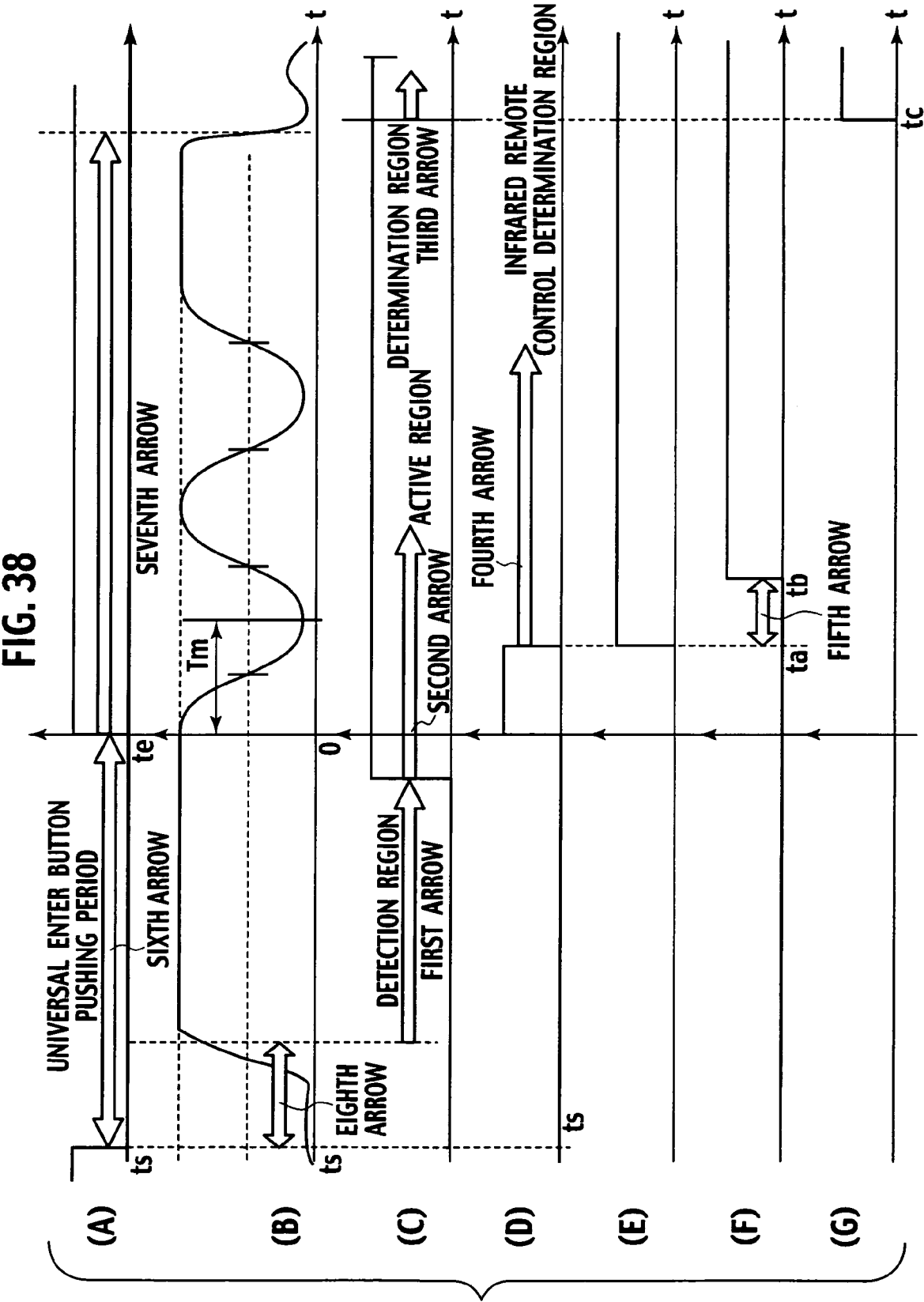
FIG. 38 is a second time chart explaining a process when an operator operates the universal remote controller used in the second embodiment.

Like FIG. 37, FIG. 38 is a second time chart explaining processes executed until the determination of the operation after the universal remote controller 402 emits the light. In an example shown in FIG. 38, a time in which the universal enter button 320 is being pushed down is prolonged rather than the case in FIG. 37, and the starting times of the first light emission and the second light emission are different. In the example shown in FIG. 37, such a situation may be considered that first the "Enter" code is transmitted via an infrared light and then the universal remote controller 402 moved from the screen button and the control does not reach the active region. However, in the example shown in FIG. 38, the user 3 can transmit the enter code of the infrared remote controller after such user understands that the control reaches the active region.

Flow (A) of FIG. 38 shows that the universal enter button 320 is being pushed from a time ts to a time te, as indicated by a sixth arrow. The user 3 checks the image of the universal remote controller 402 projected on the television screen and then pushes the universal enter button 320. First, the specific color light emission is started, and such specific color light emission is not changed and is continued until a time te at which the pushing of the button is ended. In this while, the user 3 selects a screen button to execute a desired operation, and superposes the image of the universal remote controller 402 on the concerned screen button. A period indicated by an eighth arrow shown in a waveform (B) of FIG. 38(B) corresponds to this period.

Flow (C) of FIG. 38 shows that the selected screen button is activated after a predetermined time (period indicated by a first arrow) has lapsed after the period indicated by the eighth arrow, and the active region is started at a leading edge of the pulse. Since the color or shape of the screen button is changed at this time, the user 3 checks the change of the screen button and releases the universal enter button 320 that is being pushed. An infrared light as the second light emission is emitted from the time te, at which the user released the universal enter button 320 that is being pushed, as a starting point, and then the infrared "enter" code is sent out.

Flow (D) of FIG. 38 shows an infrared remote control determination region in which the contents of the infrared code that the infrared light emitting portion 306 emits at the time te is received and decoded, and then the operation are determined. Also, as shown in the flow (B) of FIG. 38, a change in a specific color light emission as the first light emission is started from the time te as a starting point. Then, a change in the light emission, which is almost the same as the detection result of the action of the hand, is applied by the light emitting portion 305 for a period indicated by a seventh arrow in the flow (A) of FIG. 38.

A time point at which an operation is determined finally corresponds to any one of the flows (E), (F) and (G) of FIG. 38. An example shown in the flow (E) of FIG. 38 shows that the selected screen button is activated (second arrow) and then a time point at which the decoding of the emitted infrared code is ended is selected as a time point at which the operation is finally determined.

An example shown in the flow (F) of FIG. 38F shows that the selected screen button is activated (second arrow), then the decoding of the transmitted infrared code is ended, and then a time point at which a specific period indicated by a fifth arrow (e.g., 5 vertical periods) has elapsed is selected as a time point at which the operation is finally determined.

An example shown in the flow (G) of FIG. 38 shows that the control is temporarily determined in either of the flows (E) and (F) of FIG. 38 and is determined finally at a starting time point of the third arrow by evaluating a change of the light emission in the waveform (B) of FIG. 38. The determining time points shown in the flow (E) and (F) of FIG. 38 are accelerated rather than the determining time point shown in the flow (G) of FIG. 38. A difference of about 1 second is present in the response in the case in FIG. 37, but a difference in the case in FIG. 38 is smaller than FIG. 37.

In order to accomplish the above second embodiment, in FIG. 2, the infrared sensor 24 senses the infrared information emitted from the infrared light emitting portion 306 of the universal remote controller 402. The sensed output of the infrared sensor 24 is supplied to the control information determining unit 20. When it is detected by the detector 19 that a desired screen button is selected by the first light emission from the specific color light emitting portion 305 and also the detection output representing the determination of the selection of the screen button is input from the infrared sensor 24, the control information determining unit 20 executes its control operation according to the selected screen button.

In the case of FIG. 37 and FIG. 38, each operation of the "Up", "Down", "Left", "Right" buttons of a conventional remote controller are replaced with an action used to hold the universal remote controller 402 toward a screen button. Therefore, a desired screen button can be selected at a moment and the convenience in use can be improved. For example, in the case of FIG. 38, the specific color light emission as the first light emission is continued up to a time te in the waveform (B) of FIG. 38 and the subsequent light emission is inhibited, the first light emission is used only to select a screen button, and the final determination of the control is executed by the infrared code. Therefore, a light emitting time of the universal remote controller 402 can be shortened. In case a light storage material is employed as the light emitting portion 303 of the universal remote controller 402, it is difficult to form a waveform equivalent to a double-clicking. Therefore, it is preferable that the final determination of the control should be executed by the infrared code.

According to the second embodiment explained as above, a button of the universal remote controller 402 can be used commonly as an "Enter" button of the infrared remote controller in the prior art, and the decode result of the infrared code of the enter button can be utilized to determine the operation. Therefore, a period required for the operation determination can be greatly reduced.

Third Embodiment

In a third embodiment, explanation of the same portions as those in the first embodiment will be omitted herein, and differences will be explained mainly. Explanations regarding foregoing FIG. 1 to FIG. 32 are applied appropriately to the third embodiment.

Figure 39:
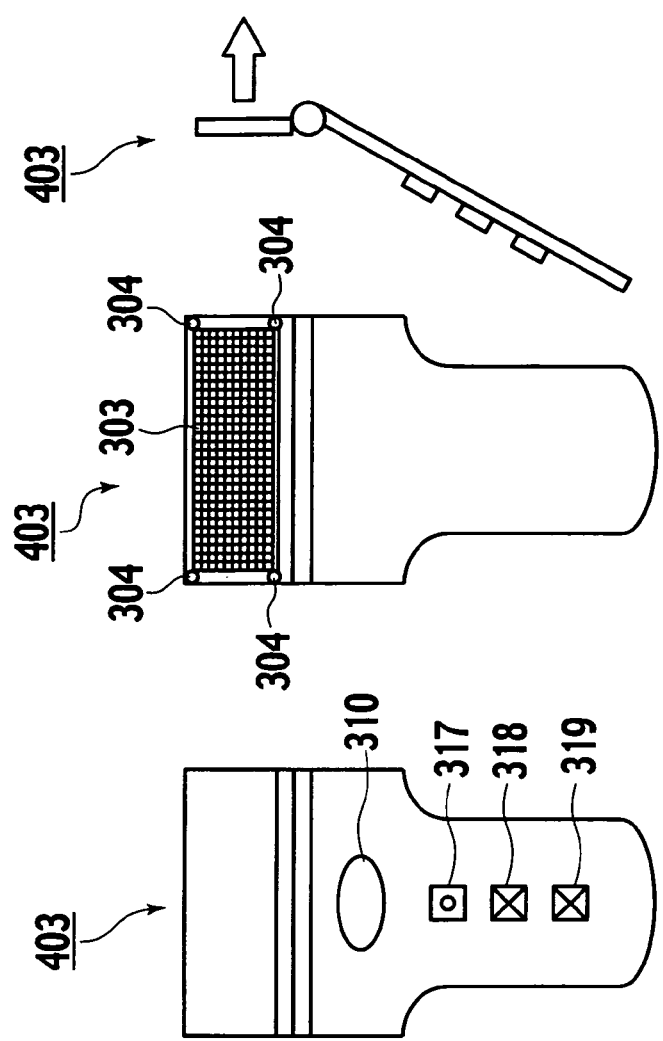
FIGS. 39A and 39E show a configurative example of a universal remote controller used in a third embodiment of the present invention.

A mode of a universal remote controller 403 in the third embodiment is shown in FIGS. 39A to 39E. FIG. 39A is a plan view showing a surface which faces to the user 3 and on which the user 3 applies an operation, and FIG. 39B is a side view. The universal remote controller 403 has the main body 301 and the foldable cover 302. FIG. 39A and FIG. 39B show a state that the cover 302 is closed, and the opened cover 302 is indicated by a broken line in FIG. 39B. The rectangular light emitting portion 303 and the circular light emitting portions 304 positioned at four corners of the light emitting portion 303 are provided to the surface, which is exposed when the cover 302 is closed, of the cover 302. FIG. 39C is a plan view of a state that the cover 302 is opened, and shows the surface that faces to the user 3. The achromatic or specific color button (referred to as the "specific color button" hereinafter) 310, and frequency region selecting buttons 317, 318, 319 are provided to the main body 301.

FIG. 39D is a plan view of a state that the cover 302 is opened when viewed from the back side, and shows a state that the light emitting portions 303, 304 are positioned on the back surface. FIG. 39E is a side view of a state that the cover 302 is opened, and the cover 302 has a some angle to the main body 301. An arrow indicated in FIG. 39E presents the lights emitted from the light emitting portions 303, 304. In place of the action of the hand, the light emitting portions 303, 304 of the universal remote controller 403 are directed to the television receiver 1, and then the light is emitted by pushing the buttons 310, 317 to 319. Then, the light emitting portions 303, 304 are shot by the video camera 2 and thus the operation contents are discriminated.

Next, the lightening contents of the light emitting portion 303 will be explained hereunder.

Figure 40:
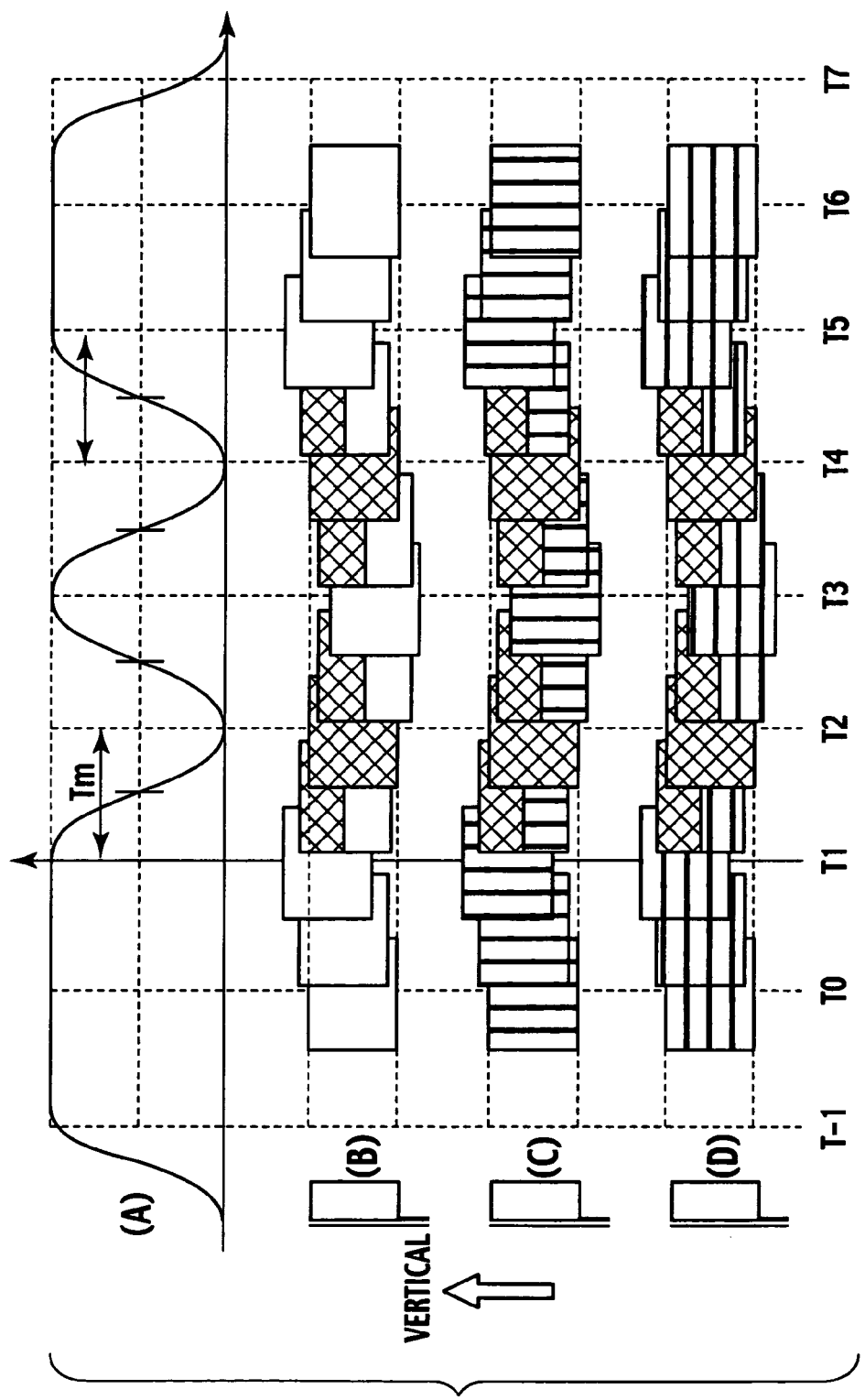
FIG. 40 is a time chart explaining contents of light emissions of light emitting elements of the universal remote controller used in the third embodiment.

Waveform (A) of FIG. 40 is the same waveform as the waveform shown in (A) of FIG. 13, and shows a change of the projected area of the action of the hand, i.e., the detected result of the APL detector 62 in FIG. 6. In diagrams (B), (C) and (D) of FIG. 40, an ordinate denotes the vertical direction of the screen and an abscissa denotes the time elapsed. Also, a square figure shows schematically a shape of the light emitting area of the light emitting portion 303, and how the light emission contents are changed with the lapse of time is shown. In (B) to (D) of FIG. 40, the crosshatching shows such a state that no light is emitted at all, the vertical thick hatching in (C) of FIG. 40 show such a state that the area from which the light is emitted and the area from which no light is emitted are aligned alternately in the vertical direction, and the horizontal thick hatching in (D) of FIG. 40 show such a state that the area from which the light is emitted and the area from which no light is emitted are aligned alternately in the horizontal direction. Also, for the sake of convenience, changes of the square figure every time are depicted to overlap mutually. In order to facilitate the understanding, the square figures are depicted to shift bit by bit in the vertical direction.

Areas of the light emitting regions of the light emitting portion 303 are changed during the light emission in (B) to (D) of FIG. 40 such that the detected results of the histogram detector 61 and the APL detector 62 in FIG. 6 give the waveform in (A) of FIG. 40. The universal remote controller 403 in the third embodiment has a spatial (horizontal, vertical) frequency region identifying function, and the light emitting portion 303 can change the contents of light emissions that can be discriminated in the spatial frequency region. The light emitting pattern in (C) of FIG. 40 is referred to as a vertical stripe light emission, and the light emitting pattern in (D) of FIG. 40 is referred to as a horizontal stripe light emission. From a standpoint of the spatial frequency region, the light emission in (B) of FIG. 40 has such a feature that the spectrum is concentrated near DC (direct current) of a frequency 0 in the region of the screen button to be detected, the vertical stripe light emission in (C) of FIG. 40 has such a feature that the spectrum is concentrated into the horizontal high-frequency region, and the horizontal stripe light emission in (D) of FIG. 40 has such a feature that the spectrum is concentrated into the vertical high-frequency region.

Figure 41:
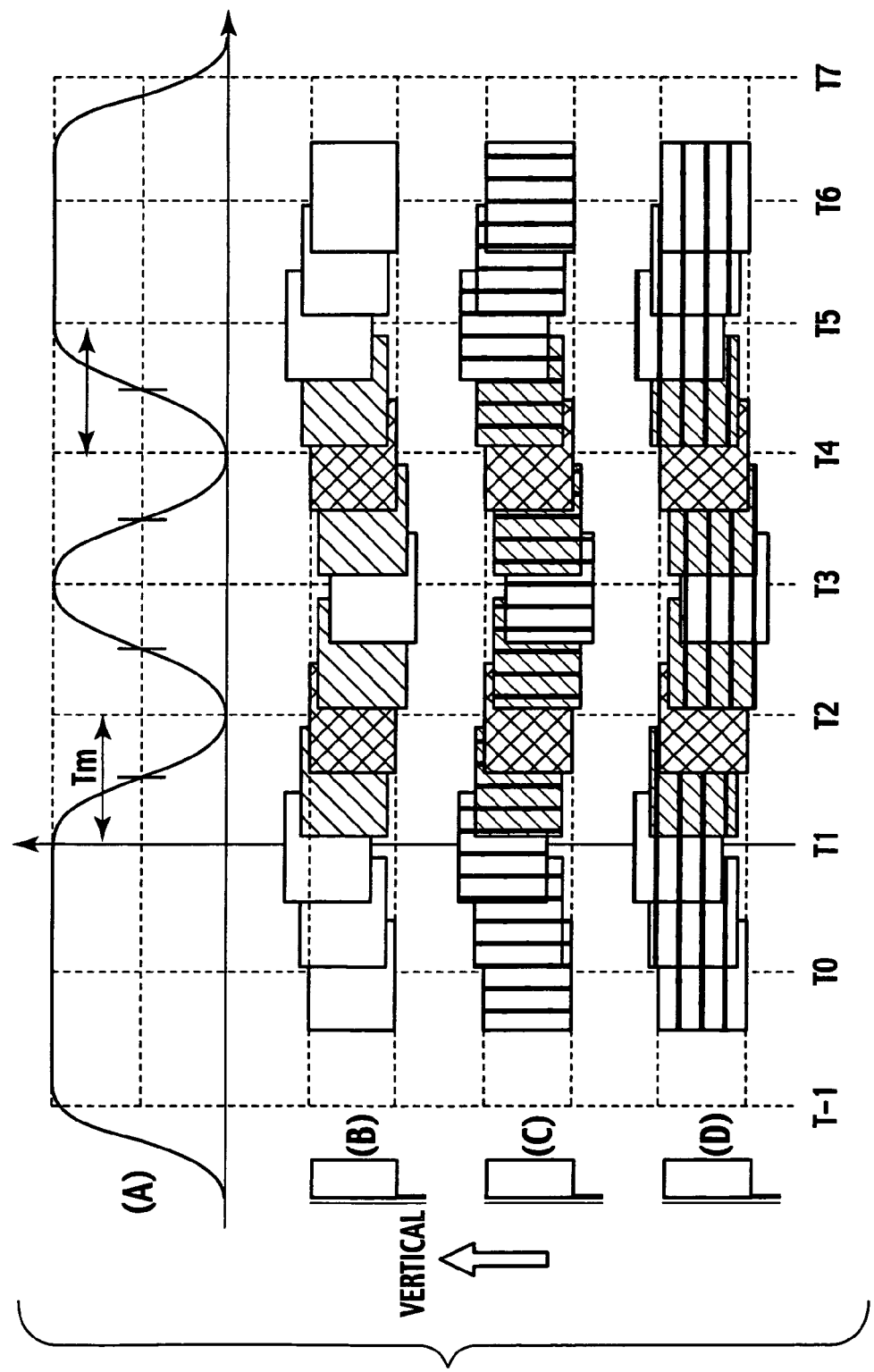
FIG. 41 is a time chart explaining contents of light emissions of light emitting elements of the universal remote controller used in the third embodiment.

FIG. 41 shows that the detected results of the histogram detector 61 and the APL detector 62 in FIG. 6 give the waveform in waveform (A) of FIG. 41 since a luminous intensity (brightness) of the light emission of light emitting element 303 is changed with the lapse of time. In FIG. 41, the crosshatching shows a state that no light is emitted at all, and the right-upward hatching shows a light emission with intermediate brightness. The vertical stripe light emission in (C) of FIG. 41 and the horizontal stripe light emission in (D) of FIG. 41 are similar to those in (C) and (D) of FIG. 40.

Figure 42:
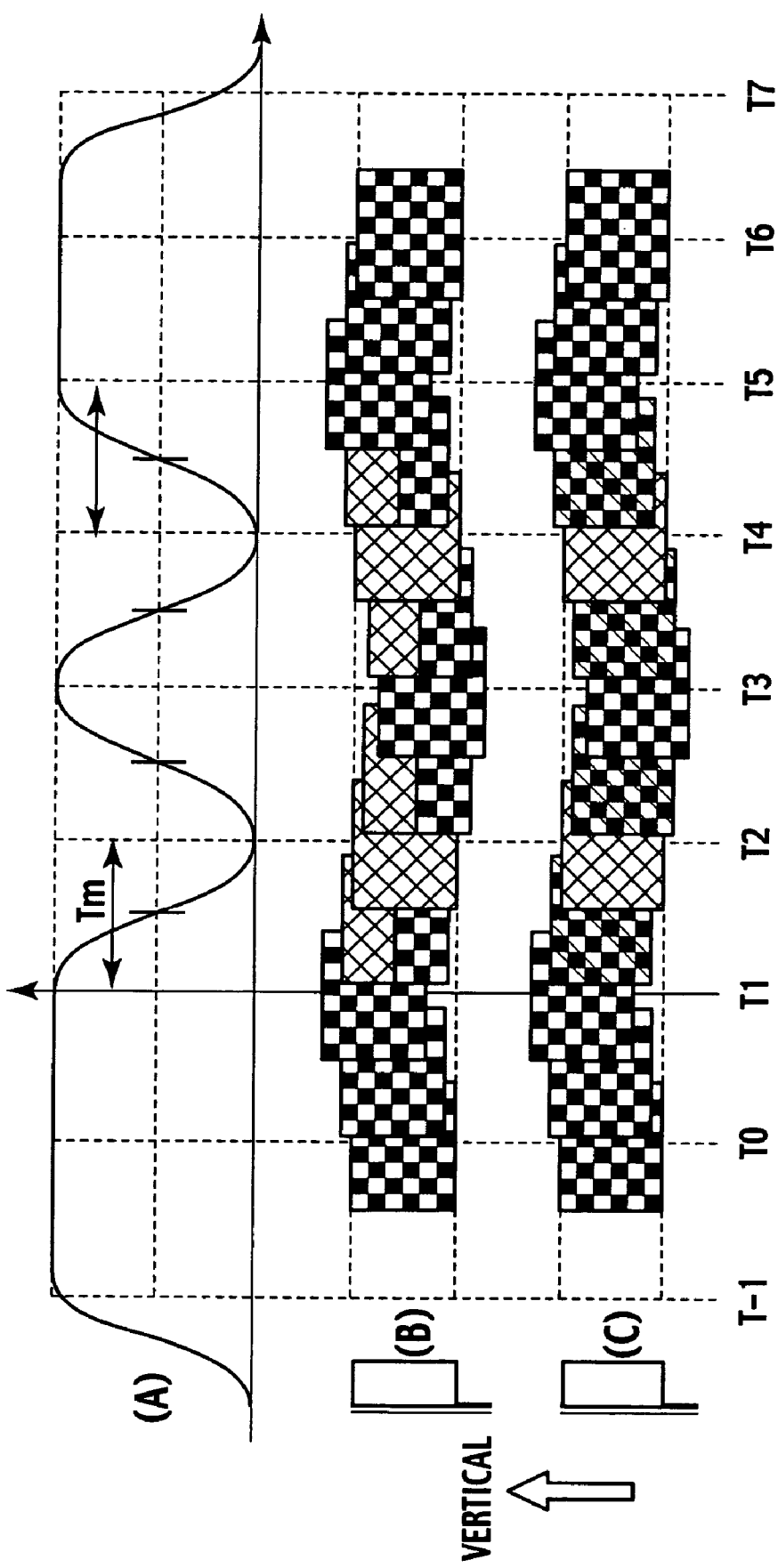
FIG. 42 is a time chart explaining contents of light emissions of light emitting elements of the universal remote controller used in the third embodiment.

FIG. 42 shows changes of the contents of the light emissions when the light emitting regions of the light emitting portion 303 are formed like a checkered lattice. In FIG. 42, the crosshatching also shows a state that no light is emitted at all, and the right-upward hatching also shows a light emission with intermediate brightness. The portion being right-upward hatched in (B) of FIG. 42 is the intermediate brightness portion. The diagram (B) of FIG. 42 shows that the light emitting area of the light emitting portion 303 is changed with the lapse of time, and the diagram (C) of FIG. 42 shows that the luminous intensity is changed with the lapse of time, so that the detected results of the histogram detector 61 and the APL detector 62 give the waveform in (A) of FIG. 42. The light emission like the checkered lattice shown in FIG. 42 can be easily discriminated from the vertical stripe light emission and the horizontal stripe light emission in the spatial frequency region. This light emission pattern is referred to as a lattice light emission in the following.

Figure 43:
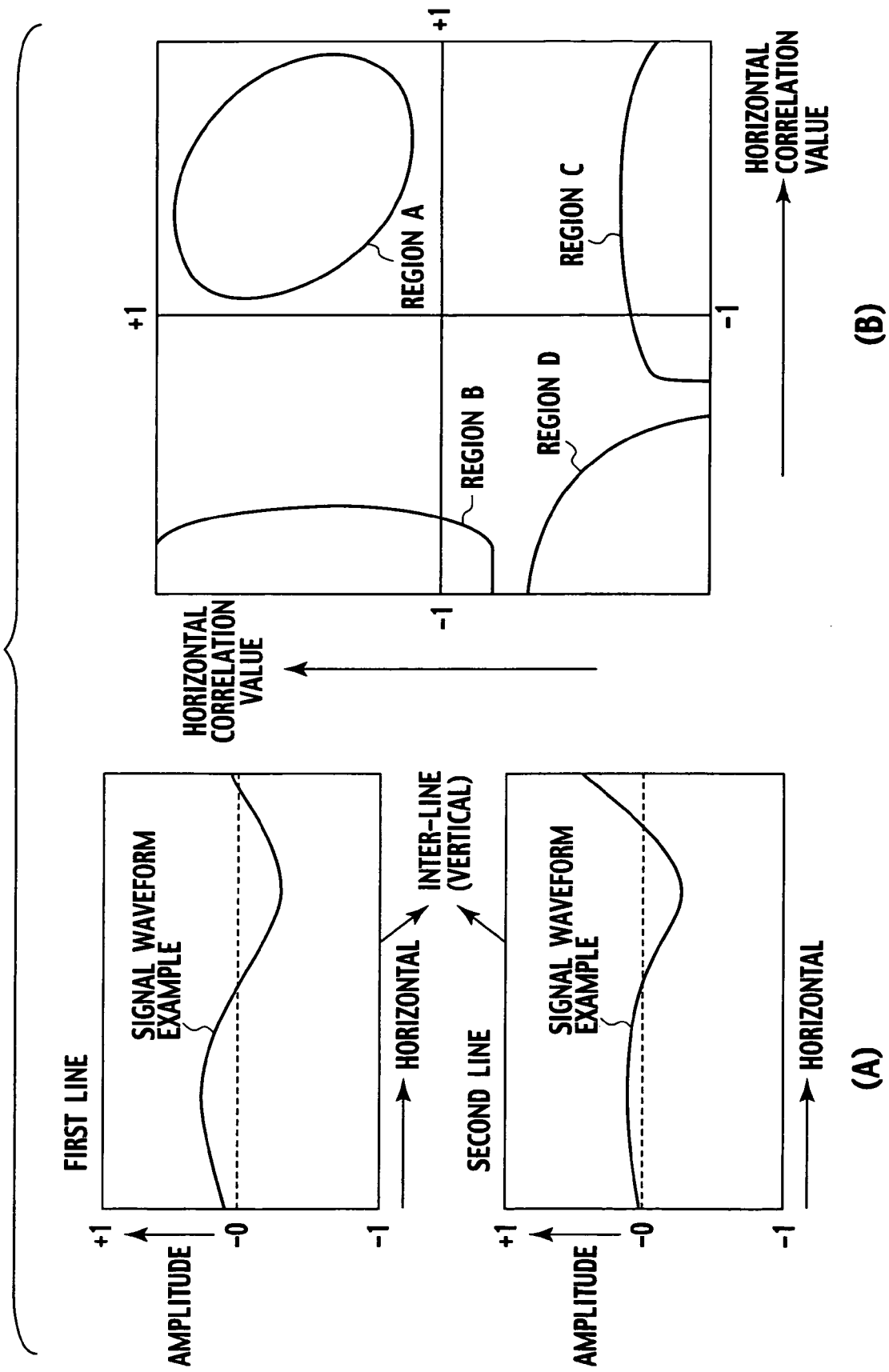
FIG. 43 shows a correlation map of images.

Next, a method of controlling the screen button based on a difference in the spatial frequency regions that different light emitting patterns of the universal remote controller 403 have will be explained hereunder. FIG. 43 is a view explaining the correlation in the space (horizontal, vertical) of the images. Diagram (A) in FIG. 43 shows a example of a waveform of an image in the horizontal direction, and 2 horizontal periods (lines) are depicted as a first line and a second line separately. An ordinate denotes amplitude, and a center value is set to 0 in a full range, a maximum value is set to +1, and a minimum value is set to −1. Here, a value obtained by multiplying the amplitudes of neighboring pixels gives a horizontal correlation value of the image. Also, a value obtained by multiplying the amplitudes of pixels in the same positions on the first line and the second line gives a vertical correlation value.

Diagram (B) in FIG. 43 shows a correlation map on which correlation values of the images in the space are plotted, wherein an abscissa denotes a horizontal correlation value (−1 to +1) and an ordinate denotes a vertical correlation value (−1 to +1). A general image picked up by the video camera 2 has high correlation in both the horizontal correlation value and the vertical correlation value, and is contained in a region A in (B) of FIG. 43. In contrast, the above vertical stripe light emission has such a feature that the horizontal correlation value is low, and its correlation value is contained in a region B in (B) of FIG. 43. Also, the above horizontal stripe light emission has such a feature that the vertical correlation value is low, and its correlation value is contained in a region C in (B) of FIG. 43. Also, the lattice light emission has such a feature that both the horizontal correlation value and the vertical correlation value are low, and their correlation values are contained in a region D in (B) of FIG. 43. In this manner, particular repetitive patterns have no correlation in the repeating direction, and respective distribution areas can be discriminated from the distribution of a general image in a correlation map shown in (B) of FIG. 43.

In other words, the vertical stripe light emission, the horizontal stripe light emission, and the lattice light emission as a light emission having a particular pattern seldom reside in a general image. For this reason, if the vertical stripe light emission, the horizontal stripe light emission, and the lattice light emission are used to emit a light from the universal remote controller 403, the false recognition in the remote controlling operation can be reduced. Also, the frequency spectrum of a general image becomes weaker in the higher frequency range. Therefore, if the particularly high-frequency component of the frequency spectrum is emitted strongly in the light emission from the universal remote controller 403, the detection in the detector 19 can be made surer.

Meanwhile, changes in the light emitting area and the luminous intensity of the light emitting portion 303 of the universal remote controller 403 and formations of the light emitting patterns such as the vertical stripe light emission, the horizontal stripe light emission, the lattice light emission, and the like can be realized by the well-known technology. Therefore, explanations of these concrete configurations will be omitted herein.

FIGS. 44A to 44D shows how a signal waveform on a screen button picked up by the video camera 2 should be changed depending upon a positional relationship between the universal remote controller 403, which emits the vertical stripe light, and the television receiver 1 having the video camera 2. FIG. 44A shows a state that the universal remote controller 403 is positioned in a position P1 that is relatively close to the television receiver 1, and a state that the universal remote controller 403 is positioned in a position P2 that is far from the television receiver 1.

The waveform in FIG. 44B shows a signal pattern formed when the vertical stripe light that the universal remote controller 403 emits from the position P1 is picked up by the video camera 2, and the waveform in FIG. 44C shows a signal pattern formed when the vertical stripe light that the universal remote controller 403 emits from the position P2 is picked up by the video camera 2. A repetitive period of the signal pattern becomes shorter as a distance from the video camera 2 to the universal remote controller 403 becomes longer. FIG. 44D shows a waveform of the signal pattern on a spatial frequency plane as a model.

In the case of the vertical stripe light emission, the spectrum distributes on the horizontal frequency axis. The spectrum from the position P2 where the universal remote controller 403 is located far from the television receiver 1 distributes on the high-frequency component side, and conversely the spectrum from the position P1 where the universal remote controller 403 is located near the television receiver 1 distributes on the low-frequency component side. Also, in the case of the horizontal stripe light emission, the spectrum distributes on the vertical frequency axis according to a difference in a distance between the universal remote controller 403 and the television receiver 1. In this manner, since the spectrum distribution changes according to the position where the user operates the universal remote controller 403, a range of the spectrum distribution must be assumed in advance to discriminate the spectrum.

Figure 45:
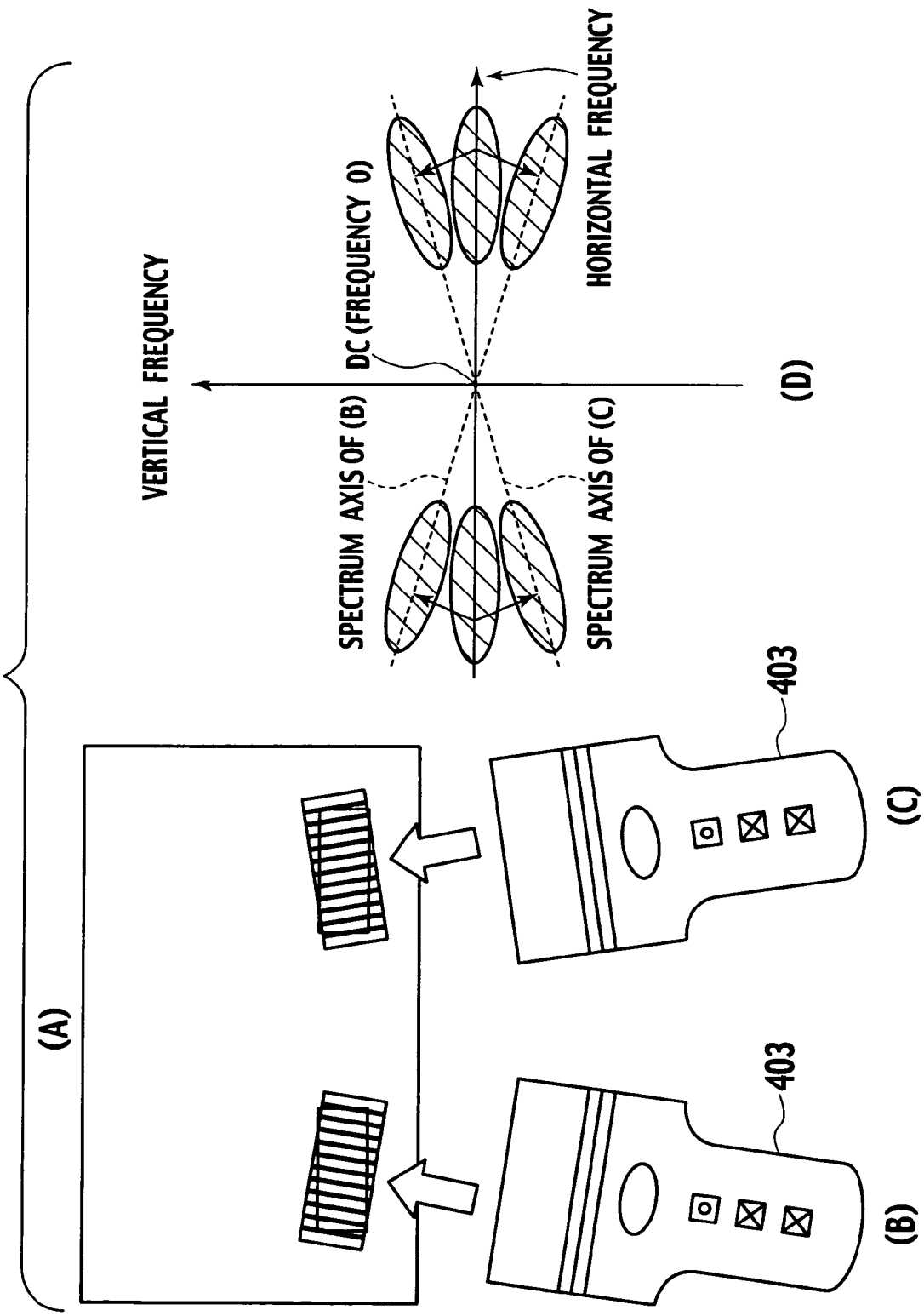
FIG. 45 shows a relationship between an inclination of the universal remote controller and the spatial frequency when the controller is caused to emit a light like a vertical stripe.

Next, a spectrum distribution derived when the universal remote controller 403 is not exactly held along the screen button in the horizontal direction will be explained hereunder. Diagram (B) in FIG. 45 shows a case where the universal remote controller 403 that emits the vertical stripe light is inclined rightward, diagram (C) in FIG. 45 shows a case where the universal remote controller 403 that emits the vertical stripe light is inclined leftward, and diagram (A) in FIG. 45 shows such a behavior that respective stripe lights are subjected to a mirror image conversion on the screen and then projected on the buttons of the menu screen to overlap with them. Diagram (D) in FIG. 45 shows a spectrum distribution on the spatial frequency plane when the universal remote controller 403 is inclined respectively. A spectrum axis of the spectrum distribution moves on the spatial frequency plane in the direction toward which the universal remote controller 403 is inclined. The spectrum axis rotates upon DC with a frequency 0 as an origin according to the rightward or leftward inclination of the universal remote controller 403 to swing up and down on a horizontal frequency axis. Therefore, in the third embodiment, it is preferable that a tolerance of this inclination should be taken into account.

Figure 46:
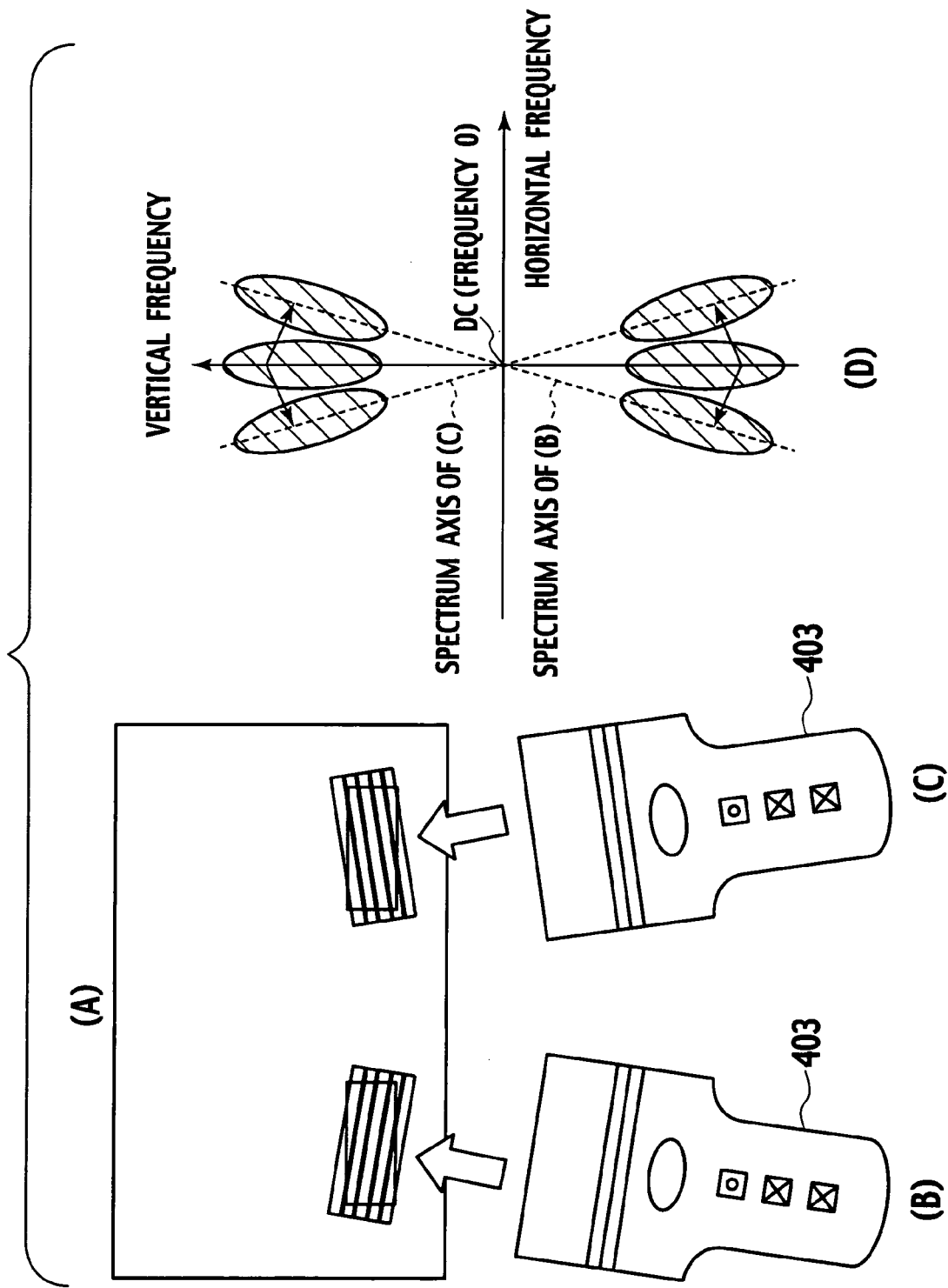
FIG. 46 shows a relationship between an inclination of the universal remote controller and the spatial frequency when the controller is caused to emit a light like a horizontal stripe.
Figure 47:
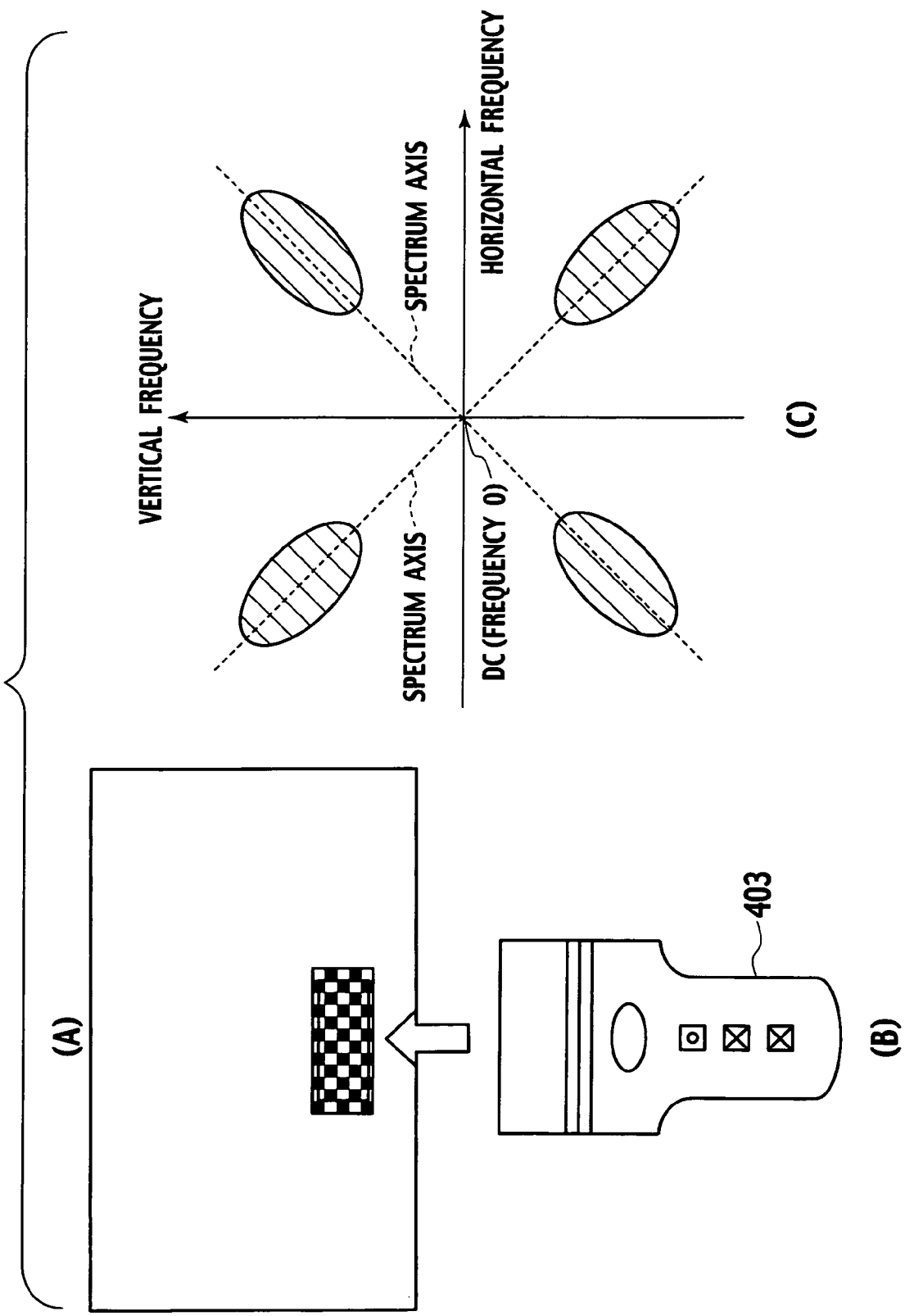
FIG. 47 shows a relationship between the universal remote controller and the spatial frequency when the controller is caused to emit a light like a lattice.

FIG. 46 shows a case where a light emission of the universal remote controller 403 provides a horizontal stripe light emission. The spectrum axis rotates upon the origin according to the rightward or leftward inclination of the universal remote controller 403 to swing right and left on a vertical frequency axis. FIG. 47 shows a case where a light emission of the universal remote controller 403 provides a lattice light emission. The spectrum axis is positioned in the oblique direction to contain a high-frequency component of both the horizontal and horizontal frequencies. Even when the universal remote controller 403 is inclined left and right, a variation of the spectrum distribution axis is not so caused as the vertical stripe light emission and the horizontal stripe light emission, though such variation is influenced by a shape and a size of the checkered lattice.

In short, as explained with reference to FIGS. 44A to 44D, a distance between the universal remote controller 403 and the video camera 2 is in proportion to the position of the spectrum on the spatial frequency plane. When the universal remote controller 403 is brought close to the video camera 2, the spectrum distribution comes close to DC as the origin of the spatial frequency plane. Also, when the universal remote controller 403 is inclined, the distribution axis of the spectrum distribution on the spatial frequency plane rotates upon the origin. Therefore, in order to discriminate the frequency region, the signal must be filtered like a fan around the origin of the spatial frequency plane with regard to these variations of the spectrum.

Figure 48A:
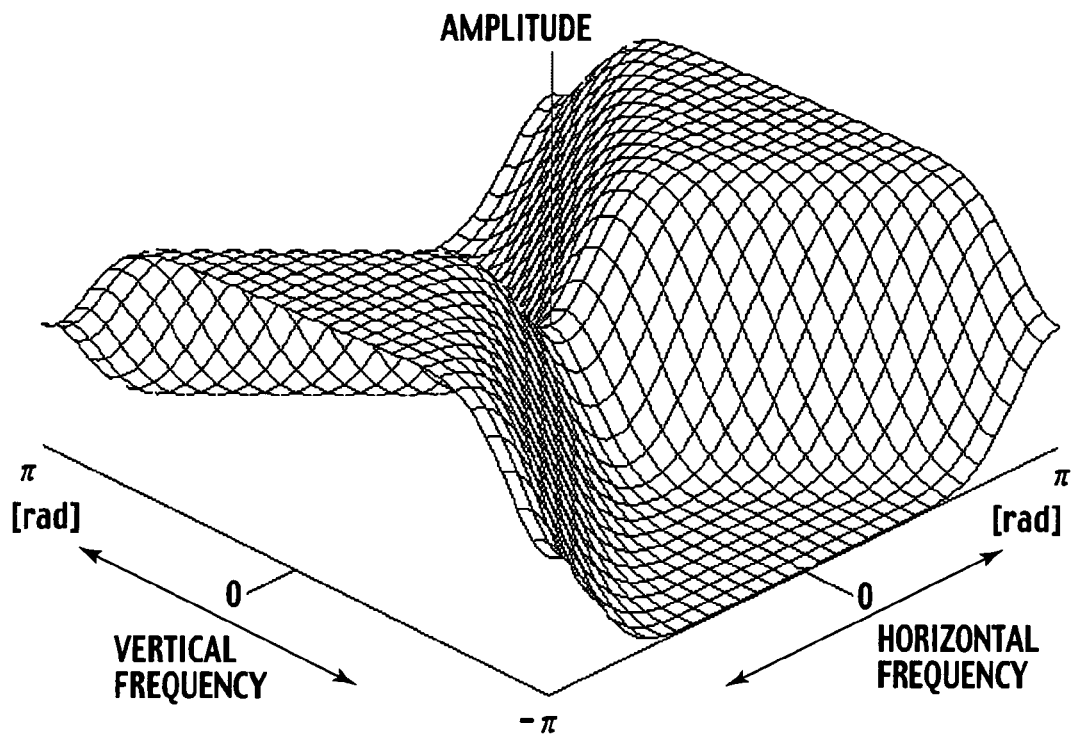
FIGS. 48A and 48B show a design example of a 90-degree fan filter that has a pass band in the horizontal direction.
Figure 48B:
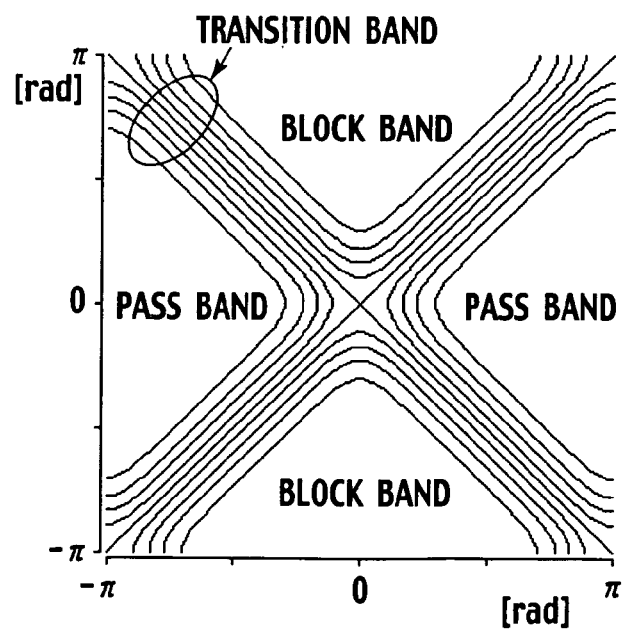
Figure 49A:
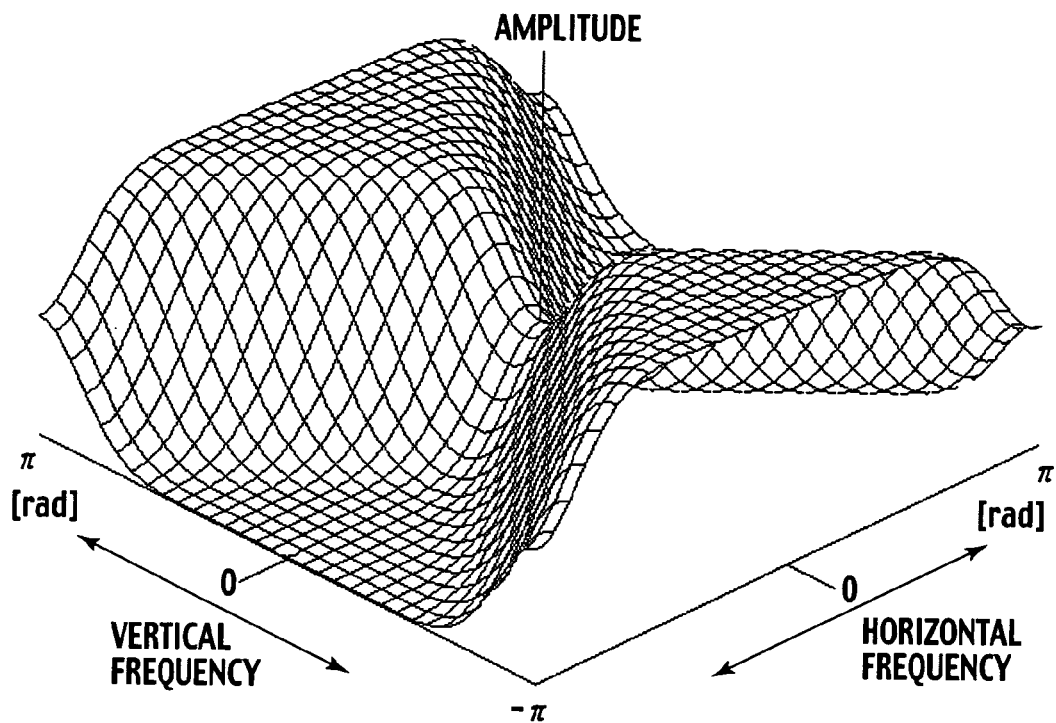
Figure 49B:
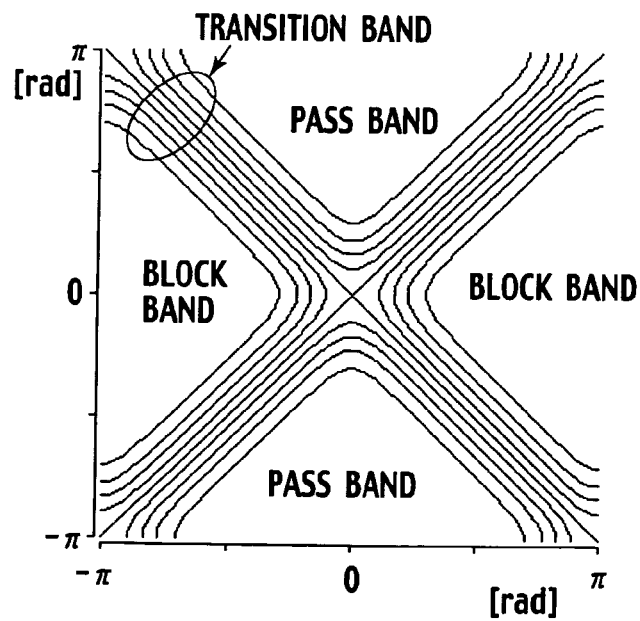

Now, a fan filtering used to distinguish between the vertical stripe light emission and the horizontal stripe light emission will be explained by using a design example hereunder. Normally a filter having a shape of fan around the origin is called a fan filter or a velocity filter. FIGS. 48A and 48B show a design example of a 90-degree fan filter that has a pass band in the horizontal direction. FIGS. 49A and 49B show another design example of a 90-degree fan filter that has a pass band in the vertical direction.

Both filters shown in FIGS. 48A and 48B and FIGS. 49A and 49B are composed of a two-dimensional half band FIR filter having a flattest characteristic, and have such features that the number of taps is small and a scale of the hardware can be suppressed, and a ringing in a waveform response is small. Therefore, this filter provides a filter system that is effective to discriminate frequency regions of the universal remote controller 403. A light emission dependent upon a frequency region can be discriminated if a pass band of these filters is set to fit the spectrum of light emitted from the universal remote controller 403. Here, the filter used to discriminate the frequency region is not limited to the fan filter. Any filter may be used if the pass band of the filter can be set to agree with the spectrum distribution band on the spatial frequency plane that depends on a horizontal level (inclination) of the universal remote controller 403 and the position of the universal remote controller 403 (distance between the universal remote controller 403 and the video camera 2).

In FIGS. 48A and 48B and FIGS. 49A and 49B, "rad" represents a radian as a unit of the horizontal and vertical frequencies of a discrete signal, and 2p is a sampling frequency and p is a Nyquist limit frequency. When the universal remote controller 403 is operated in the position that is far from the television receiver 1, sometimes the vertical stripe light emission and the horizontal stripe light emission cannot be caught by a resolving power of the video camera 2. But such light emission can be detected similarly if a folded component that exceeds the Nyquist limit exists in the pass band of the filter on the two-dimensional plane. In this case, such light emission can be detected on the conditions that the region pass used to permit the folding of the continuous signal portion is provided and also the folded component is not folded back into a different frequency region on the two-dimensional plane.

Figure 50:
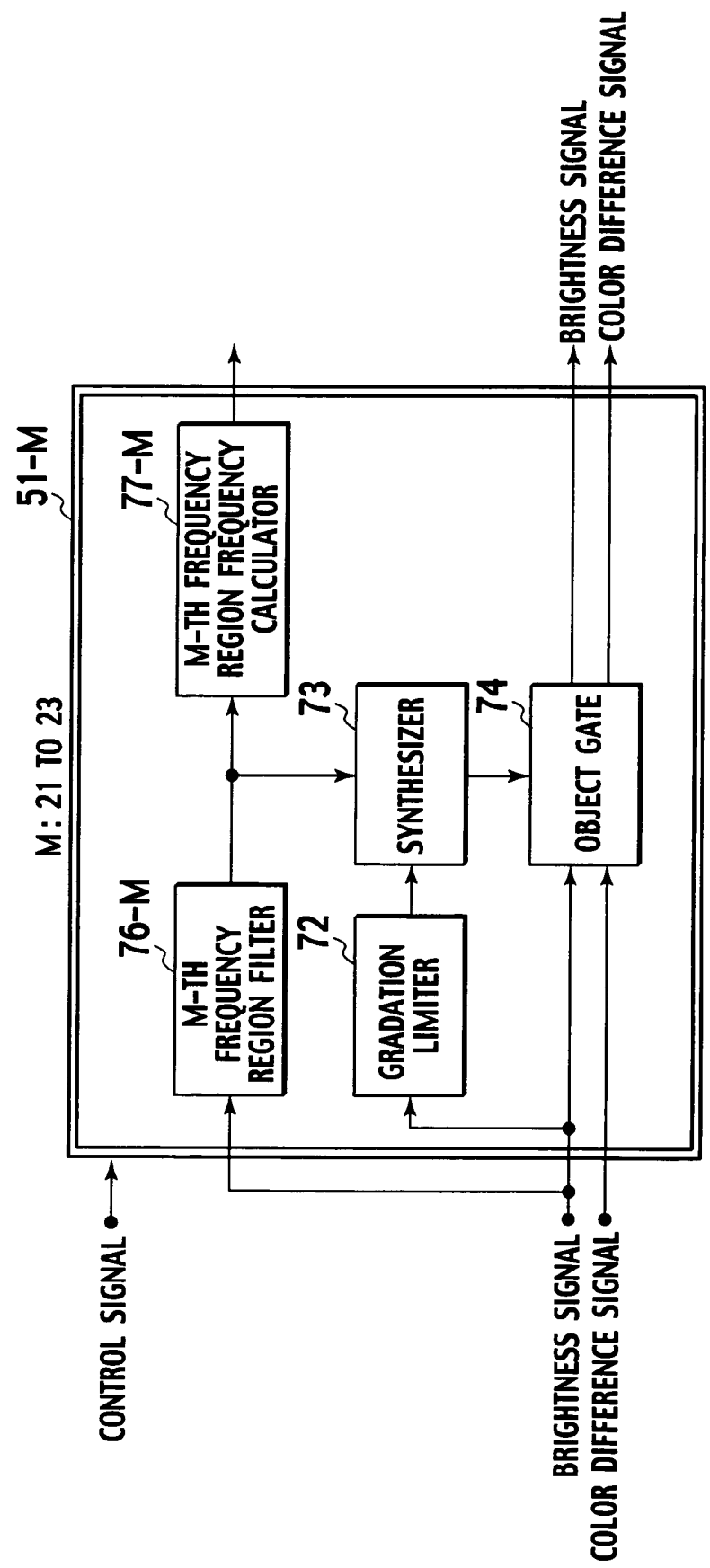
FIG. 50 is a block diagram showing a configuration of a frequency discrimination object extractor.

FIG. 50 is a block diagram showing a configuration of the object extractor 51-M (M: 21 to 23) having a spatial frequency region discriminating function. Here, the specific color filter 71 of the object extractor 51 shown in FIG. 7 is changed into an M-th frequency region filter 76-M (M is a positive integer), and an M-th frequency region frequency calculator 77-M is added. Where M is 1 to 3. The M-th frequency region filter 76-M is composed of a two-dimensional digital filter such as the above fan filter, which divides a luminance signal in the spatial frequency region. M is a division number of the spatial frequency region. The M-th frequency region frequency calculator 77-M calculates a frequency of a spectrum that passed through the M-th frequency region filter 76-M. When this passed spectrum is a high-frequency component that does not contain the DC component, the amplitude of the spectrum swings in the positive and negative directions. Therefore, the M-th frequency region frequency calculator 77-M causes a counter (not shown) to count up when an absolute value of the amplitude exceeds a particular value, and calculates the frequency of the spectrum that passed through the M-th frequency region filter 76-M. Also, the frequency may be calculated by evaluating an intensity of the spectrum, i.e., a magnitude of the amplitude of the waveform. When a DC component is contained, the M-th frequency region frequency calculator 77-M causes the counter to count up simply when the amplitude value exceeds a particular value, and calculates the frequency in the M-th frequency region.

The gradation limiter 72 limits gradation of a brightness signal. Here, a wide gradation area in the amplitude direction does not become a problem since the universal remote controller 403 is utilized, but it is evaluated whether or not the average value of the gradation from which a high-frequency component thereof is removed is in a desired gradation range. The input brightness signal and color difference signals are gated by the object gate 74 dependent upon an output of the synthesizer 73. The synthesizer 73 logically synthesizes outputs of the M-th frequency region filter 76-M and the gradation limiter 72, and ANDs both outputs to gate the object gate 74 when respective outputs are 1. Here, this process is executed by using the binary value of 1, 0, for example. In place of this process, the outputs of the M-th frequency region filter 76-M and the gradation limiter 72 may arithmetically operated by the synthesizer 73 according to the intensity of the spectrum or the gradation of the brightness signal, and then gated by the object gate unit 74 according to the gradation of the synthesizer output.

Figure 51:
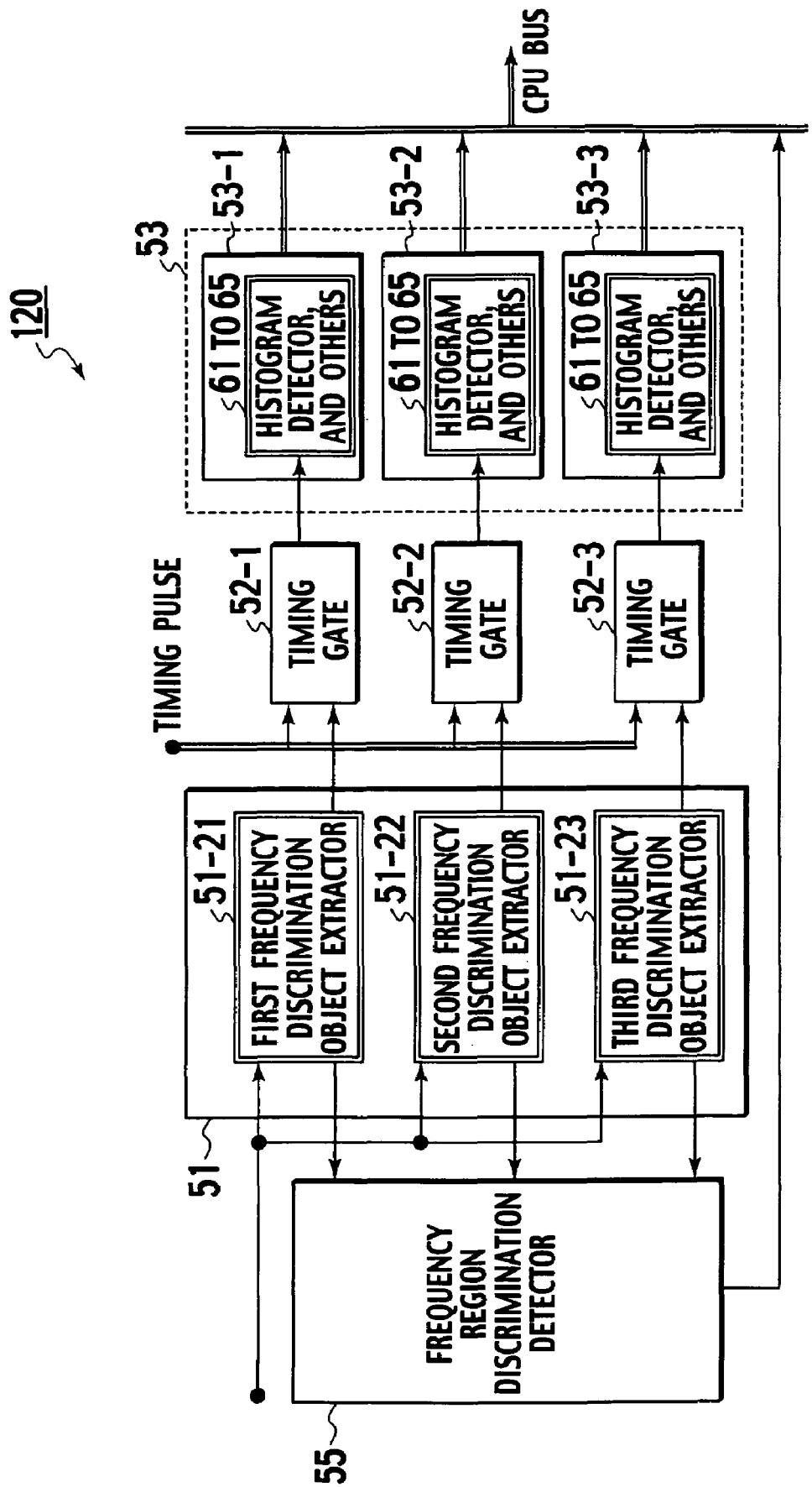
FIG. 51 is a block diagram showing a configuration of a detector containing the frequency discrimination object extractor.

FIG. 51 is a block diagram showing a configuration of a spatial frequency region discriminating detector 120. This detector 120 is provided in the detector 19 in FIG. 2, and provided to respective screen buttons. This detector 120 has first to third frequency discrimination object extractors 51-21 to 51-23 in which filters having three different frequency regions as a pass band are built respectively, timing gates 52-1 to 52-3, object characteristic data detector 53-1 to 53-3, and a frequency region discrimination detector 55.

An output of the object gate 74 in the M-th frequency discrimination object extractor 51-M (M: 1 to 3) corresponding to three different frequency regions is input into the timing gate 52-M (M: 1 to 3), and an output of the M-th frequency region frequency calculator 77-M (M: 1 to 3) is input into the frequency region discrimination detector 55. The frequency region discrimination detector 55 calculates maximum values of the frequencies of spectrums in respective frequency regions. This is because the frequency component of the right that the universal remote controller 403 emits to a screen button shows the highest frequency. The frequency region discrimination detector 55 transfers a value indicating the frequency region, from which the maximum value is output, to the control information determining unit 20. The control information determining unit 20 uses this value to decide which frequency region is effective, i.e., which screen button is effective and which content is to be controlled.

The three timing gates 52-M (M: 1 to 3) execute the gating process at the same timing. This is because three frequency regions are discriminated for a region corresponding to one screen button. The gated signal is supplied to the object characteristic data detector 53-M (M: 1 to 3) provided every frequency region. The data such as the histogram, etc. obtained by the detectors 61 to 65 in the object characteristic data detector 53-M are transferred to the control information determining unit 20 via a CPU bus. Since the control information determining unit 20 can decide which frequency region is effective, based on the information input from the frequency region discrimination detector 55, it processes the data in one effective region out of the object characteristic data detector 53-M (M: 1 to 3).

Figure 52:
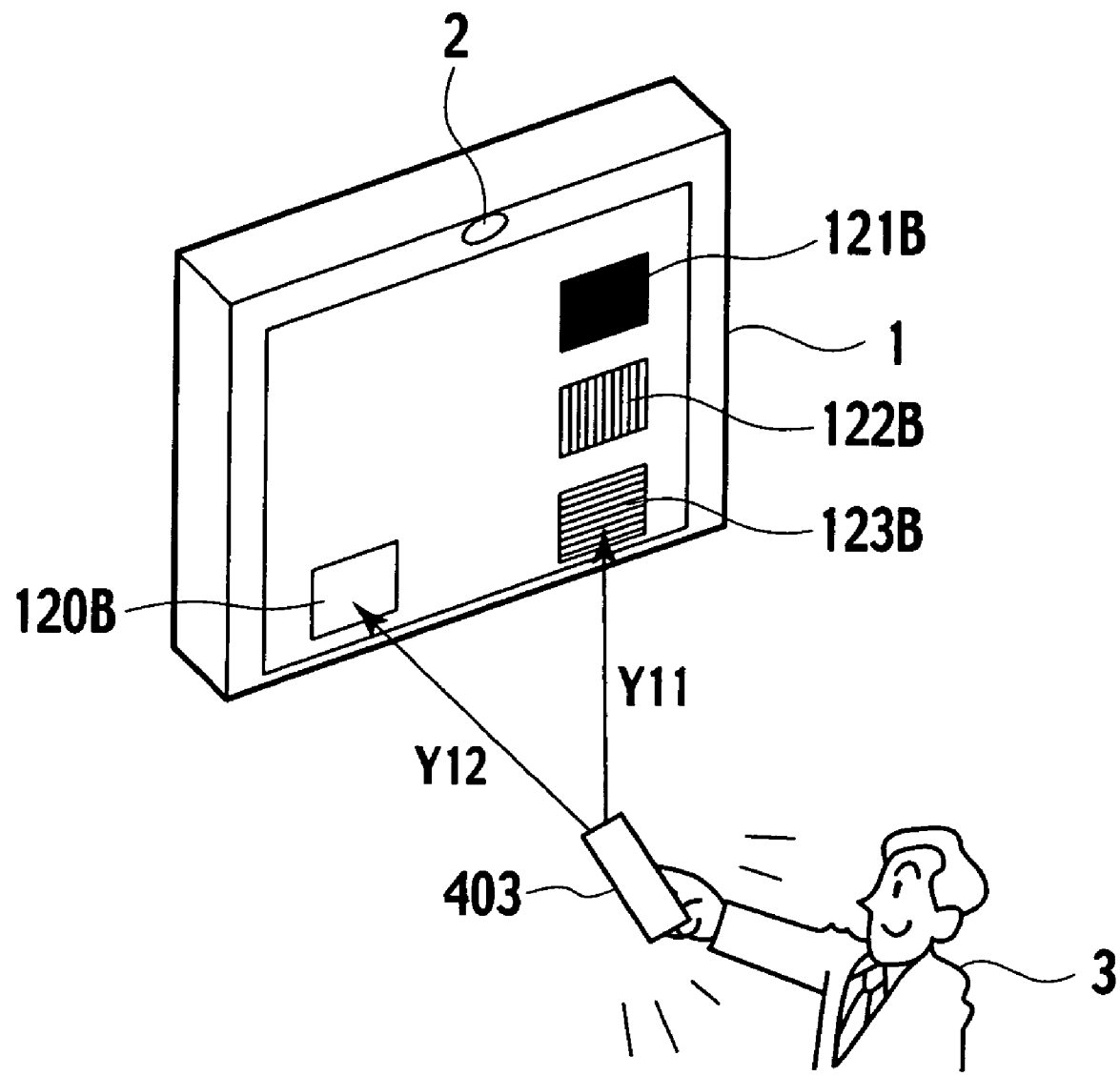
FIG. 52 shows an outline of an operation using the universal remote controller used in the third embodiment.

Next, how the frequency of each frequency region calculated by the M-th frequency region frequency calculator 77-M in the M-th frequency discrimination object extractor 51-M having a spatial frequency region discriminating function should be processed will be explained hereunder. FIG. 52 is a view explaining an operation made by the user 3 like FIG. 16, but is different from FIG. 16 in that the menu depicted by the graphics consists of one achromatic button 120B and three pattern buttons, i.e., a uniform gray button 121B, a vertical stripe button 122B, and a horizontal stripe button 123B. The indications representing the functions of the buttons, e.g., "Power", "Channel", "Volume", "Input Switching", or the like are not put on the buttons of the universal remote controller 403. Such indication is put on three pattern buttons 121B to 123B on the graphic menu on the screen, and the user 3 selects a desired button on the screen according the indication.

Then, the user 3 moves the universal remote controller 403 in FIGS. 39A and 39E projected on the screen onto the desired button out of three pattern buttons 121B to 123B on the screen, and then pushes down the specific color button 310. Arrow Y11 in FIG. 52 shows such operation. Similarly, the user 3 moves the universal remote controller 403 in FIGS. 39A to 39E projected on the screen onto the achromatic button 120B at the lower left-hand corner of the screen, and then pushes down any one of three frequency region selecting buttons 317 to 319 on the universal remote controller 403. Arrow Y12 in FIG. 52 shows such operation.

The user 3 checks the desired function out of the functions put on the pattern buttons 121B to 123B on the screen, then checks the pattern of the screen button having such function, and then selects a button of the universal remote controller 403, to which the concerned pattern is assigned, to push it. The principle applied to recognize respective patterns on the screen is similar to the case where a hand is held, and the light emitted from the universal remote controller 403 is given as shown in (B), (C) and (D) of FIG. 40, (B), (C) and (D) of FIG. 41, or (B), (C) and (D) of FIG. 42. A achromatic color or specific color emitted by pushing the specific color button 310 of the universal remote controller 403 is applied to three pattern buttons 121B to 123B on the screen, and the light emitting pattern emitted by pushing selectively three frequency region selecting buttons 317 to 319 is applied to the achromatic button 120B on the screen. A difference between two types of above operations is understood as a difference between one in which a button on the screen is selected and the other in which a button of the universal remote controller 403 is selected.

In order to facilitate the understanding of the operation to select a frequency region, the uniform gray button 121B, the vertical stripe button 122B, and the horizontal stripe button 123B are used as three pattern buttons. But the numbers such as 1, 2, 3 may be used instead of the pattern.

Next, how two types of selecting operations made by the user 3 should be detected by the detector 121 will be explained along with an example shown in FIG. 53 hereunder. Diagram (A) in FIG. 53 shows a screen on which a menu of the television receiver 1 and a video camera signal are mixed. Diagram (B) in FIG. 53 shows contents of buttons of the universal remote controller 403. Diagram (C) in FIG. 53 shows the detector 19 and the control information determining unit 20 corresponding to the menu depicted in (A) of FIG. 53. The contents of the menu are similar to the contents depicted in FIG. 52, and three pattern buttons 121B to 123B indicating three frequency regions on the screen and the achromatic button 120B are shown. The signs of the achromatic button 120B and three pattern buttons 121B to 123B indicating three frequency regions in (A) of FIG. 53 correspond to the detectors 121 to 123 respectively. Also, the numbers of the detectors corresponding to respective buttons 310, 317 to 319 of the universal remote controller 403 are shown in (B) of FIG. 53, and in addition the correspondence between the achromatic button 120B and the pattern buttons 121B to 123B in (A) of FIG. 53 and the numbers of the detectors 120 to 123.

Figure 54A:
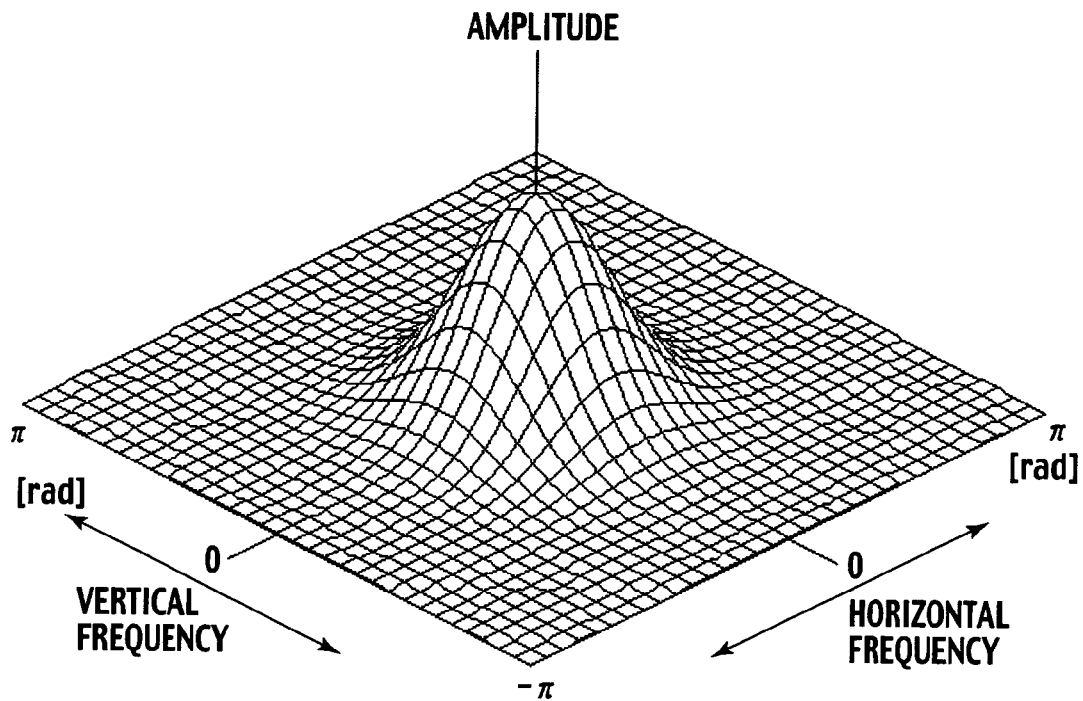
FIGS. 54A and 54B show a design example of a low-pass filter.
Figure 54B:
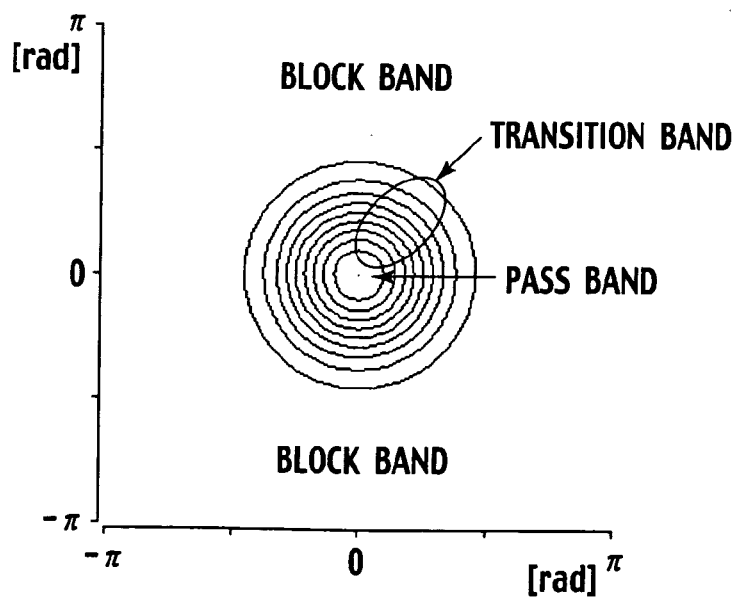
Figure 55A:
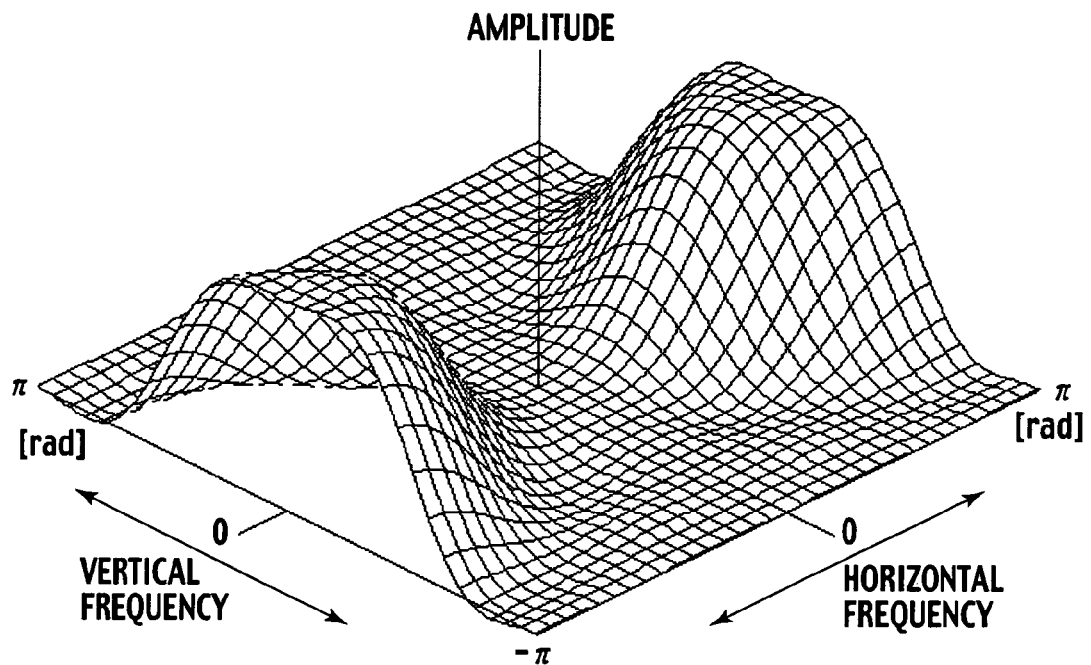
FIGS. 55A and 55B show a design example of a horizontal high-pass filter.
Figure 55B:
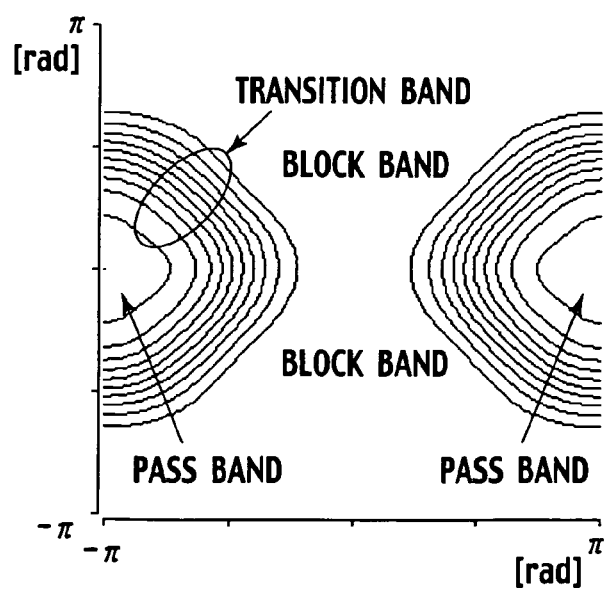
Figure 56A:
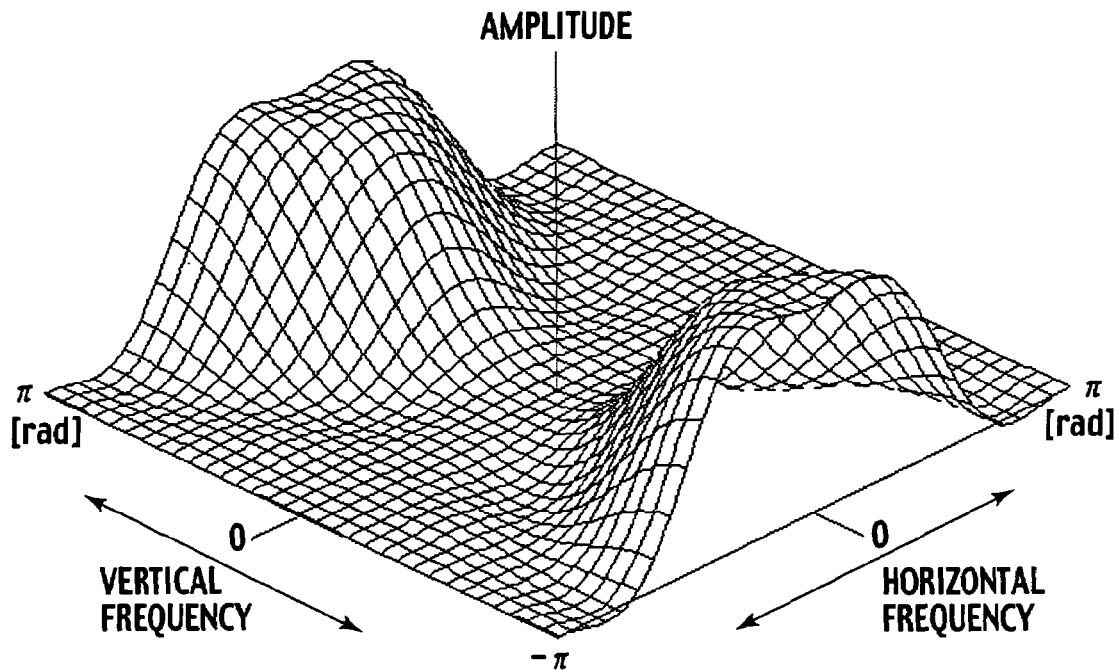
FIGS. 56A and 56B show a design example of a vertical high-pass filter.
Figure 56B:
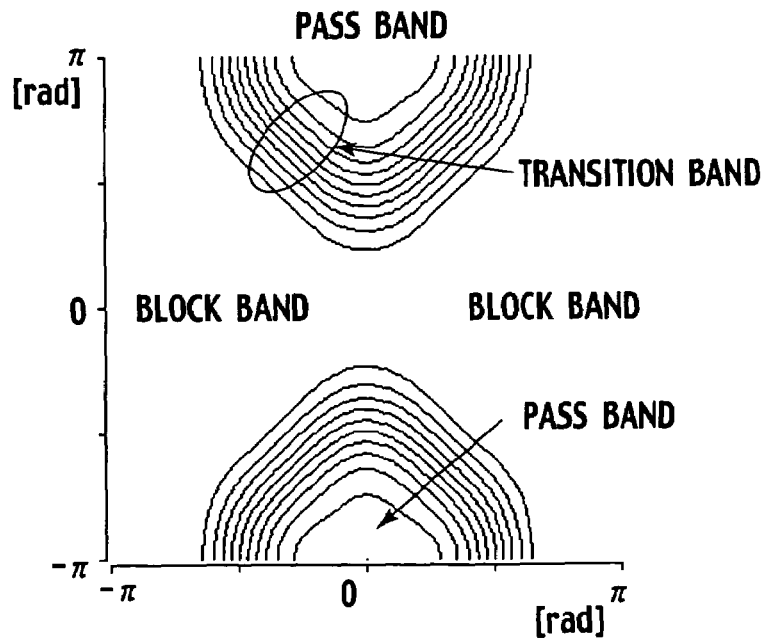

The achromatic button 120B is operated by any one of three frequency region selecting buttons 317 to 319 of the universal remote controller 403. Therefore, the detector 120 provided to correspond to the achromatic button 120B receives information about three types of patterns (light emitting patterns) through the video camera 2, and thus the detector 120 has to discriminate the pattern. Accordingly, the detector 120 is a spatial frequency region discriminating detector having the frequency discrimination object extractor 51 that can discriminate the spatial frequency region shown in FIG. 51. A frequency region filter provided to the first frequency discrimination object extractor 51-21 in FIG. 51 is a filter having such a characteristic that the pass band of a spectrum is located near DC, as shown in FIGS. 54A and 54B. A frequency region filter provided to the second frequency discrimination object extractor 51-22 is a filter having such a characteristic that the pass band of the spectrum is located in a high-frequency range of the horizontal frequency, as shown in FIGS. 55A and 55B. A frequency region filter provided to the third frequency discrimination object extractor 51-23 in FIG. 51 is a filter having such a characteristic that the pass band of the spectrum is located in a high-frequency range of the vertical frequency, as shown in FIGS. 56A and 56B. Three types of control information can be discriminated by the achromatic button 120B according to a difference of the pass band of the spectrum.

Meanwhile, the user 3 moves the position of the universal remote controller 403 projected on the screen onto a desired button out of three pattern buttons 121B to 123B, and then pushes a specific color button 310 of the universal remote controller 403. In this case, since three types of controls are discriminated according to the screen position, the detector 121 to 123 may have the object extractor 51-M similar to that in FIG. 50.

The detector 120 having the frequency discrimination object extractor 51 causes the timing gate 52-M to pass a light only within a range of the position of the screen button, and then transfers data in that range such as histogram, APL, high-frequency frequency, MIN, MAX, etc. to the control information determining unit 20. Then, the control information determining unit 20 determines the control operation according to the detection region, the active region, and the determination region, which are evaluated based on the data input described above. The frequency region discrimination detector 55 in the detector 120 generates information about an effective frequency region according to the signal from the frequency discrimination object extractor 51, and then transfers the information to the control information determining unit 20. The control information determining unit 20 evaluates the data from any one of the object feature data detectors 53-1 to 53-3 in the effective frequency region, and detects the control operation.

As described above, in the third embodiment, a light having a light emission pattern corresponding to a particular spatial frequency region can be emitted by the light emitting portion 303 of the universal remote controller 403. Therefore, such light can be distinguished from general images without fail and thus any erroneous recognition in the detector 19 can be prevented. In this case, the light emission pattern is not limited to the vertical stripe light emission, the horizontal stripe light emission, the lattice light emission, and the gray light emission, and the number of the light emission patterns are be set arbitrarily.

Fourth Embodiment

In a fourth embodiment, a color discriminating function is added in addition to the spatial frequency region discriminating function in the third embodiment.

Figure 57:
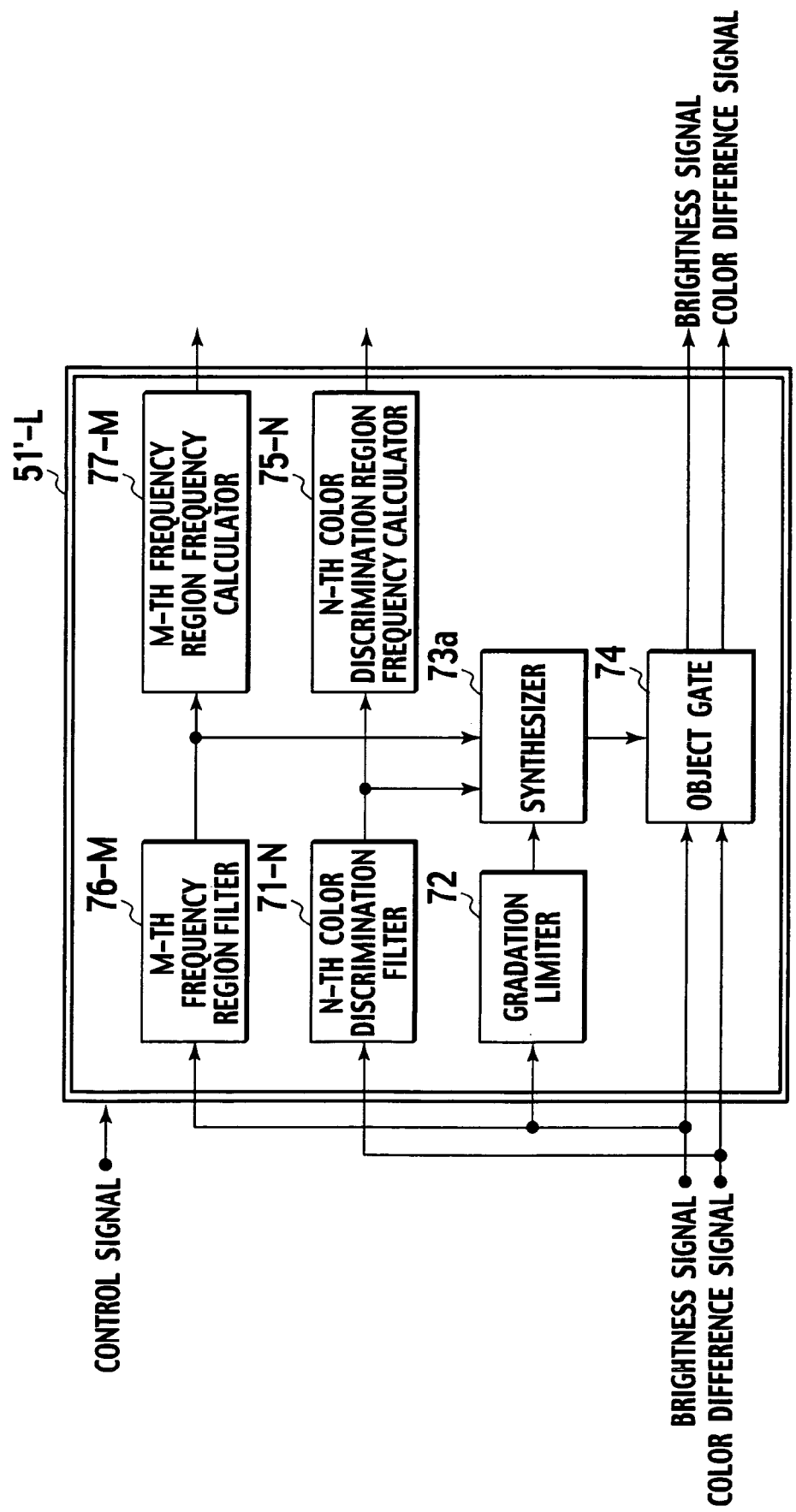
FIG. 57 is a block diagram showing a configuration of a frequency/color discrimination object extractor in a fourth embodiment of the present invention.

FIG. 57 is a block diagram showing an object extractor 51'-L in which a color discriminating function is incorporated into the object extractor 51-M having the spatial frequency region discriminating function shown in FIG. 50. L is a value obtained by multiplying the maximum value of M by the maximum value of N. In FIG. 57, the same reference symbols are affixed to the same portions as those in FIG. 50. Like FIGS. 15A to 15E, the buttons used to emit the light in six colors, for example, are provided to the universal remote controller 403. An N-th color discrimination filter 71-N in FIG. 57 is a specific color filter that can respond to the light emission from the universal remote controller 403 in different colors respectively by adjusting constant-hue lines of the specific color filter 71 in FIG. 7.

In FIG. 57, an N-th color region frequency calculator 75-N causes a counter (not shown) to count up when an output of the N-th color discrimination filter 71-N is the binary value 1 or exceeds a particular value if a binary system is not employed, and then outputs the frequency in the N-th color region. A synthesizer 73a logically synthesizes outputs of an M-th frequency region filter 76-M, the N-th color discrimination filter 71-N, and the gradation limiter 72, and ANDs respective outputs to gate the object gate unit 74 when respective outputs are 1. The process herein is executed by using the binary system of 0, 1. In this case, when the gradation is provided instead of the binary value, the synthesizer 73a not only executes the logical operation but also arithmetically operates three input values to gate successively the object gate unit 74.

Since the spatial frequency region discrimination and the color discrimination are combined with each other in this manner, the number of the selectable buttons of the universal remote controller 403 can be increased and also any erroneous recognition can be prevented by using emission lights having patterns or colors that have no correlation with the general images.

Figure 58:
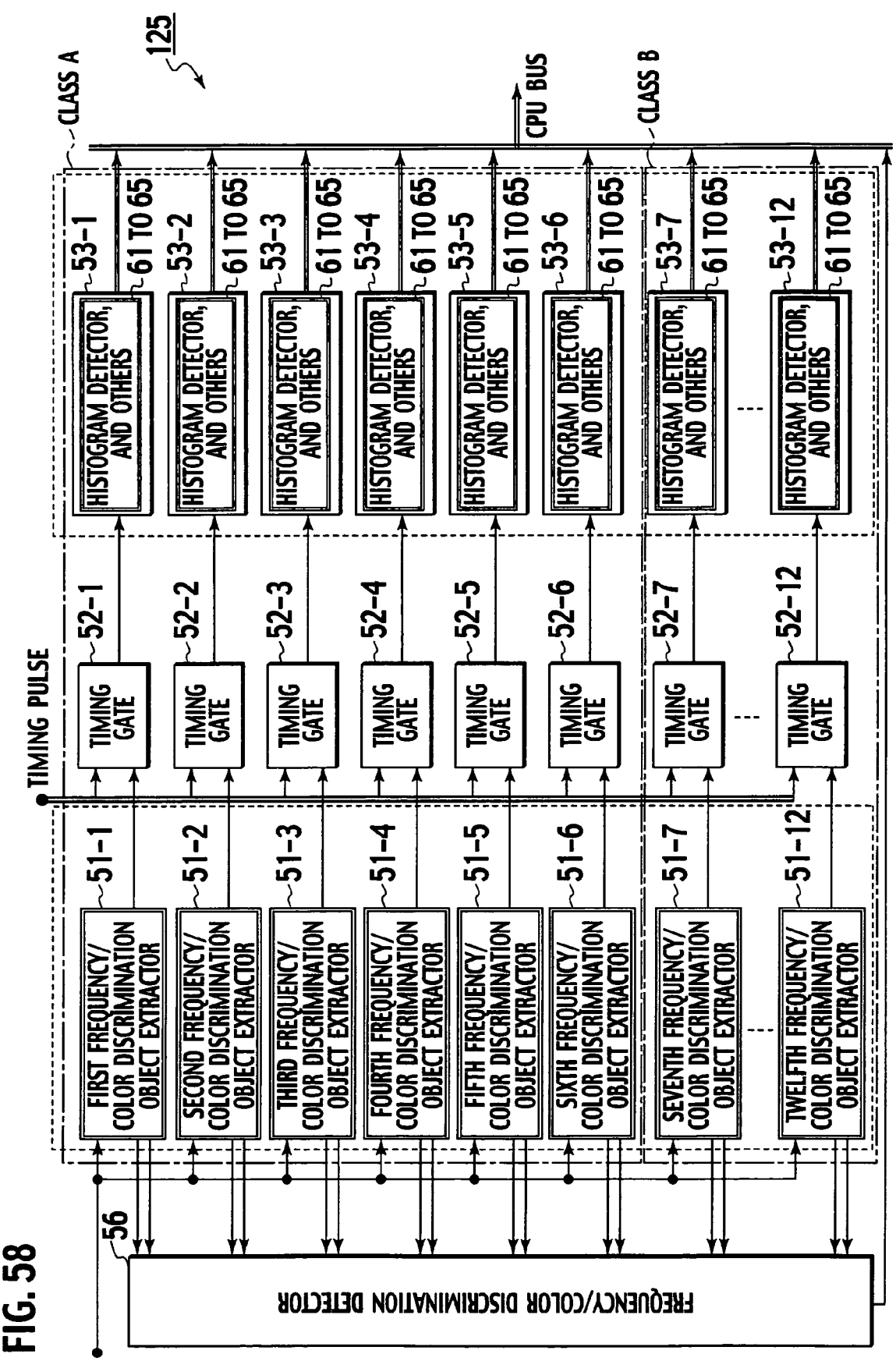
FIG. 58 is a block diagram showing a configuration of a detector containing the frequency/color discrimination object extractor.

FIG. 58 is a block diagram showing a configuration of a detector 125 having the object extractor 51'-L that can execute the spatial frequency region discrimination and the color discrimination shown in FIG. 57. This detector 125 is provided in the detector 19 in FIG. 2 to correspond to the screen buttons respectively. This detector 125 has a frequency/color discrimination detector 56, L-th frequency/color discrimination object extractors 51-L (L: 1 to 12), L-th timing gates 52-L (L: 1 to 12), and L-th object characteristic data detectors 53-L (L: 1 to 12) constructed by histogram detector, and others 61 to 65.

Then, a group consisting of first to sixth frequency/color discrimination object extractors 51-1 to 51-6, timing gates 52-1 to 52-6, and object characteristic data detectors 53-1 to 53-6 constitutes a class A, and a group consisting of seventh to twelfth frequency/color discrimination object extractors 51-7 to 51-12, timing gates 52-7 to 52-12, and object characteristic data detectors 53-7 to 53-12 constitutes a class B. In the class A, the spatial frequency region to pass a light contains a horizontal high-frequency component, which correspond to the vertical stripe light emission of the universal remote controller 403. The first to sixth frequency/color discrimination object extractors 51-1 to 51-6 correspond to 6 different colors emitted from the universal remote controller 403 respectively.

In the class B, the spatial frequency region to pass a light contains a vertical high-frequency component, which correspond to the horizontal stripe light emission of the universal remote controller 403. The seventh to twelfth frequency/color discrimination object extractors 51-7 to 51-12 correspond to 6 different colors emitted from the universal remote controller 403 respectively.

Each frequency and the output of the object gate 74 provided to the frequency/color discrimination object extractor 51'-L respectively are input into the timing gate unit 52-L, and outputs of the M-th frequency region frequency calculator 77-M and the N-th color region frequency calculator 75-N are input into the frequency/color discrimination detector 56. The frequency/color discrimination detector 56 calculates the maximum values of the frequencies in the frequencies and the colors respectively. This is because the frequency component and the color of the light emitted to the screen button from the universal remote controller 403 show the highest frequency. The frequency/color discrimination detector 56 transfers respective values of the frequency and the color indicating the maximum values to the control information determining unit 20. The control information determining unit 20 uses these values to decide which frequency region and color are effective, i.e., which screen button is effective and which content is to be controlled.

Twelve timing gates 52-L execute the gating process at the same timing. The gated signal is supplied to the L-th object characteristic data detectors 53-L, and the data such as the histogram, and the like are transferred to the control information determining unit 20 via the CPU bus. Since the control information determining unit 20 can decide which frequency region and color are effective, based on the information input from the frequency/color discrimination detector 56, it processes the data in one effective region from the object feature data detectors 53-L. The frequency values of the frequency region and the color region output from the frequency/color discrimination object extractors 51-L are evaluated by the frequency/color discrimination detector 56 to discriminate the concerned one from twelve object extractors 51-L. The object extractor 51-L that has the maximum value of the frequency in both the frequency region and the color region is selected and then the data are transferred to the CPU bus.

The detector 125 has 12 discriminating functions in total by dividing the frequency region into two parts and dividing the color region into six parts, and the frequency region division is referred to as the classes A, B. These regions can be divided into many more parts. However, if such a situation is considered that the user selects a control item while looking at the screen and then pushes a desired button of the universal remote controller 403, it is self-evident that there is a limit to the division number. The appropriate division number may be decided by evaluating totally an issue of the design of the menu screen, user's time and labor to select the button, and an issue of a recognition rate. A combination of the frequency region and the color region gives an advantage such that various choices can be provided.

FIG. 59A to 59C are views explaining an example of the universal remote controller 403 using the spatial frequency region and color discrimination in the fourth embodiment. Here, such universal remote controller is called a universal remote controller 403'. FIG. 59A shows a screen of the television receiver 1. A video camera signal is mixed with the menu of the graphics on a display under a broken line that is added for the purpose of explanation. The graphics image and the signal such as the broadcast, the video input, or the like mixed with the background of the graphics image, as the case may be, are displayed over the broken line.

Banners in six colors (R: red, G: green, B: blue, Y: yellow, M: magenta, C: cyan) in the class A and the class B over the broken line are not the screen buttons shown in FIG. 53 but the marks that are used to inform the user of respective color functions and respective frequency functions (classes A, B) in the color discrimination and the spatial frequency region discrimination. A screen button 125B1 and a screen button 125B2 are arranged on the lower left-hand and right-hand corners of the screen.

The universal remote controller 403' is shown in FIG. 59B, and the detector 125 and the control information determining unit 20 are shown in FIG. 59C. Two timing pulses are input into the detector 125. This shows that there are two phases in which the detector 125 is activated. The two phases correspond to the screen button 125B1 and the screen button 125B2 provided on the lower left-hand and right-hand corners. The detector 125 is constructed as explained in FIG. 58, and has the frequency/color discrimination object extractors 51'-L. The detector 125 can discriminate 12 light emission states generated by combining the vertical strip light emission and the horizontal strip light emission as two light emission patterns of the universal remote controller 403' with six light colors.

FIG. 59B shows an arrangement of the buttons on the universal remote controller 403'. The light emission pattern corresponding to the buttons 311A to 316A belonging to the class A is the vertical strip light emission, and respective light colors pointed by the buttons 311A to 316A are six colors of red, blue, yellow, magenta, and cyan. The light emission pattern corresponding to the button 311B to 316B belonging to the class B is the horizontal strip light emission, and respective light colors pointed by the buttons 311B to 316B are six colors of red, blue, yellow, magenta, and cyan.

FIG. 60 is a table showing allocations of twelve function discriminations given by the frequencies (2 divisions) and the colors (6 divisions) to the buttons of the universal remote controller 403'.

An operating method of the universal remote controller 403' shown in FIG. 59B will be explained as follows. The user 3 looks at the screen of the television receiver, and checks "red(R): control example 1 channel, green(G): control example 2 channel, blue(B): control example 3 channel, yellow(Y): control example 4 channel, magenta(M): control example 5 channel, cyan(C): control example 6 channel" as the class A of the operation information and "red(R): control example 7 channel, green(G): control example 8 channel, blue(B): control example 9 channel, yellow(Y): control example 10 channel, magenta(M): control example 11 channel, cyan(C): control example 12 channel" as the class B. Then, the user 3 holds the universal remote controller 403' toward either of the screen buttons 125B1, 125B2 and pushes any one of the buttons 311A to 316A, 311B to 316B.

The universal remote controller 403' to which the operations for the color discrimination as well as the spatial frequency region discrimination are provided can execute the 12 selecting operations by a single operation in the example shown in FIG. 59B, and is convenient in use since only a moving operation of the universal remote controller 403' onto either of the screen buttons 125B1, 125B2 is required of the user 3.

As described above, in the fourth embodiment, since the spatial frequency region and the color can be changed by the light emission of the light emitting portion 303 of the universal remote controller 403', the choices of the selection operation of the screen button can be increased.

The present invention is not limited to the first to fourth embodiments explained above, and can be varied appropriately without departing from a scope of the present invention. Also, plural embodiments can be combined together by combining the configuration of the second embodiment with the configurations of the third and fourth embodiments, for example.

It should be understood that many modifications and adaptations of the invention will become apparent to those skilled in the art and it is intended to encompass such obvious modifications and changes in the scope of the claims appended hereto.

What is claimed is:

1. An electronic appliance comprising:
a display device;
a video camera that picks up an image of an operator positioned in front of the display device;
a mirror image converter configured to execute a mirror image conversion of the image picked up by the video camera;
an operation image generator configured to generate an image for operation, including an image of at least one operation button;
a mixer configured to mix an image signal of the image that underwent the mirror image conversion with an image signal of the image for operation;
a detector configured to detect a predetermined selecting operation for selecting one of the at least one operation button made by an operator displayed on a screen of the display device using an on-hand control unit having light emitting portion, with a mixed image obtained by the mixer displayed on the screen of the display device; and
a controller configured to execute a control operation corresponding to the selected operation button for which the predetermined selecting operation is detected by the detector.

2. An electronic appliance according to claim 1, wherein the light emitting portion of the on-hand control unit has a light emitting means for emitting a light in N colors (N is an integer of 2 or more), and the on-hand control unit has N color selecting buttons corresponding to the N colors,
the detector has a discriminating means for discriminating the N colors, and
the controller executes a control operation corresponding to a color discriminated by the discriminating means of the detector.

3. An electronic appliance according to claim 1, wherein the on-hand control unit has operation buttons used to cause the light emitting portion to emit the light corresponding to the predetermined selecting operation, and an infrared light emitting means for emitting infrared information that indicates a determination of the predetermined selecting operation, whereby the light emitting portion and the infrared light emitting means are configured to operate according to an operation state of the operation buttons,
the electronic appliance further comprising an infrared sensor that senses the infrared information, and
wherein the controller determines the predetermined selecting operation detected by the detector based on the infrared information indicating the determination of the predetermined selecting operation, sensed by the infrared sensor, and executes the control operation.

4. An electronic appliance according to claim 1, wherein the on-hand control unit has a selfluminous means for emitting lights in light emission patterns corresponding to M (M is an integer of 1 or more) spatial frequency regions, and M frequency region selection buttons that correspond to the light emission patterns corresponding to M spatial frequency regions,
the detector has a discriminating means for discriminating the light emission patterns corresponding to M spatial frequency regions, and
the controller executes the control operation corresponding to a spatial frequency region discriminated by the discriminating means of the detector.

5. An electronic appliance according to claim 1, wherein the on-hand control unit has a selfluminous means for emitting lights in N colors (N is an integer of 1 or more) in each of light emission patterns corresponding to M (M is an integer of 1 or more) spatial frequency regions, and M×N frequency/color region selection buttons that correspond to N colors in each of the light emission patterns corresponding to M spatial frequency regions,
the detector has a discriminating means for discriminating M×N types of light emission states, and
the controller executes the control operation corresponding to a light emission state discriminated by the discriminating means of the detector.

* * * * *